US010550000B2

(12) United States Patent
Nishi et al.

(10) Patent No.: US 10,550,000 B2
(45) Date of Patent: Feb. 4, 2020

(54) ELECTRODE AND SECONDARY BATTERY

(71) Applicant: Murata Manufacturing Co., Ltd., Kyoto (JP)

(72) Inventors: Toshio Nishi, Saitama (JP); Masayuki Ihara, Fukushima (JP); Hideki Nakai, Saitama (JP); Akinori Kita, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 83 days.

(21) Appl. No.: 14/637,539

(22) Filed: Mar. 4, 2015

(65) Prior Publication Data
US 2015/0270551 A1 Sep. 24, 2015

(30) Foreign Application Priority Data
Mar. 19, 2014 (JP) .................................. 2014-056139

(51) Int. Cl.
*H01M 4/13* (2010.01)
*H01M 4/133* (2010.01)
*H01M 4/62* (2006.01)
*H01M 10/0525* (2010.01)
*H01M 10/0567* (2010.01)
*H01M 10/0569* (2010.01)
*C01B 32/20* (2017.01)

(52) U.S. Cl.
CPC ............... *C01B 32/20* (2017.08); *H01M 4/13* (2013.01); *H01M 4/133* (2013.01); *H01M 4/622* (2013.01); *H01M 10/0525* (2013.01); *H01M 10/0567* (2013.01); *C01P 2006/40* (2013.01); *H01M 2300/0037* (2013.01); *Y02T 10/7011* (2013.01)

(58) Field of Classification Search
CPC ... C01B 31/04; H01M 4/583; H01M 10/0567; H01M 10/0568; H01M 10/0569; H01M 4/13; H01M 4/133; H01M 4/622; H01M 10/0525
See application file for complete search history.

(56) References Cited

U.S. PATENT DOCUMENTS

| | | | | |
|---|---|---|---|---|
| 6,669,830 B1 * | 12/2003 | Inoue | | C04B 35/01 204/298.13 |
| 7,399,552 B2 * | 7/2008 | Kano | | H01M 4/364 429/231.4 |
| 8,535,834 B1 * | 9/2013 | Yoon | | H01M 10/0567 429/322 |
| 2004/0101763 A1 * | 5/2004 | Kotato | | H01M 2/0275 429/331 |
| 2005/0233222 A1 * | 10/2005 | Yanagida | | H01M 10/0525 429/324 |
| 2007/0224514 A1 * | 9/2007 | Kotato | | H01M 10/056 429/325 |
| 2009/0017386 A1 * | 1/2009 | Xu | | H01M 4/40 429/331 |
| 2010/0035147 A1 * | 2/2010 | Kotato | | H01M 10/052 429/203 |
| 2013/0224577 A1 * | 8/2013 | Ihara | | H01M 10/0566 429/200 |

FOREIGN PATENT DOCUMENTS

| | | |
|---|---|---|
| CN | 101589492 | 11/2009 |
| CN | 101755354 | 6/2010 |
| JP | 07-235328 | 9/1995 |
| JP | 2000-058122 | 2/2000 |
| JP | 2001-006729 A | 1/2001 |
| JP | 3172388 | 6/2001 |
| JP | 3691279 | 9/2005 |
| JP | 2007-188861 | 7/2007 |
| JP | 2008-181870 A | 8/2008 |
| JP | 2009-206073 | 9/2009 |
| JP | 2010-533359 | 10/2010 |
| JP | 2013-211259 A | 10/2013 |

OTHER PUBLICATIONS

Japanese Office Action dated Feb. 14, 2017 in corresponding Japanese application No. 2014-056139 (8 pages).
Japanese Office Action dated Dec. 6, 2016 in corresponding Japanese application No. 2014-056139 (8 pages).
Chinese Office Action dated Jul. 31, 2018 in corresponding Chinese Application No. 2018072602031630.

\* cited by examiner

*Primary Examiner* — Anca Eoff
(74) *Attorney, Agent, or Firm* — K&L Gates LLP

(57) ABSTRACT

A secondary battery includes: a cathode; an anode including a carbon material; and non-aqueous electrolytic solution. A photoelectron spectrum of oxygen 1s is obtained from an analysis of the anode by X-ray photoelectron spectroscopy. A first peak positioned in vicinity of 1360 reciprocal centimeters and a second peak positioned in vicinity of 1580 reciprocal centimeters are obtained from an analysis of the carbon material by Raman spectroscopy. A half band width $\Delta W1$ of the photoelectron spectrum is about 3 electron volts or more. A half band width $\Delta W2$ of the second peak is about 19 reciprocal centimeters or more. A ratio $I1/I2$ of intensity $I1$ of the first peak to intensity $I2$ of the second peak is from about 0.15 to about 0.3 both inclusive.

10 Claims, 12 Drawing Sheets

ELECTRODE AND SECONDARY BATTERY

CROSS REFERENCES TO RELATED APPLICATIONS

The present application claims priority to Japanese Priority Patent Application JP 2014-056139 filed in the Japan Patent Office on Mar. 19, 2014, the entire content of which is hereby incorporated by reference.

BACKGROUND

The present application relates to an electrode that includes a carbon material, and to a secondary battery that uses the electrode.

Various electronic apparatuses such as a mobile phone and a mobile information terminal device (PDA) have been widely used, and it has been demanded to further reduce the size and the weight of the electronic apparatuses and to achieve their longer lives. Accordingly, as an electric power source, a battery, in particular, a compact and light-weight secondary battery having high energy density has been developed.

In these days, application of the secondary battery is not limited to the above-described electronic apparatuses, and various other applications thereof have been considered. Examples of such various applications may include a battery pack attachably and detachably mounted on the electronic apparatus or the like, an electric vehicle such as an electric automobile, an electric power storage system such as a home electric power server, and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant or that utilizes precipitation and dissolution of the electrode reactant, because higher energy density is achieved thereby, compared to energy density in a battery such as a lead battery or a nickel-cadmium battery.

A secondary battery includes a cathode, an anode, and electrolytic solution. The cathode includes a cathode active material related to charge and discharge reactions, and the anode includes an anode active material related to charge and discharge reactions. The electrolytic solution includes a solvent and an electrolyte salt. A configuration of the secondary battery largely influences battery characteristics. Various considerations have been therefore made on the configuration of the secondary battery.

Specifically, in order to improve charge and discharge cycle characteristics, etc., a coating film made of a metal oxide such as beryllium oxide (BeO) is provided on a surface of the cathode (for example, see Japanese Patent No. 3172388). In order to improve thermal stability, etc., the surface of the cathode active material is coated with a metal oxide such as an oxide of magnesium (Mg) (for example, see Japanese Patent No. 3691279). In order to improve charge and discharge efficiency, etc., cyclic ester carbonate such as vinylene carbonate or 4-methylene-1,3-dioxolane-2-one is contained in the solvent (for example, see Japanese Unexamined Patent Application Publication Nos. 2000-058122 and 2007-188861 and Japanese Unexamined Patent Application Publication (Translation of PCT Application) No. 2010-533359). In order to prevent decrease in cycle life, a surface of a carbon material used in the anode is covered with a solid polymer electrolyte (for example, see Japanese Unexamined Patent Application Publication No. H07-235328).

SUMMARY

An electronic apparatus, etc. have been further gaining higher performance and more functions, and frequency of using such electronic apparatus, etc. has increased. Accordingly, a secondary battery tends to be charged and discharged frequently. Hence, there is still a room for improvement in battery characteristics of the second battery.

It is desirable to provide an electrode and a secondary battery that are capable of achieving superior battery characteristics.

According to an embodiment of the present application, there is provided an electrode including a carbon material. A photoelectron spectrum of oxygen 1s is obtained from an analysis by X-ray photoelectron spectroscopy. A first peak (D-band) positioned in vicinity of 1360 reciprocal centimeters and a second peak (G-band) positioned in vicinity of 1580 reciprocal centimeters are obtained from an analysis of the carbon material by Raman spectroscopy. A half band width $\Delta W1$ of the photoelectron spectrum is about 3 electron volts or more, a half band width $\Delta W2$ of the second peak is about 19 reciprocal centimeters or more, and a ratio $I1/I2$ of intensity $I1$ of the first peak to intensity $I2$ of the second peak is from about 0.15 to about 0.3 both inclusive.

According to an embodiment of the present application, there is provided a secondary battery including a cathode, an anode, and non-aqueous electrolytic solution. The anode includes a carbon material. A photoelectron spectrum of oxygen 1s is obtained from an analysis of the anode by X-ray photoelectron spectroscopy. A first peak (D-band) positioned in vicinity of 1360 reciprocal centimeters and a second peak (G-band) positioned in vicinity of 1580 reciprocal centimeters are obtained from an analysis of the carbon material by Raman spectroscopy. A half band width $\Delta W1$ of the photoelectron spectrum is about 3 electron volts or more, a half band width $\Delta W2$ of the second peak is about 19 reciprocal centimeters or more, and a ratio $I1/I2$ of intensity $I1$ of the first peak to intensity $I2$ of the second peak is from about 0.15 to about 0.3 both inclusive.

According to another embodiment of the present application, there is provided a secondary battery including a cathode, an anode, and non-aqueous electrolytic solution. The anode includes a carbon material. A first peak (D-band) positioned in vicinity of 1360 reciprocal centimeters and a second peak (G-band) positioned in vicinity of 1580 reciprocal centimeters are obtained from an analysis of the carbon material by Raman spectroscopy. A half band width $\Delta W2$ of the second peak is about 19 reciprocal centimeters or more, and a ratio $I1/I2$ of intensity $I1$ of the first peak to intensity $I2$ of the second peak is from about 0.15 to about 0.3 both inclusive. The non-aqueous electrolytic solution includes one or more of unsaturated cyclic compounds represented by the following respective Formulas (6) to (8).

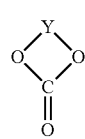

(6)

(Y is a divalent group obtained by bonding p-number of >C=CR8R9 and q-number of >CR10R11 in arbitrary order. Each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof. Arbitrary two or more of R8 to R11 may be bonded to one another. p and q are integers that satisfy p≥1 and q≥0, respectively.)

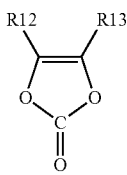
(7)

(Each of R12 and R13 is one of a hydrogen group and a monovalent hydrocarbon group.)

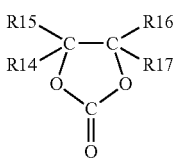
(8)

(Each of R14 to R17 is one of a hydrogen group, a monovalent saturated hydrocarbon group, and a monovalent unsaturated hydrocarbon group. One or more of R14 to R17 are each the monovalent unsaturated hydrocarbon group.)

According to the electrode or the secondary battery of an embodiment of the present application, the three physical characteristic conditions described above are satisfied related to the result (the half band width ΔW1) of the analysis of the electrode by the X-ray photoelectron spectroscopy and the result (the half band width ΔW2 and the ratio I1/I2) of the analysis of the carbon material by Raman spectroscopy. Accordingly, it is possible to achieve superior battery characteristics.

According to the secondary battery of another embodiment of the present application, the two physical characteristic conditions described above are satisfied related to the result (the half band width ΔW2 and the ratio I1/I2) of the analysis of the carbon material by Raman spectroscopy, and the non-aqueous electrolytic solution includes the unsaturated cyclic compound. Accordingly, it is possible to achieve superior battery characteristics.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some embodiments of the present application are described below in detail with reference to the drawings. The description is provided in the following order.
1. Electrode
2. Secondary Battery Using Electrode
   2-1. Lithium Ion Secondary Battery (Square Type)
   2-2. Lithium Ion Secondary Battery (Cylindrical Type)
   2-3. Lithium Ion Secondary Battery (Laminated Film Type)
   2-4. Lithium Metal Secondary Battery
3. Other Secondary Battery
4. Applications of Secondary Battery
   4-1. Battery Pack (Single Battery)
   4-2 Battery Pack (Assembled Battery)
   4-3. Electric Vehicle
   4-4. Electric Power Storage System
   4-5. Electric Power Tool

[1. Electrode]

First, an electrode of an embodiment of the present application (hereinafter, may be simply referred to as "electrode" or "electrode of the present application") is described. The electrode described below may be used as a cathode, or may be used as an anode.

[Configuration of Electrode]

Figure 1:
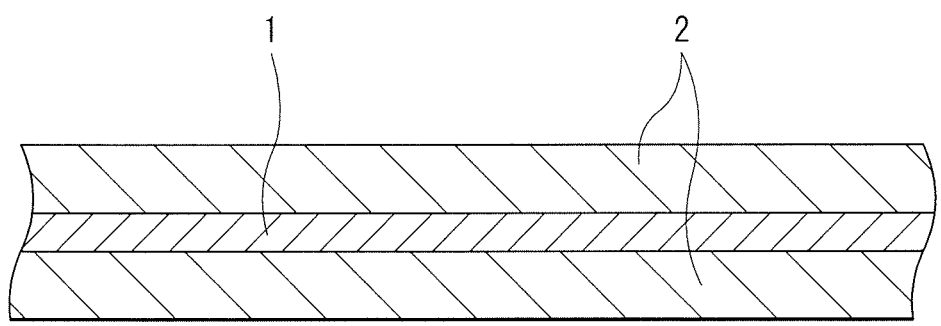
FIG. 1 is a cross-sectional view illustrating a configuration of an electrode of an embodiment of the present application.

FIG. 1 illustrates a cross-sectional configuration of an electrode. The electrode may include a current collector 1 and an active material layer 2. To give an example, description is provided below of a case where the electrode is used as an anode.

[Current Collector]

The current collector 1 may include one or more conductive materials, for example. The type of the conductive material is not particularly limited; however, the conductive material may be, for example, a metal material such as copper (Cu), aluminum (Al), nickel (Ni), and stainless steel. It is to be noted that the current collector 1 may be configured of a single layer or multiple layers.

A surface of the current collector 1 may be preferably roughened, because close-attachment characteristics of the active material layer 2 with respect to the current collector 1 are improved thereby due to a so-called anchor effect. In this case, it is enough that the surface of the current collector 1 is roughened at least in a region opposing the active material layer 2. Examples of a roughening method may include a method of forming fine particles utilizing an electrolytic process. In the electrolytic process, fine particles are formed on the surface of the current collector 1 in an electrolytic bath by an electrolytic method, which provides asperity on the surface of the current collector 1. A copper foil fabricated by the electrolytic method is generally called an electrolytic copper foil.

[Active Material Layer]

The active material layer 2 may be provided on the current collector 1. It is to be noted that the active material layer 2 may be provided only on one surface of the current collector 1, or may be provided on both surfaces of the current collector 1.

The active material layer 2 may include one or more electrode materials as active materials that are capable of inserting and extracting an electrode reactant. The electrode reactant is a substance that is related to an electrode reaction. To give an example, the electrode reactant in a case where battery capacity is obtained by insertion and extraction of lithium (Li) is lithium. It is to be noted that the active material layer 2 may further include one or more other materials such as a binder and a conductor.

The electrode material includes one or more carbon materials. One reason for this is because a crystal structure of the carbon material is extremely difficult to be changed when the electrode reactant is inserted or extracted and high energy density is therefore stably achieved. Another reason is because the carbon material also serves as a conductor, and conductivity of the active material layer 2 is therefore improved.

Examples of the carbon material may include graphitizable carbon, non-graphitizable carbon, and graphite. In particular, the carbon material may be preferably graphite. It is to be noted that the non-graphitizable carbon may preferably have a spacing of (002) plane that is 0.37 nm or larger, and the graphite may preferably have a spacing of (002) plane that is 0.34 nm or smaller. More specific examples of the carbon material may include pyrolytic carbons, cokes, glassy carbon fiber, an organic polymer compound burned body, activated carbon, and carbon blacks. The cokes may encompass pitch coke, needle coke, petroleum coke, etc. The organic polymer compound burned body is a polymer compound such as phenol resin or furan resin that is burned (carbonized) at an appropriate temperature. Other than the above-mentioned materials, the carbon material may be low-crystalline carbon that is subjected to a heat process at a temperature of about 1000° C. or lower, or may be amorphous carbon. It is to be noted that the shape of the carbon material is not particularly limited, and may be any of a fibrous shape, a spherical shape, a granular shape, and a scale-like shape.

It is to be noted that the electrode material may further include one or more other materials as long as the electrode material includes the carbon material described above.

Other material may be, for example, a material (hereinafter, referred to as "metal-based material") that includes one or more of metal elements and metalloid elements as constituent elements, because high energy density is achieved thereby.

The metal-based material may be any of a simple substance, alloy, and a compound, may be two or more thereof, or may be a material that has one or more phases thereof in part or all thereof. It is to be noted that the alloy also encompasses a material that includes one or more metal elements and one or more metalloid elements as constituent elements, in addition to a material that includes two or more metal elements as constituent elements. Further, the alloy may include a non-metallic element as a constituent element. Examples of a structure of the metal-based material may include solid solution, a eutectic crystal (eutectic mixture), an intermetallic compound, and a structure in which two or more thereof coexist.

The foregoing metal elements and the foregoing metalloid elements may be, for example, one or more of metal elements and metalloid elements that are capable of forming alloy with the electrode reactant. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt).

In particular, silicon, tin, or both may be preferable, because silicon and tin have a superior performance of inserting and extracting the electrode reactant, and therefore achieve extremely high energy density.

A material that includes silicon, tin, or both as constituent elements may be any of a simple substance, alloy, and a compound of silicon, may be any of a simple substance, alloy, and a compound of tin, may be two or more thereof, or may be a material that has one or more phases thereof in part or all thereof. It is to be noted that "simple substance" merely refers to a simple substance in a general sense (a small amount of impurity may be therein contained), and does not necessarily refer to a purity 100% simple substance.

The alloy of silicon may include, for example, one or more of tin, nickel, copper, iron, cobalt, manganese, zinc, indium, silver, titanium, germanium, bismuth, antimony, chromium, and the like, as constituent elements other than silicon. The compound of silicon may include, for example, one or more of carbon, oxygen, and the like, as constituent elements other than silicon. It is to be noted that the compound of silicon may include, for example, one or more of the series of elements described above related to the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), and LiSiO. v in $SiO_v$ may be in a range of 0.2<v<1.4.

The alloy of tin may include, for example, one or more of silicon, nickel, copper, iron, cobalt, manganese, zinc, indium, silver, titanium, germanium, bismuth, antimony, chromium, and the like, as constituent elements other than tin. The compound of tin may include, for example, one or more of carbon, oxygen, and the like, as constituent elements other than tin. It is to be noted that the compound of tin may include, for example, one or more of the series of elements described above related to the alloy of tin, as constituent elements other than tin.

Specific examples of the alloy of tin and the compound of tin may include $SnO_w$ (0<w≤2), $SnSiO_3$, LiSnO, and $Mg_2Sn$.

In particular, the material including tin as a constituent element may be preferably, for example, a material (Sn-containing material) that includes a second constituent element and a third constituent element together with tin that is a first constituent element. The second constituent element may be, for example, one or more of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cesium (Ce), hafnium (Hf), tantalum (Ta), tungsten (W), bismuth (Bi), silicon (Si), and the like. The third constituent element may be, for example, one or more of boron (B), carbon (C), aluminum (Al), phosphorus (P), and the like. One reason for this is because high battery capacity, superior cycle characteristics, etc. are achieved when the Sn-containing material includes the second and third constituent elements.

In particular, the Sn-containing material may be preferably a material (SnCoC-containing material) that includes tin, cobalt, and carbon as constituent elements. In the SnCoC-containing material, for example, a content of carbon may be from about 9.9 mass % to about 29.7 mass % both inclusive, and a ratio of contents of tin and cobalt (Co/(Sn+Co)) may be from about 20 mass % to about 70 mass % both inclusive, because high energy density is achieved thereby.

The SnCoC-containing material may preferably have a phase that includes tin, cobalt, and carbon. Such a phase may be preferably low-crystalline or amorphous. The phase is a reaction phase that is capable of reacting with the electrode reactant. Superior characteristics are therefore achieved due to existence of the reaction phase. A half band width (diffraction angle 2θ) of a diffraction peak of the reaction phase obtained by X-ray diffraction may be preferably 1° or larger in a case where a CuKα ray is used as a specific X-ray and an insertion rate is set to 1°/min. One reason for this is because the electrode reactant is more smoothly inserted and extracted thereby, and reactivity with the electrolytic solution is decreased thereby. It is to be noted that the SnCoC-containing material may include a phase that includes simple substances of the respective constituent elements or phases including part of the respective constituent elements in addition to the low-crystalline phase or the amorphous phase.

Whether or not the diffraction peak obtained by the X-ray diffraction corresponds to a phase (reaction phase) that is capable of reacting with the electrode reactant is allowed to be easily determined by comparison between X-ray diffraction charts before and after an electrochemical reaction with the electrode reactant. For example, if the position of the diffraction peak after the electrochemical reaction with the electrode reactant is changed from the position of the diffraction peak before the electrochemical reaction with the electrode reactant, the obtained diffraction peak corresponds to the phase that is capable of reacting with the electrode reactant. In this case, for example, the diffraction peak of a low-crystalline reaction phase or an amorphous reaction phase is detected in a range in which 2θ is from about 20° to about 50° both inclusive. Such a reaction phase may include, for example, the respective constituent elements described above, and it may be considered that such a reaction phase is made low crystalline or amorphous mainly as a result of the existence of carbon.

In the SnCoC-containing material, part or all of carbon that is a constituent element may be preferably bonded to a metal element or a metalloid element that is another constituent element, because this suppresses aggregation or crystallization of tin and/or the like. The bonding state of elements may be confirmed, for example, by X-ray photoelectron spectroscopy (XPS). In a commercially-available apparatus, for example, an Al—Kα ray, an Mg—Kα ray, or the like may be used as a soft X-ray. In a case where part or all of carbons are bonded to the metal element, the metalloid element, etc., the peak of a synthetic wave of 1s orbit of carbon (C1s) appears in a region that is lower than 284.5 eV. It is to be noted that it is assumed that energy calibration is so made that the peak of 4f orbit of gold atom (Au4f) is obtained at 84.0 eV. At this time, in general, because surface contamination carbon exists on the material surface, the peak of C1s of the surface contamination carbon is regarded as 284.8 eV, which is used as an energy reference. In analytic measurement by XPS, the waveform of the peak of C1s is obtained in a form that includes the peak of the surface contamination carbon and the peak of carbon in the SnCoC-containing material. For this reason, the both peaks may be separated from each other by analysis with the use of commercially-available software, for example. In the waveform analysis, the position of the principal peak that exists on the lowest binding energy side is regarded as the energy reference (284.8 eV).

It is to be noted that the SnCoC-containing material is not limited to the material (SnCoC) that includes only tin, cobalt, and carbon as constituent elements. The SnCoC-containing material may further include, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (SnCoFeC-containing material) that includes tin, cobalt, iron, and carbon as constituent elements may be also preferable. The SnCoFeC-containing material may have an arbitrary composition. To give an example, in a case where a content of iron is set smaller, a content of carbon may be from about 9.9 mass % to about 29.7 mass % both inclusive, the content of iron may be from about 0.3 mass % to about 5.9 mass % both inclusive, and a ratio of contents of tin and cobalt (Co/(Sn+Co)) may be from about 30 mass % to about 70 mass % both inclusive. Alternatively, in a case where the content of iron is set larger, the content of carbon may be from about 11.9 mass % to about 29.7 mass % both inclusive, the ratio of contents of tin, cobalt, and iron ((Co+Fe)/(Sn+Co+Fe)) may be from about 26.4 mass % to about 48.5 mass % both inclusive, and the ratio of contents of cobalt and iron (Co/(Co+Fe)) may be from about 9.9 mass % to about 79.5 mass % both inclusive. One reason for this is because high energy density is achieved in such composition ranges. It is to be noted that the physical characteristics (such as a half band width) of the SnCoFeC-containing material are similar to the physical characteristics of the SnCoC-containing material described above.

Moreover, other materials may be, for example, one or more of metal oxides, polymer compounds, and the like. Examples of the metal oxide may include iron oxide, ruthenium oxide, and molybdenum oxide. Examples of the polymer compound may include polyacetylene, polyaniline, and polypyrrole.

In particular, the electrode material may preferably include the metal-based material together with the carbon material for the following reason.

The metal-based material, in particular, the material that includes silicon, tin, or both as constituent elements has an advantage that such a material has high theoretical capacity, but has a concern that it is easy for such a material to radically expand or contract at the time of an electrode reaction. On the other hand, the carbon material has a concern that the carbon material has low theoretical capacity, but has an advantage that it is less likely for the carbon material to expand or contract at the time of an electrode reaction. Accordingly, by using the carbon material and the metal-based material together, it is possible to achieve high theoretical capacity (in other words, high battery capacity) while suppressing expansion and contraction at the time of an electrode reaction.

The active material layer 2 may be formed, for example, by one or more of a coating method, a vapor-phase deposition method, a liquid-phase deposition method, a spraying method, a burning method (sintering method), and the like. The coating method may be, for example, a method in which, after a particulate (powder) active material is mixed with a binder and/or the like, the mixture is dispersed in a solvent such as an organic solvent, and the resultant is applied onto the current collector 1. Examples of the vapor-phase deposition method may include a physical deposition method and a chemical deposition method. More specific examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an active material in a fused state or a semi-fused state is sprayed onto the current collector 1. The burning method may be, for example, a method in which, after the mixture dispersed in the solvent is applied onto the current collector 1 by a coating method, a heat process is performed thereon at a temperature that is higher than a melting point of the binder and/or the like. As the burning method, for example, may include an atmosphere burning method, a reactive burning method, a hot press burning method, or the like may be used.

The binder may include, for example, one or more of synthetic rubbers, polymer materials, and the like. Examples of the synthetic rubber may include styrene-butadiene-based rubber, fluorine-based rubber, and ethylene propylene diene. Examples of the polymer material may include polyvinylidene fluoride and polyimide.

The conductor may include, for example, one or more of carbon materials and the like. Examples of the carbon material may include graphite, carbon black, acetylene black, and Ketjen black. It is to be noted that the conductor may be a metal material, a conductive polymer, or the like as long as the material has conductivity.

[Physical Characteristics of Electrode]

Preferably, the active material layer 2 may be chemically stable in order to achieve superior battery characteristics.

In detail, because the active material layer 2 includes a highly-reactive active material, when the active material is activated at the time of an electrode reactant, the active material is made easier to react with the electrolytic solution. When the active material reacts with the electrolytic solution, a decomposition reaction of the electrolytic solution is accelerated. This results in easier decrease in battery characteristics of the secondary battery. However, when the active material layer 2 is chemically stable, the active material is made less likely to react with the electrolytic solution. This suppresses the decomposition reaction of the electrolytic solution. In this case, insertion and extraction of the electrode reactant are less likely to be prevented at the time of the electrode reaction when the electrode reactant is inserted and extracted smoothly in the active material layer 2 even if the active material layer 2 is chemically stable. As a result, battery characteristics of the secondary battery are improved.

It is to be noted that the chemical stabilization of the active material layer 2 described above may be achieved, for example, by a coating film (not illustrated in FIG. 1) that is formed on the surface of the active material layer 2. The coating film may be formed in advance on the surface of the active material layer 2 before assembling the secondary battery, or may be formed afterward on the surface of the active material layer 2 by utilizing charge and discharge reactions after assembling the secondary battery.

In order to ensure the chemically-stable state of the active material layer 2 described above, physical characteristics of the electrode satisfy, at the same time, the following three physical characteristic conditions related to a result of analysis of the electrode by XPS and a result of analysis of the active material (carbon material) by Raman spectroscopy.

As a first condition, when the electrode is analyzed by XPS, a photoelectron spectrum of oxygen 1s is obtained from a result of the analysis (in which a horizontal axis represents bonding energy (eV) and a vertical axis represents spectrum intensity). Hereinafter, the photoelectron spectrum of oxygen 1s is expressed as "photoelectron spectrum (O1s)". A half band width (full width at half maximum) $\Delta W1$ (eV) of the photoelectron spectrum (O1s) is about 3 eV or more.

As a second condition, when the active material (carbon material) is analyzed by Raman spectroscopy (RS), two peaks (Raman peaks) are obtained in Raman spectrum (in which a horizontal axis represents Raman shift ($cm^{-1}$) and a vertical axis represents spectrum intensity) that is a result of the analysis. The obtained two peaks are a first peak (D-band) that is positioned in the vicinity of 1360 $cm^{-1}$ and a second peak (G-band) that is positioned in the vicinity of 1580 $cm^{-1}$. A half band width (full width at half maximum) $\Delta W2$ ($cm^{-1}$) of the second peak is about 19 $cm^{-1}$ or more.

As a third condition, a ratio $I1/I2$ of intensity $I1$ of the first peak described above to intensity $I2$ of the second peak described above is from about 0.15 to about 0.3 both inclusive. The ratio $I1/I2$ is a so-called R-value.

One reason why the physical characteristics of the electrode satisfy the first condition related to the photoelectron spectrum (O1s) is as follows.

One reason why attention is paid to the half band width $\Delta W1$ of the photoelectron spectrum (O1s) is because the half band width $\Delta W1$ varies depending on presence or absence of a coating film. Hence, the half band width $\Delta W1$ is used as an index for examining whether or not the coating film is formed on the surface of the electrode.

In detail, in a case where no coating film is formed on the surface of the active material layer 2, the width of the photoelectron spectrum (O1s) is narrow, which results in sufficiently-small half band width ΔW1. Accordingly, the half band width ΔW1 is made less than about 3 eV. In contrast, in a case where the coating film is formed on the surface of the active material layer 2, the width of the photoelectron spectrum (O1s) is wide, which results in sufficiently-large half band width ΔW1. Accordingly, the half band width ΔW1 is made about 3 eV or more. Hence, it is possible to determine whether or not the coating film is formed on the surface of the active material layer 2 by paying attention to the half band width ΔW1.

One reason why the physical characteristics of the electrode satisfy the second condition related to the second peak is as follows.

One reason why attention is paid to the half band width ΔW2 of the second peak is because the half band width ΔW2 varies depending on the surface state of the active material. Hence, the half band width ΔW2 is used as an index for examining whether or not the surface state of the active material is appropriate.

In detail, in a case where the width of the second peak is narrow because of an inappropriate surface state of the active material, it is more difficult for the electrode reactant to be inserted or extracted, which results in sufficiently-small half band width ΔW2. Accordingly, the half band width ΔW2 is made less than about 19 $cm^{-1}$. In contrast, in a case where the width of the second peak is wide because of an appropriate surface state of the active material, it is easier for the electrode reactant to be inserted or extracted, which results in sufficiently-large half band width ΔW2. Accordingly, the half band width ΔW2 is made about 19 $cm^{-1}$ or more. Hence, it is possible to determine whether or not the surface of the active material is appropriate by paying attention to the half band width ΔW2.

It is to be noted that one reason why the physical characteristics of the electrode satisfy the third condition related to the first peak and the second peak is similar to the reason described above for the second condition.

Specifically, in a case where it is more difficult for the electrode reactant to be inserted or extracted in the active material because of the inappropriate surface state of the active material, the intensity I1 of the first peak is excessively small or excessively large with respect to the intensity I2 of the second peak. Accordingly, the ratio I1/I2 is made smaller than about 0.15 or larger than about 0.3. In contrast, in the case where it is easier for the electrode reactant to be inserted or extracted in the active material because of the appropriate surface state of the active material, the intensity I1 of the first peak is made appropriate with respect to the intensity I2 of the second peak. Accordingly, the ratio I1/I2 is made about 0.15 or larger and about 0.3 or smaller. Hence, it is possible to determine whether or not the surface state of the active material is appropriate by paying attention to the ratio I1/I2.

It is to be noted that, in order to examine the composition of the electrode material used as the active material, for example, one or more of analysis methods such as an X-ray diffraction (XRD) method, high-frequency inductively coupled plasma (ICP) optical emission spectrometry, and energy dispersive X-ray spectroscopy (EDX) may be used. The composition of the electrode material may be, for example, types of constituent elements, a ratio of the constituent elements contained therein, an atomic ratio, etc. In order to examine a type of crystal structure of the electrode material, for example, the electrode material may be analyzed by one or more of methods such as XRD method and Raman spectroscopy.

Details of the analysis by XPS may be as follows, for example. As an analyzer, an X-ray photoelectron spectroscopy analyzer Quantera SXM available from Ulvac-phi, Inc. may be used. At the time of analysis, a monochromatized Al—Kα ray (1486.6 eV) may be applied onto a sample for analysis with a beam size of about 100 μmφ to obtain the photoelectron spectrum (O1s). In this case, a photoelectron spectrum of fluorine 1s (F1s) may be used in order to perform energy correction on photoelectron spectrum. Specifically, waveform analysis with the use of commercially-available software may be performed, and a position of a principal peak that exists at lowest binding energy side out of the photoelectron spectrum (F1s) is set to 685.1 eV thereby. It is to be noted that, by setting a base line in the photoelectron spectrum (O1s) and specifying a peak height (spectrum intensity) using the base line as a reference, the half band width ΔW1 is determined.

Details of the analysis by RS may be as follows, for example. As an analyzer, a Raman spectroscopy apparatus RAMAN-11 available from Nanophoton Corporation may be used. At the time of analysis, Raman spectrum (the first peak and the second peak) may be obtained with the use of laser light (having a wavelength of about 532 nm) and a spectroscope (of 600 gr/mm). In this case, by setting a base line in the Raman spectrum and specifying a peak height (spectrum intensity) using the base line as a reference, the half band width ΔW2, the intensity I1, and the intensity I2 are determined.

A material for forming the coating film is not particularly limited as long as the material allows the half band width ΔW1 to satisfy the first condition described above.

[Method of Manufacturing Electrode]

A method of manufacturing the electrode is described together when a method of manufacturing a secondary battery is described later.

[Function and Effect of Electrode]

According to the electrode, the active material layer 2 includes the active material (carbon material), and the three physical characteristic conditions are satisfied at the same time that are described above related to the result of the analysis of the electrode by XPS and the result of the analysis of the active material by RS. In this case, the active material layer 2 is chemically stabilized as described above. Hence, insertion and extraction of the electrode reactant by the active material are not largely prevented and the decomposition reaction of the electrolytic solution is suppressed at the time of the electrode reaction. As a result, it is possible to improve the battery characteristics of the secondary battery.

[2. Secondary Battery Using Electrode]

Next, application example of the above-described electrode is described.

The electrode may be used in the following secondary battery, for example. In this example, the electrode of an embodiment of the present application described above may be applied to an anode 22, for example.

[2-1. Lithium Ion Secondary Battery (Square Type)]

Figure 2:
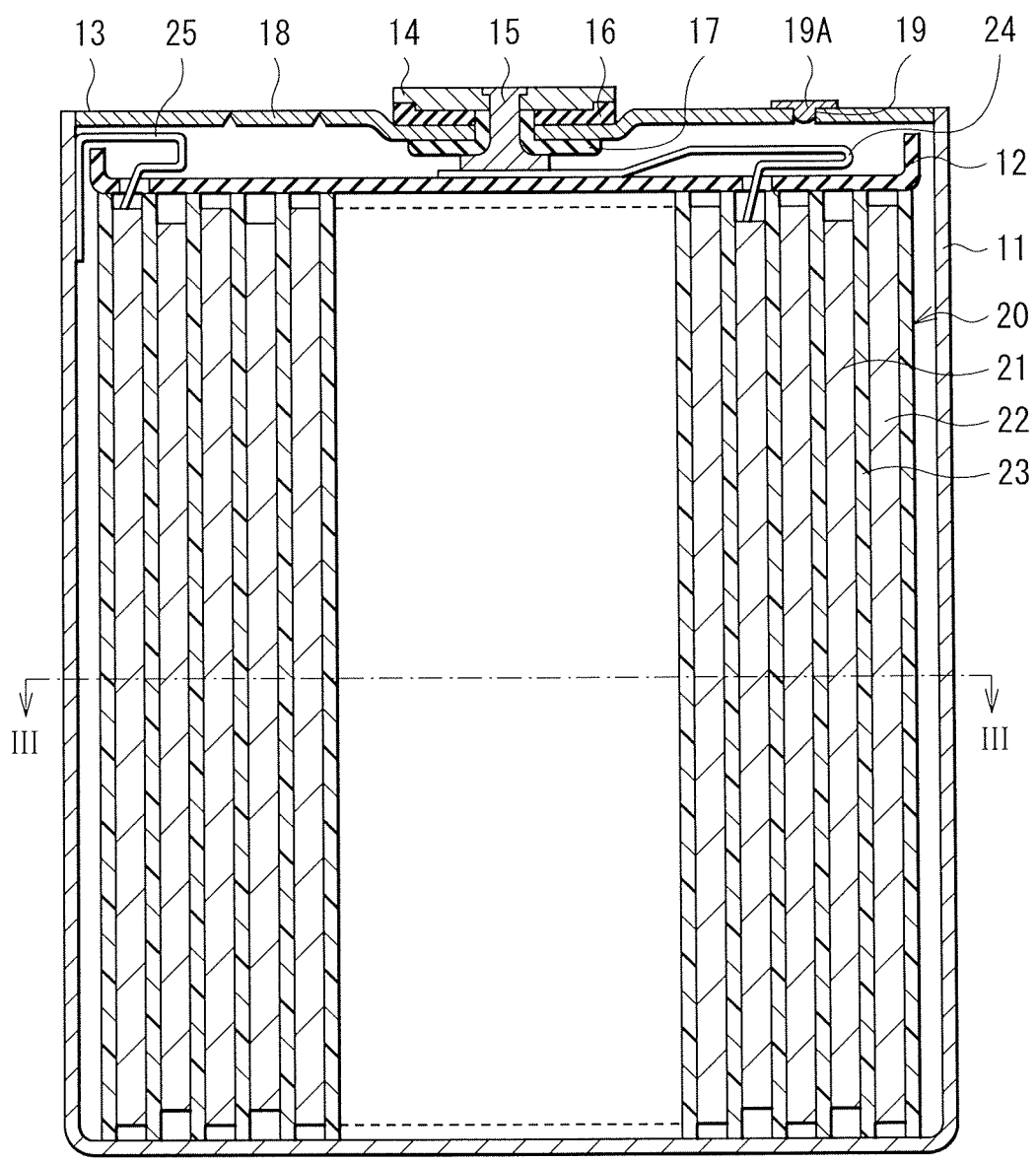
FIG. 2 is a cross-sectional view illustrating a configuration of a secondary battery (of a square type) that uses the electrode of an embodiment of the present application.
Figure 3:
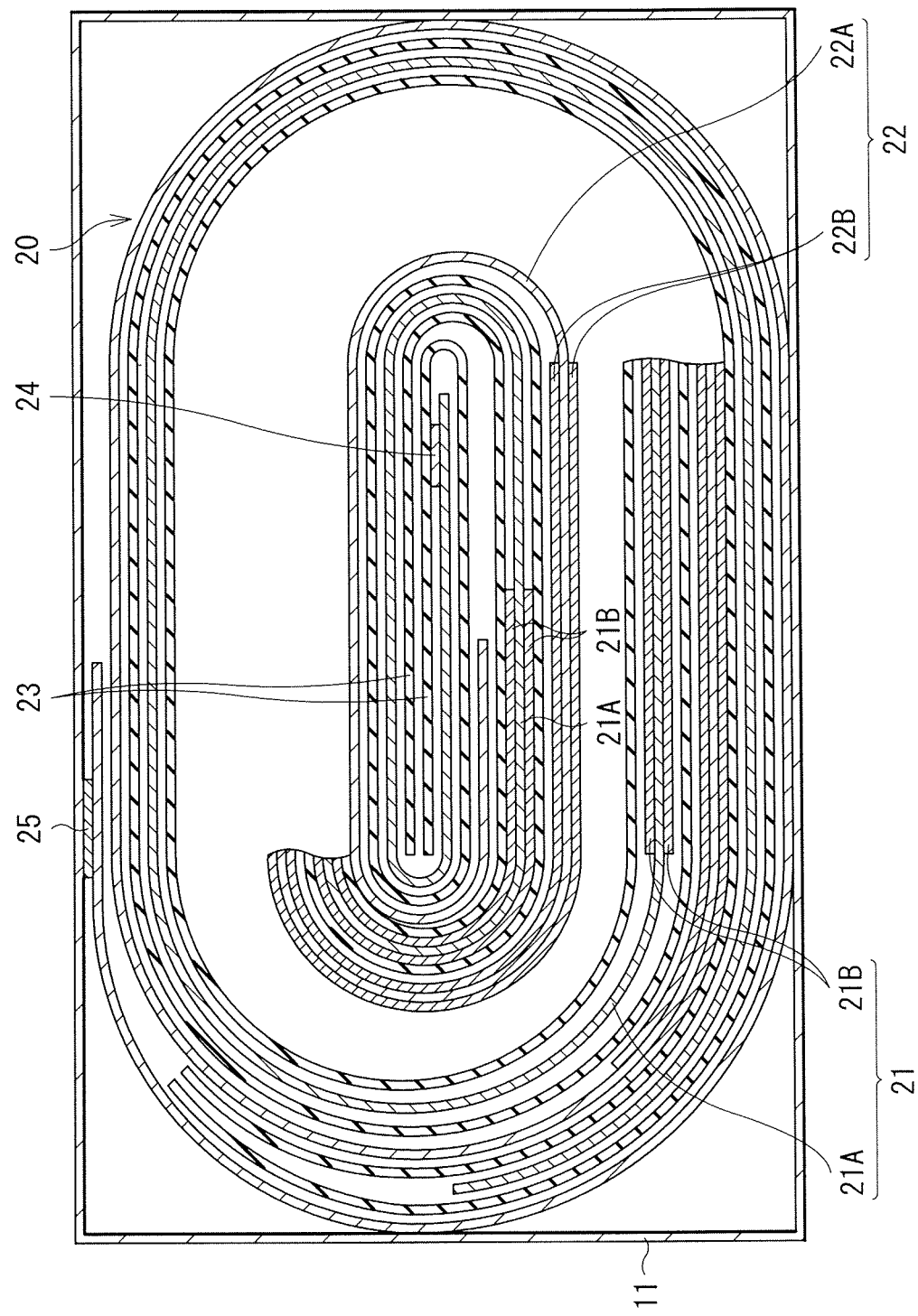
FIG. 3 is a cross-sectional view of the secondary battery taken along a line III-III illustrated in FIG. 2.
Figure 4:
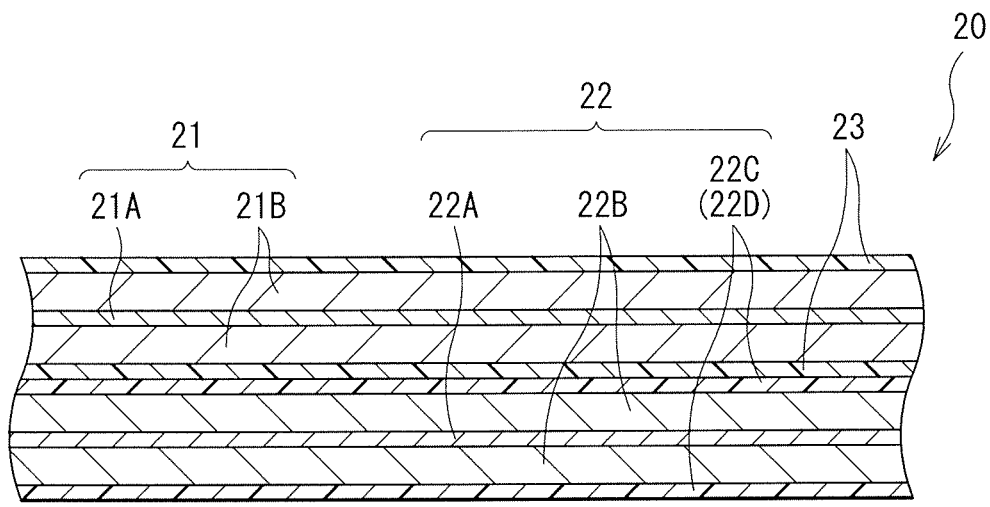
FIG. 4 is a cross-sectional view illustrating enlarged part of a battery device illustrated in FIG. 3.
Figure 5:
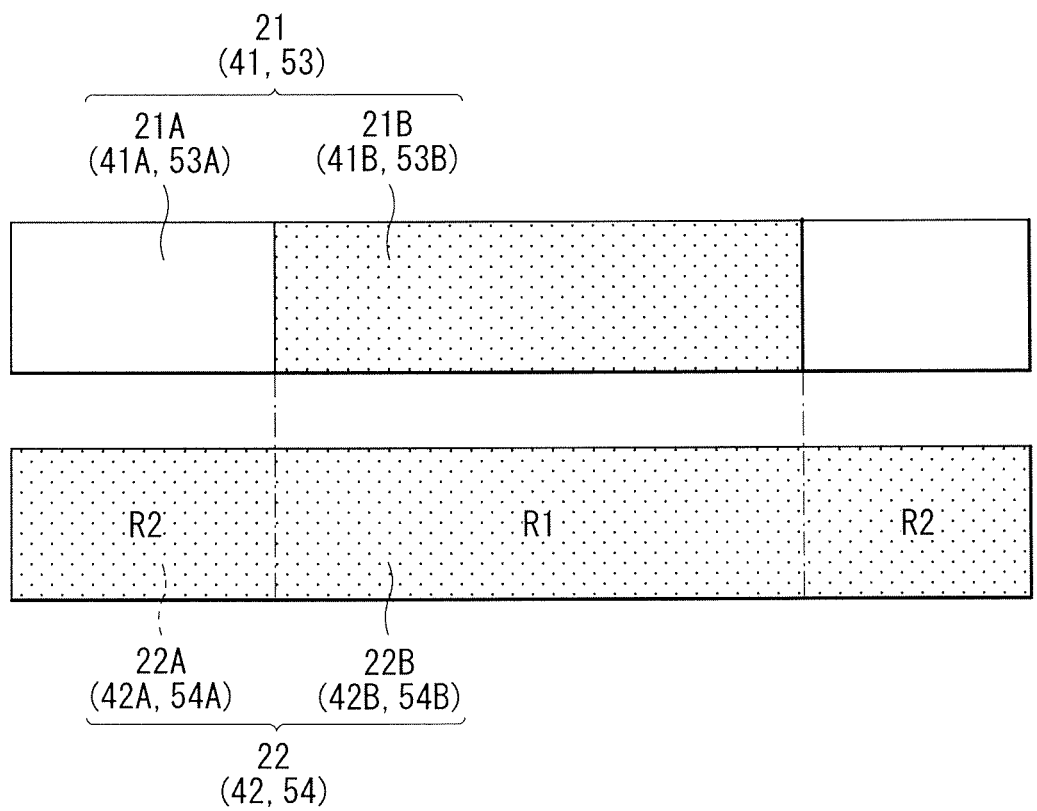
FIG. 5 is a plan view schematically illustrating a configuration of a cathode and an anode illustrated in FIG. 4.

FIGS. 2 and 3 each illustrate a cross-sectional configuration of the secondary battery. FIG. 3 illustrates a cross-section of the secondary battery taken along a line III-III illustrated in FIG. 2. FIG. 4 illustrates enlarged part of a battery device 20 illustrated in FIG. 3. FIG. 5 schematically illustrates a planar configuration of a cathode 21 and the anode 22 illustrated in FIG. 4.

[General Configuration of Secondary Battery]

The secondary battery described below may be, for example, a lithium secondary battery (lithium ion secondary battery) in which battery capacity of the anode 22 is obtainable by insertion and extraction of lithium (lithium ion) that is the electrode reactant.

The secondary battery is a so-called square-type secondary battery, in which the battery device 20 may be contained inside a battery can 11 as illustrated in FIGS. 2 and 3, for example. The battery device 20 may be configured of the cathode 21 and the anode 22 that are laminated and spirally wound with a separator 23 in between, for example. The battery device 20 may have a flat shape in accordance with a shape of the battery can 11, for example. The separator 23 is impregnated with the electrolytic solution that is a liquid electrolyte.

The battery can 11 is a square-type outer package member. As illustrated in FIG. 3, a shape of a cross-section of the square-type outer package member in a longitudinal direction thereof may be a rectangular shape or an almost rectangular shape (including a curved line in part thereof). The shape of the cross-section thereof is not limited to the rectangular shape, and may be an oval shape. Specifically, the square-type outer package member may be a container-like member of a rectangular shape type having a base or of an oval shape type having a base that has an opening of a rectangular shape or an almost rectangular shape (oval shape) configured of arcs and straight lines connecting the arcs. It is to be noted that FIG. 3 illustrates a case where the battery can 11 has a cross-sectional shape of the rectangular shape type.

The battery can 11 may be formed, for example, of one or more conductive materials such as iron (Fe), aluminum (Al), and alloy thereof. The battery can 11 may serve as an electrode terminal in some cases. In particular, in order to suppress swollenness of the battery can 11 by utilizing rigidity (characteristics of being less likely to transform) at the time of charge and discharge operations, iron, etc. that are more rigid than aluminum may be preferable. It is to be noted that, when the battery can 11 is made of iron, the surface of the battery can 11 may be plated with a metal material such as nickel.

The battery can 11 has a hollow structure having one end that is open and the other end that is closed. The battery can 11 is hermetically sealed by an insulating plate 12 and a battery cover 13 that are attached to the open end. The insulating plate 12 is arranged between the battery device 20 and the battery cover 13. The insulating plate 12 may be formed, for example, of an insulating material such as polypropylene. The battery cover 13 may be formed of a material similar to the material of the battery can 11, and may serve as an electrode terminal as with the battery can 11, for example.

A terminal plate 14 to be a cathode terminal is provided outside the battery cover 13. The terminal plate 14 is electrically insulated from the battery cover 13 with an insulating case 16 in between. The insulating case 16 may be formed, for example, of an insulating material such as polybutylene terephthalate. A through hole is provided almost in the middle of the battery cover 13. A cathode pin 15 is so inserted in the through hole that the cathode pin 15 is electrically connected to the terminal plate 14 and is electrically insulated from the battery cover 13 with a gasket 17 in between. The gasket 17 may be formed, for example, of an insulating material. A surface of the gasket 17 may be coated with asphalt, for example.

A cleavage valve 18 and an injection hole 19 are provided near periphery of the battery cover 13. The cleavage valve 18 is electrically connected to the battery cover 13. When an internal pressure of the battery becomes a certain level or higher because of internal short-circuit, heating from outside, etc., the cleavage valve 18 is cut to be separated from the battery cover 13 and cause the internal pressure to be released. The injection hole 19 may be blocked by a sealing member 19A, for example. The sealing member 19A may be a stainless steel ball, for example.

A cathode lead 24 formed of a conductive material such as aluminum is attached to an end (for example, an inner terminal end) of the cathode 21, and an anode lead 25 formed of a conductive material such as nickel is attached to an end (for example, an outer terminal end) of the anode 22. The cathode lead 24 is attached to an end of the cathode pin 15, and is electrically connected to the terminal plate 14. The anode lead 25 is attached to the battery can 11, and is electrically connected to the battery can 11.

[Cathode]

As illustrated in FIG. 4, the cathode 21 may have a cathode active material layer 21B on one surface or both surfaces of a cathode current collector 21A, for example. The cathode current collector 21A may be formed, for example, of one or more conductive materials such as aluminum, nickel, and stainless steel.

The cathode active material layer 21B includes, as a cathode active material, one or more of cathode materials that are capable of inserting and extracting lithium.

It is to be noted that the cathode active material layer 21B may further include one or more of other materials such as a cathode binder and a cathode conductor. Details of the cathode binder and the cathode conductor may be similar to the details of the binder and the conductor described above, respectively, for example.

The cathode material may be preferably a lithium-containing compound, and more specifically, may be preferably a lithium-containing composite oxide, a lithium-containing phosphate compound, or both, because high energy density is achieved thereby.

"Lithium-containing composite oxide" is an oxide that includes lithium and one or more elements (hereinafter, referred to as "other elements", and excluding lithium) as constituent elements. The lithium-containing composite oxide may have a rock-salt crystal structure or a spinel crystal structure, for example. "Lithium-containing phosphate compound" is a phosphate compound that includes lithium and one or more other elements as constituent elements. The lithium-containing phosphate compound may have an olivine crystal structure, for example.

The types of other elements are not particularly limited as long as the other elements are one or more arbitrary elements. In particular, other elements may be preferably one or more of elements that belong to Groups 2 to 15 in the long form of periodic table. More specifically, other elements may be more preferably one or more metal elements of nickel (Ni), cobalt (Co), manganese (Mn), and iron (Fe), because a high voltage is achieved thereby.

In particular, the lithium-containing composite oxide having a rock-salt crystal structure may be preferably one or more of compounds represented by respective Formulas (21) to (23).

$$Li_aMn_{(1-b-c)}Ni_bM11_cO_{(2-d)}Fe \quad (21)$$

(M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy $0.8 \leq a \leq 1.2$, $0 < b < 0.5$, $0 \leq c \leq 0.5$, $(b+c) \leq 1$, $-0.1 \leq d \leq 0.2$, and $0 \leq e \leq 0.1$. It is to be noted that a composition of lithium differs depending on a charge-discharge state, and a is a value in a completely-discharged state.)

$$Li_aNi_{(1-b)}M12_bO_{(2-c)}F_d \quad (22)$$

(M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0.005 \leq b \leq 0.5$, $-0.1 \leq c \leq 0.2$, and $0 \leq d \leq 0.1$. It is to be noted that a composition of lithium differs depending on a charge-discharge state, and a is a value in a completely-discharged state.)

$$Li_aCo_{(1-b)}M13_bO_{(2-c)}F_d \quad (23)$$

(M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0 \leq b \leq 0.5$, $-0.1 \leq c \leq 0.2$, and $0 \leq d \leq 0.1$. It is to be noted that a composition of lithium differs depending on a charge-discharge state, and a is a value in a completely-discharged state.)

Specific examples of the lithium-containing composite oxide having a rock-salt crystal structure may include $LiNiO_2$, $LiCoO_2$, $LiCO_{0.98}Al_{0.01}Mg_{0.01}O_2$, $LiNi_{0.5}Co_{0.2}Mn_{0.3}O_2$, $LiNi_{0.8}CO_{0.15}Al_{0.05}O_2$, $LiNi_{0.33}CO_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

The lithium-containing composite oxide having a spinel crystal structure may be preferably one or more of compounds represented by Formula (24).

$$Li_aMn_{(2-b)}M14_bO_cF_d \quad (24)$$

(M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 \leq a \leq 1.1$, $0 \leq b \leq 0.6$, $3.7 \leq c \leq 4.1$, and $0 \leq d \leq 0.1$. It is to be noted that a composition of lithium differs depending on a charge-discharge state, and a is a value in a completely-discharged state.)

Specific examples of the lithium-containing composite oxide having a spinel crystal structure may include $LiMn_2O_4$.

The lithium-containing phosphate compound having an olivine crystal structure may be preferably one or more of compounds represented by Formula (25).

$$Li_aM15PO_4 \quad (25)$$

(M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \leq a \leq 1.1$. It is to be noted that a composition of lithium differs depending on a charge-discharge state, and a is a value in a completely-discharged state.)

Specific examples of the lithium-containing phosphate compound having an olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be one or more of compounds represented by Formula (26).

$$(Li_2MnO_3)_x(LiMnO_2)_{1-x} \quad (26)$$

(x satisfies $0 \leq x \leq 1$. It is to be noted that a composition of lithium differs depending on a charge-discharge state, and x is a value in a completely-discharged state.)

Other than the above-mentioned materials, the cathode material may be, for example, one or more of oxides, disulfides, chalcogenides, conductive polymers, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material may be a material other than the above-mentioned materials.

[Anode]

As illustrated in FIG. 4, the anode 22 may have anode active material layers 22B and coating films 22C on both surfaces of an anode current collector 22A, for example. Configurations of the anode current collector 22A and the anode active material layer 22B may be similar to the configurations of the current collector 1 and the active material layer 2 described above, respectively.

It is to be noted that, in order to prevent lithium metal from being unintentionally precipitated on the anode 22 in the middle of a charge operation, chargeable capacity of the anode material may be preferably larger than discharge capacity of the cathode 21. Specifically, an electrochemical equivalent of the anode material that is capable of inserting and extracting the electrode reactant may be preferably larger than an electrochemical equivalent of the cathode 21.

The coating film 22C may be provided on the anode active material layer 22B. However, it is enough that the coating film 22C covers at least part of the anode active material layer 22B. Specifically, the coating film 22C may cover all of the surface of the anode active material layer 22B, or may cover only part of the surface of the anode active material layer 22B. It is to be noted that, in the case where the coating film 22C covers part of the anode active material layer 22B, a plurality of coating films 22C may be present on the surface of the anode active material layer 22B.

The coating film 22C has a function of chemically protecting the anode active material layer 22B in order to chemically stabilize the anode 22. In detail, because the anode active material layer 22B includes a highly-reactive anode active material, when the anode active material is activated at the time of charge and discharge operations, the anode active material is made easier to react with the electrolytic solution. When the anode active material reacts with the electrolytic solution, a decomposition reaction of the electrolytic solution is accelerated. This results in easier decrease in battery characteristics of the secondary battery. However, when the anode active material layer 22B is covered with the coating film 22C, the anode active material layer 22B is chemically protected by the coating film 22C. This suppresses the decomposition reaction of the electrolytic solution. Further, because the coating film 22C has characteristics that allow lithium to pass therethrough smoothly, insertion and extraction of lithium are less likely to be prevented at the time of charge and discharge operations even when the anode active material layer 22B is covered with the coating film 22C. As a result, battery characteristics of the secondary battery are improved.

In order to ensure the protection function of the coating film 22C, physical characteristics of the anode 22 satisfy the three physical characteristic conditions described above. Details of the three physical characteristic conditions have been already described, and therefore are not described below. In the case where the coating film 22C is provided on the anode active material layer 22B, the photoelectron spectrum (O1s) related to the first condition described above is obtained from an analysis of the coating film 22C.

A material of forming the coating film 22C is not particularly limited as long as the material is allowed to satisfy the three physical characteristic conditions as described above.

In particular, the coating film 22C may preferably include a polymer compound, and the polymer compound may preferably include one or more oxygen (O) atoms in a repeating unit thereof. One reason for this is because physical and chemical strength of the coating film 22C are improved thereby, and the first condition described above, that is, the condition related to the photoelectron spectrum (O1s) is satisfied more easily.

In particular, the polymer compound may preferably include one or more carbonate bonds (—O—C(=O)—O—) in the repeating unit thereof, because the protection function of the coating film 22C is further improved thereby.

Specifically, the polymer compound that may include one or more carbonate bonds in the repeating unit thereof may include, for example, one or more of compounds represented by the following respective Formulas (1) to (4). It is to be noted that the kind of a group at the terminal in the compounds represented by the respective Formulas (1) to (4) is not particularly limited. The group at the terminal may be, for example, a hydrogen group, a hydrocarbon group such as an alkyl group, or other group.

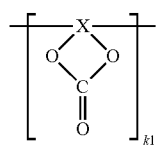
(1)

(X is a divalent group obtained by bonding one ≡C—CH$_2$—, m-number of >C=CR1R2, and n-number of >CR3R4 in arbitrary order. Each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof. Arbitrary two or more of R1 to R4 may be bonded to one another. k1, m, and n are integers that satisfy k1≥1, m≥0, and n≥0, respectively.)

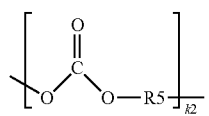
(2)

(R5 is one of a divalent hydrocarbon group, a divalent oxygen-containing hydrocarbon group, a divalent halogenated hydrocarbon group, a divalent halogenated oxygen-containing hydrocarbon group, and a group obtained by bonding two or more thereof. k2 is an integer that satisfies k2≥1.)

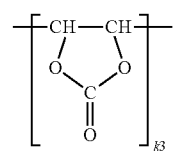
(3)

(k3 is an integer that satisfies k3≥1.)

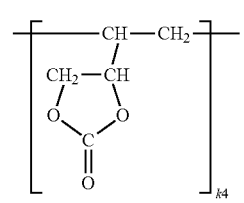
(4)

(k4 is an integer that satisfies k4≥1.)

Each of the compounds represented by the respective Formulas (1), (3), and (4) is a compound (hereinafter, referred to as "cyclic carbonate compound") in which the repeating unit thereof has a cyclic structure. Hereinafter, in order to distinguish the series of cyclic carbonate compounds from one another, the compound represented by Formula (1) is referred to as "first cyclic carbonate compound", the compound represented by Formula (3) is referred to as "second cyclic carbonate compound", and the compound represented by Formula (4) is referred to as "third cyclic carbonate compound".

On the other hand, the carbonate compound represented by Formula (2) is a compound (hereinafter, referred to as "chain carbonate compound") in which the repeating unit thereof has a chain structure.

It is to be noted that the cyclic carbonate compound and the chain carbonate compound are also collectively and simply referred to as "carbonate compound".

X in Formula (1) is a group that is obtained by bonding one ≡C—CH$_2$—, m-number of >C=CR1R2, and n-number of >CR3R4 so that the group becomes divalent as a whole. In other words, X in Formula (1) is a group that is obtained by bonding the above-mentioned groups so that the group has a portion that is allowed to be bonded to another group on each of the both terminal ends. "≡" represents trivalent, ">" represents divalent, and "-" represents monovalent. Adjacent groups (groups to be bonded to each other) may be the same group as >C=CR1R2 and >C=CR1R2, or may be different groups as a combination of ≡C—CH$_2$— and >C=CR1R2. Each of the number (m) of >C=CR1R2 and the number (n) of >CR3R4 used for forming a divalent group may be arbitrary. Also, the order of bonding ≡C—CH$_2$—, >C=CR1R2, and >CR3R4 may be arbitrary.

≡C—CH$_2$— is obtained by cutting one carbon-carbon bond in >CH=CH$_2$ that has two carbon-carbon bonds, and a plurality of repeating units are caused to be a polymer by bonding ≡C—CH$_2$— to ≡C—CH$_2$— that are adjacent to each other. >C=CR1R2 is a divalent unsaturated group that has a carbon-carbon double bond, and >CR3R4 is a divalent saturated group that has no carbon-carbon double bond.

The value of each of m and n is not particularly limited as long as the value thereof is an integer that is 0 or larger. In this case, m≥0 and n≥0 are established. Accordingly, each of >C=CR1R2 that is an unsaturated group and >CR3R4 that is a saturated group may be included in X, or may not be included in X. Specifically, X may be configured of only ≡C—CH$_2$—, may be configured of ≡C—CH$_2$— and >C=CR1R2, may be configured of ≡C—CH$_2$— and >CR3R4, or may be configured of ≡C—CH$_2$—, >C=CR1R2, and >CR3R4. One reason for this is because it is necessary for X to include ≡C—CH$_2$— that is necessary for forming a polymer, but it is not necessary for X to include >C=CR1R2 and >CR3R4 that are not necessary for forming a polymer.

The value of k1 that represents the number of the repeating units is not particularly limited as long as the value thereof is an integer of 1 or larger. However, in order to ensure physical and chemical strength of the coating film 22C, etc., the value of k1 may be preferably as large as possible.

It is to be noted that arbitrary two or more of R1 to R4 in >C=CR1R2 and >CR3R4 may be bonded to one another, and the bonded groups may form a ring. To give an example, R1 and R2 may be bonded to each other, R3 and R4 may be bonded to each other, or R2 and R3 or R4 may be bonded to each other.

Details of R1 to R4 are as follows. It is to be noted that R1 to R4 may be the same group or may be different groups. Also, arbitrary two or three of R1 to R4 may be the same group.

The kind of each of R1 to R4 is not particularly limited as long as the kind thereof is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof. One reason for this is because the protection function of the coating film 22C is achievable irrespective of the kinds of R1 to R4.

The halogen group may be, for example, one of a fluorine group (—F), a chlorine group (—Cl), a bromine group (—Br), and an iodine group (—I). In particular, the halogen group may be preferably a fluorine group, because a higher effect is achieved thereby. It is to be noted that the kind of the halogen group may be only one kind, or may be two or more kinds.

"Monovalent hydrocarbon group" is a collective term of a monovalent group that is configured of carbon (C) and hydrogen (H). The monovalent hydrocarbon group may be linear, or may be branched to have one or more side chains. Examples of the monovalent hydrocarbon group may include an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, and a cycloalkyl group having carbon number from 3 to 18 both inclusive.

More specifically, examples of the alkyl group may include a methyl group (—CH$_3$), an ethyl group (—C$_2$H$_5$), and a propyl group (—C$_3$H$_7$). Examples of the alkenyl group may include a vinyl group (—CH=CH$_2$) and an allyl group (—CH$_2$—CH=CH$_2$). Examples of the alkynyl group may include an ethynyl group (—C≡CH). Examples of the aryl group may include a phenyl group and a naphthyl group. Examples of the cycloalkyl group may include a cyclopropyl group, a cyclobutyl group, a cyclopentyl group, a cyclohexyl group, a cycloheptyl group, and a cyclooctyl group.

"Monovalent oxygen-containing hydrocarbon group" is a collective term of a monovalent group that is configured of carbon, hydrogen, and oxygen (O). Examples of the monovalent oxygen-containing hydrocarbon group may include an alkoxy group having carbon number from 1 to 12 both inclusive. More specifically, examples of the alkoxy group may include a methoxy group (—OCH$_3$) and an ethoxy group (—OC$_2$H$_5$).

"Monovalent halogenated hydrocarbon group" is a group obtained by substituting one or more halogen groups for one or more hydrogen groups (—H) in the monovalent hydrocarbon group described above. In other words, the monovalent halogenated hydrocarbon group is a group obtained by halogenating the monovalent hydrocarbon group described above. Similarly, "monovalent halogenated oxygen-containing hydrocarbon group" is a group obtained by substituting one or more halogen groups for one or more hydrogen groups in the monovalent oxygen-containing hydrocarbon group described above. In either of the cases, the kind of the halogen group that is substituted for a hydrogen group is similar to the kind of the halogen group described above. It is to be noted that the kind of the halogen group may be only one kind, or may be two or more kinds.

The monovalent halogenated hydrocarbon group may be, for example, a group obtained by halogenating the alkyl group or the like described above, that is, a group obtained by substituting one or more halogen groups for one or more hydrogen groups in the alkyl group or the like described above. More specifically, examples of the group obtained by halogenating the alkyl group or the like described above may include a trifluoromethyl group (—CF$_3$) and a pentafluoroethyl group (—C$_2$F$_5$). The monovalent halogenated oxygen-containing hydrocarbon group may be, for example, a group obtained by substituting one or more halogen groups for one or more hydrogen groups in the alkoxy group or the like described above. More specifically, examples of the group obtained by halogenating the alkoxy group or the like described above may include a trifluoromethoxy group (—OCF$_3$) and a pentafluoroethoxy group (—OC$_2$F$_5$).

"Group obtained by bonding two or more thereof" may be, for example, a group that is obtained by bonding two or more of the series of groups described above so that the group becomes monovalent as a whole. Examples of the group obtained by bonding two or more thereof may include a group obtained by bonding the alkyl group and the aryl group to each other, and a group obtained by bonding the alkyl group and the cycloalkyl group to each other. More specifically, examples of the group obtained by bonding the alkyl group and the aryl group to each other may include a benzyl group.

It is to be noted that each of R1 to R4 may be a group other than the groups described above. Specifically, each of R1 to R4 may be, for example, a derivative of one of the series of groups described above. "Derivative" is a group that is obtained by introducing one or more substituents to one of the series of groups described above. The kind of the substituent may be arbitrary.

The kind of R5 in Formula (2) is not particularly limited as long as the kind thereof is one of a divalent hydrocarbon group, a divalent oxygen-containing hydrocarbon group, a divalent halogenated hydrocarbon group, a divalent halogenated oxygen-containing hydrocarbon group, and a group obtained by bonding two or more thereof. One reason for this is because the protection function of the coating film 22C is achievable irrespective of the kind of R5. Details of k2 that represents the number of repeating units are similar to the details of k1 described above.

"Divalent hydrocarbon group" is a collective term of a divalent group that is configured of carbon and hydrogen. The divalent hydrocarbon group may be linear, or may be branched to have one or more side chains. Examples of the divalent hydrocarbon group may include an alkylene group having carbon number from 1 to 12 both inclusive, an alkenylene group having carbon number from 2 to 12 both inclusive, an alkynylene group having carbon number from 2 to 12 both inclusive, an arylene group having carbon number from 6 to 18 both inclusive, and a cycloalkylene group having carbon number from 3 to 18 both inclusive.

More specifically, examples of the alkylene group may include a methylene group (—$CH_2$—), an ethylene group (—$C_2H_4$—), and a propylene group (—$C_3H_6$—). Examples of the alkylene group may include a vinylene group (—CH=CH—). Examples of the alkynylene group may include an ethynylene group (—C≡C—). Examples of the arylene group may include a phenylene group. Examples of the cycloalkylene group may include a cyclopropylene group and a cyclobutylene group.

"Divalent oxygen-containing hydrocarbon group" is a collective term of a divalent group that is configured of carbon, hydrogen, and oxygen. The divalent oxygen-containing hydrocarbon group may be, for example, a group obtained by bonding one or more divalent hydrocarbon groups and one or more oxygen bonds (—O—) in an arbitrary order, or the like. More specifically, examples of the divalent oxygen-containing hydrocarbon group may include a group obtained by bonding one alkylene group and an oxygen bond, and a group obtained by bonding two alkylene groups to each other with an oxygen bond in between.

"Divalent halogenated hydrocarbon group" is a group obtained by substituting one or more halogen groups for one or more hydrogen groups in the divalent hydrocarbon group described above. "Divalent halogenated oxygen-containing hydrocarbon group" is a group obtained by substituting one or more halogen groups for one or more hydrogen groups in the monovalent oxygen-containing hydrocarbon group described above. In either of the cases, details of the halogen group that is substituted for a hydrogen group may be similar to the details of the halogen group described above, for example.

The divalent halogenated hydrocarbon group may be, for example, a group obtained by halogenating the alkylene group or the like described above, that is, a group obtained by substituting one or more halogen groups for one or more hydrogen groups in the alkylene group or the like described above. More specifically, examples of the group obtained by halogenating the alkylene group or the like described above may include a difluoromethyl group (—$CF_2$—). The divalent halogenated oxygen-containing hydrocarbon group may be, for example, a group obtained by substituting one or more halogen groups for one or more hydrogen groups in the group obtained by bonding the alkylene group and the oxygen bond or the like described above. More specifically, examples of the group obtained by halogenating the group obtained by bonding the alkylene group and the oxygen group or the like described above may include —$CF_2$—O—$CF_2$—.

"Group obtained by bonding two or more thereof" may be, for example, a group obtained by bonding two or more of the series of groups described above to one another so that the group becomes divalent as a whole. Examples of the group obtained by bonding two or more thereof may include a group obtained by bonding the alkylene group and the arylene group to each other, and a group obtained by bonding the alkylene group and the cycloalkylene group to each other. More specifically, examples of the group obtained by bonding the alkylene group and the arylene group to each other may include a benzylidene group.

It is to be noted that R5 may be a group other than the groups described above. Specifically, R5 may be, for example, a derivative of one of the series of groups described above. "Derivative" is a group that is obtained by introducing one or more substituents to one of the series of groups described above. The kind of the substituent may be arbitrary.

In each of Formulas (3) and (4), details of k3 and k4 that each represent the number of repeating units may be similar to the details of k1 described above.

The first cyclic carbonate compound may preferably include a compound represented by the following Formula (5), because synthesis thereof is allowed to be performed easily and stably.

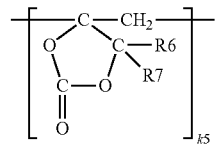

(5)

(Each of R6 and R7 is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by bonding two or more thereof. R6 and R7 may be bonded to each other. k5 is an integer that satisfies k5≥1.)

The compound represented by Formula (5) is a compound in which X represented by Formula (1) includes one ≡C—$CH_2$— and one >CR3R4 (>CR6R7 in Formula (5)). R6 and R7 may be the same group, or may be different groups. The kind of each of R6 and R7 is not particularly limited as long as the kind thereof is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by bonding two or more thereof. One reason for this is because the protection function of the coating film 22C is achievable irrespective of the kinds of R6 and R7. Details of k5 that represents the number of repeating units may be similar to the details of k1 described above. Other details of R6 and R7 may be similar to the details of R1 to R4 described above.

Specific examples of the first cyclic carbonate compound represented by Formula (1), more specifically, of the compound represented by Formula (5) may include one or more of compounds represented by the following respective Formulas (5-1) to (5-13). It is to be noted that the specific example thereof may be other compound that satisfies the condition shown in Formula (5).

(5-1) 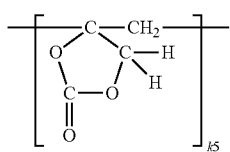
(5-2) 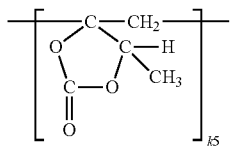
(5-3) 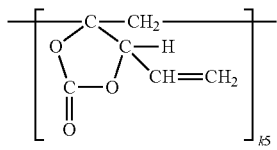
(5-4) 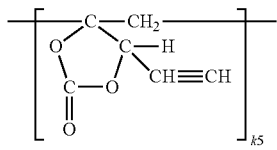
(5-5) 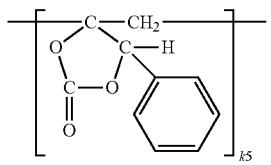
(5-6) 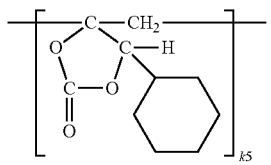
(5-7) 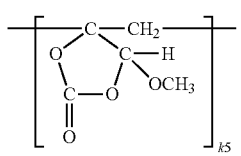
(5-8) 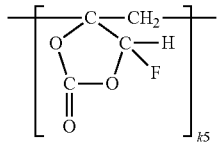
(5-9) 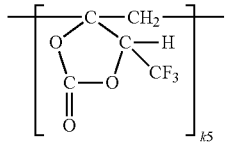
(5-10) 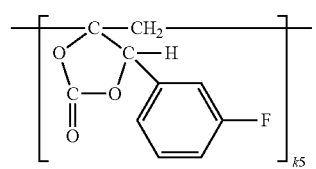
(k5 is an integer that satisfies k5≥1.)
(5-11) 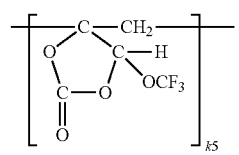
(5-12) 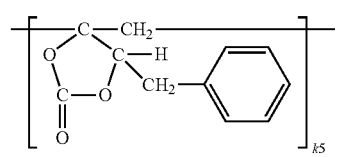
(5-13) 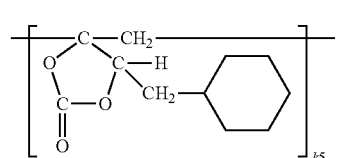
(k5 is an integer that satisfies k5≥1.)
Specific examples of the chain carbonate compound represented by Formula (2) may include one or more of compounds represented by the following respective Formulas (2-1) to (2-9). It is to be noted that the specific example thereof may be other compound that satisfies the condition shown in Formula (2).
(2-1) 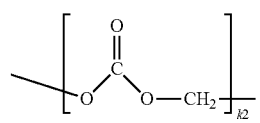
(2-2) 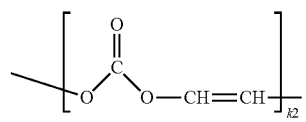
(2-3)
(2-4)
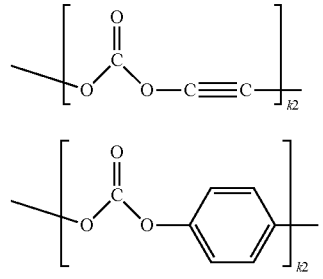

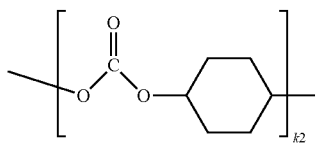

(2-5)

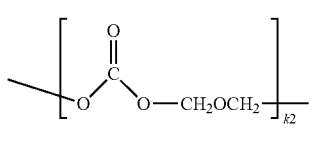

(2-6)

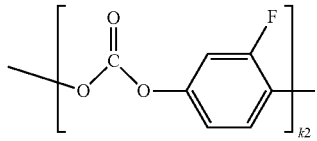

(2-7)

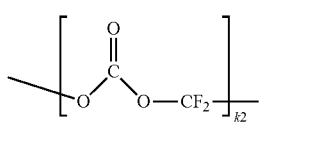

(2-8)

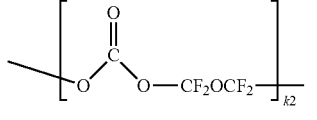

(2-9)

(k2 is an integer that satisfies k2≥1.)

In particular, as the carbonate compound, the first cyclic carbonate compound and the chain carbonate compound may be preferable than the second cyclic carbonate compound and the third cyclic carbonate compound, because a higher effect is achieved thereby.

An average molecular weight (weight average molecular weight) of the carbonate compound is not particularly limited, but may be preferably as large as possible, because physical and chemical strength of the coating film 22C is improved thereby. Specifically, the average molecular weight of the carbonate compound may be preferably from about 50000 to about 100000 both inclusive, for example.

In the secondary battery in this example, as described above, the electrochemical equivalent of the anode material capable of inserting and extracting lithium may be preferably larger than the electrochemical equivalent of the cathode in order to prevent lithium metal from being unintentionally precipitated on the anode 22 in the middle of the charge operation. In this case, when an open circuit voltage (that is, a battery voltage) at the time of completely-charged state is 4.25 V or higher, an extraction amount of lithium per unit mass is larger than that in a case where the open circuit voltage is 4.20 V even if the same cathode active material is used. Accordingly, the amounts of the cathode active material and the anode active material are adjusted. Thus, high energy density is achievable.

It is to be noted that, as illustrated in FIG. 5, the cathode active material layer 21B may be provided on part (a middle region in a longitudinal direction, for example) of the surface of the cathode current collector 21A in the cathode 21, for example. In contrast, the anode active material layer 22B may be provided on the entire surface of the anode current collector 22A in the anode 22, for example. Accordingly, the anode active material layer 22B may include a region (opposing region R1) opposing the cathode active material layer 21B and a region (non-opposing region R2) not opposing the cathode active material layer 21B. In this case, out of the anode active material layer 22B, a portion provided in the opposing region R1 contributes to charge and discharge operations, but a portion provided in the non-opposing region R2 contributes little to charge and discharge operations. It is to be noted that each of the cathode active material layer 21B and the anode active material layer 22B are hatched in FIG. 5.

As described above, it is necessary that the three physical characteristic conditions are satisfied concerning the anode 22; however, when lithium is inserted or extracted at the anode 22 at the time of charge and discharge operations, the state (physical characteristics) of the anode 22 may vary from the state (the state in which no charge or discharge operation has been performed) at the time of formation of the anode 22. However, the non-opposing region R2 is influenced little by charge and discharge operations, and the physical characteristics of the anode 22 are therefore maintained in the non-opposing region R2.

For this reason, concerning the first condition related to XPS out of the three physical characteristic conditions, the anode 22 may be analyzed in either of the opposing region R1 or the non-opposing region R2; however, it may be preferable that the anode 22 be analyzed in the opposing region R1, in particular. On the other hand, concerning the second and third conditions related to RS, the anode 22 may be analyzed in either of the opposing region R1 or the non-opposing region R2; however, it may be preferable that the anode 22 be analyzed in the non-opposing region R2, in particular. One reason for this is because it is possible to examine whether or not the three physical characteristic conditions are satisfied concerning the anode 22 accurately with favorable reproducibility, irrespective of history of charge and discharge operations (such as whether charge or discharge operation has been performed and the number of charge and discharge operations).

[Separator]

The separator 23 separates the cathode 21 from the anode 22, and allows lithium ions to pass therethrough while preventing current short circuit resulting from contact of the both electrodes. The separator 23 may be, for example, a porous film made of a material such as synthetic resin or ceramic. The separator 23 may be a laminated film in which two or more porous films are laminated. Examples of the synthetic resin may include polytetrafluoroethylene, polypropylene, and polyethylene.

In particular, the separator 23 may include, for example, the porous film (base material layer) described above and a polymer compound layer provided on one surface or both surfaces of the base material layer. One reason for this is because close-attachment characteristics of the separator 23 with respect to each of the cathode 21 and the anode 22 are improved, and skewness of the battery device 20 is therefore suppressed. Accordingly, a decomposition reaction of the electrolytic solution is suppressed, and liquid leakage of the electrolytic solution with which the base material layer is impregnated is suppressed. As a result, resistance is made less likely to be increased even if charge and discharge operations are performed repeatedly, and swollenness of the battery is suppressed.

The polymer compound layer may include, for example, a polymer material such as polyvinylidene fluoride, because such a polymer compound has superior physical strength and is electrochemically stable. It is to be noted that the polymer material may be a material other than polyvinylidene fluoride. When forming such a polymer compound layer, for example, solution in which the polymer material is dissolved may be applied onto the base material layer, and then the base material layer may be dried. Alternatively, the base material layer may be dipped in the solution and may be subsequently dried.

[Electrolytic Solution]

The battery device 20 is impregnated with electrolytic solution that is a liquid electrolyte. The electrolytic solution includes a solvent and an electrolyte salt. It is to be noted that the electrolytic solution may further include one or more of other materials such as an additive.

The solvent includes one or more of non-aqueous solvents such as an organic solvent. The electrolytic solution that includes the non-aqueous solvent is so-called non-aqueous electrolytic solution.

Examples of the solvent may include cyclic ester carbonate, chain ester carbonate, lactone, chain carboxylic ester, and nitrile, because superior battery capacity, superior cycle characteristics, superior conservation characteristics, etc. are achieved thereby. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methyl propyl carbonate. Examples of the lactone may include γ-butyrolactone and γ-valerolactone. Examples of the chain carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

Other than the above, the solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethylsulfoxide, or the like, because a similar advantage is achieved thereby.

In particular, one or more of ethylene carbonate, propylene carbonate, dimethyl carbonate, diethyl carbonate, and ethyl methyl carbonate may be preferable, because further superior battery capacity, further superior cycle characteristics, further superior conservation characteristics, etc. are achieved thereby. In this case, a combination of a high viscosity (high dielectric constant) solvent (for example, specific dielectric constant ε≥30) such as ethylene carbonate or propylene carbonate and a low viscosity solvent (for example, viscosity≤1 mPa·s) such as dimethyl carbonate, ethyl methyl carbonate, or diethyl carbonate may be more preferable. One reason for this is because dissociation characteristics of the electrolyte salt and ion mobility are improved thereby.

In particular, the solvent may be one or more of unsaturated cyclic ester carbonate, halogenated ester carbonate, sultone (cyclic sulfonic ester), acid anhydride, and the like. One reason for this is because chemical stability of the electrolytic solution is improved thereby. The unsaturated cyclic ester carbonate is cyclic ester carbonate that includes one or more unsaturated bonds (carbon-carbon double bonds). The unsaturated cyclic ester carbonate may be, for example, one or more of compounds (unsaturated cyclic compounds) represented by respective Formulas (6) to (8) described later. Details of the unsaturated cyclic compounds are described later. The halogenated ester carbonate is cyclic or chain ester carbonate that includes one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis (fluoromethyl) carbonate, and difluoromethyl methyl carbonate. Examples of the sultone may include propane sultone and propene sultone. Examples of the acid anhydride may include succinic anhydride, ethane disulfonic anhydride, and sulfobenzoic anhydride. However, the solvent may be a material other than those described above.

The electrolyte salt may include, for example, one or more of salts such as lithium salt. However, the electrolyte salt may include, for example, salt other than the lithium salt. Examples of "salt other than the lithium salt" may include a salt of light metal other than lithium.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), because superior battery capacity, superior cycle characteristics, superior conservation characteristics, etc. are achieved thereby.

In particular, one or more of $LiPF_6$, $LiBF_4$, $LiClO_4$, and $LiAsF_6$ may be preferable, and $LiPF_6$ may be more preferable, because the internal resistance is thereby lowered, which results in achievement of a higher effect. However, the electrolyte salt may be a salt other than those described above.

A content of the electrolyte salt is not particularly limited, but in particular, may be preferably from about 0.3 mol/kg to about 3.0 mol/kg both inclusive with respect to the solvent, because high ion conductivity is achieved thereby.

[Operation of Secondary Battery]

The secondary battery in this example may operate, as follows, for example.

At the time of a charge operation, lithium ions are extracted from the cathode 21 and the extracted lithium ions are inserted in the anode 22 through the electrolytic solution. On the other hand, at the time of a discharge operation, lithium ions are extracted from the anode 22 and the extracted lithium ions are inserted in the cathode 21 through the electrolytic solution.

[Method of Manufacturing Secondary Battery]

The secondary battery may be manufactured by the following procedure, for example.

When fabricating the cathode 21, the cathode active material is mixed with the cathode binder, the cathode conductor, and the like to obtain a cathode mixture. Subsequently, the cathode mixture is dispersed in an organic solvent or the like to obtain paste cathode mixture slurry. Subsequently, the cathode mixture slurry is applied onto both surfaces of the cathode current collector 21A, and the applied cathode mixture slurry is then dried to form the cathode active material layers 21B. Thereafter, the cathode active material layers 21B are compression-molded with the use of a roll pressing machine and/or the like while being heated on an as-necessary basis. In this case, compression molding may be performed repeatedly for a plurality of times.

When fabricating the anode 22, the anode active material layer 22B is formed on the anode current collector 22A by a procedure similar to the procedure for the cathode 21 described above. Specifically, an anode mixture in which the anode active material is mixed with the anode binder, the anode conductor, and the like is dispersed in an organic solvent or the like to obtain paste anode mixture slurry. Subsequently, the anode mixture slurry is applied onto both surfaces of the anode current collector 22A, and the applied anode mixture slurry is dried to form the anode active material layers 22B. It goes without saying that the anode active material layer 22B may be compression-molded with the use of a roll pressing machine and/or the like while being heated, and such compression molding may be performed repeatedly for a plurality of times. Subsequently, the material for forming the coating film 22C is dispersed or dissolved in a solvent or the like such as an organic solvent to prepare process solution. Subsequently, the process solution is applied onto a surface of the anode active material layer 22B, and the applied process solution is then dried to form the coating film 22C. When forming the coating film 22C, the anode active material layer 22B may be dipped in the process solution and the dipped anode active material layer 22B may be dried, instead of applying the process solution onto the anode active material layer 22B.

When fabricating the battery device 20, the cathode lead 24 is attached to the cathode current collector 21A by a welding method or the like, and the anode lead 25 is attached to the anode current collector 22A by a welding method or the like. Subsequently, the cathode 21 and the anode 22 are laminated with the separator 23 in between, which is spirally wound in a longitudinal direction to form a spirally wound body. Subsequently, the spirally wound body is shaped into a flat shape.

When assembling the secondary battery, the battery device 20 is contained inside the battery can 11, and the insulating plate 12 is then placed on the battery device 20. Subsequently, the cathode lead 24 is attached to the cathode pin 15 by a welding method or the like, and the anode lead 25 is attached to the battery can 11 by a welding method or the like. In this case, the battery cover 13 is fixed onto the open end of the battery can 11 by a laser welding method or the like. Subsequently, the electrolytic solution is injected inside the battery can 11 from the injection hole 19 to cause the separator 23 to be impregnated with the electrolytic solution. Subsequently, the injection hole 19 is blocked by the sealing member 19A.

[Function and Effect of Secondary Battery]

According to the square-type secondary battery in this example, the three physical characteristic conditions described above are satisfied concerning the anode 22. Accordingly, a decomposition reaction of the electrolytic solution is suppressed without insertion and extraction of lithium by the anode active material being largely prevented. As a result, it is possible to improve the battery characteristics.

In particular, when the coating film 22C includes the polymer compound, and the polymer compound includes a carbonate bond in the repeating unit thereof, it is possible to further improve the protection function of the coating film 22C. In this case, when the polymer compound includes one or more of the compounds represented by respective Formulas (1) to (4), a higher effect is achieved.

[2-2. Lithium Ion Secondary Battery (Cylindrical Type)]

Figure 6:
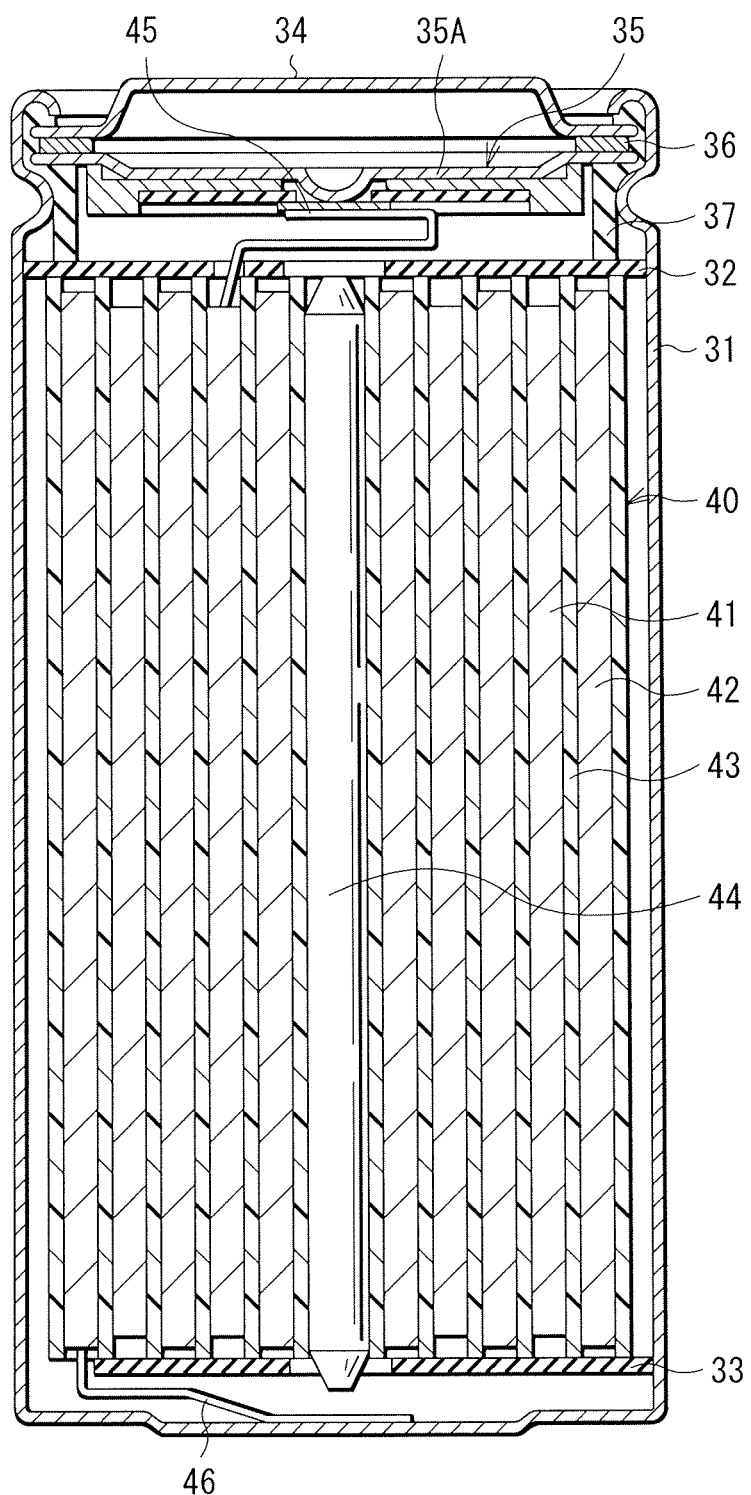
FIG. 6 is a cross-sectional view illustrating a configuration of another secondary battery (of a cylindrical type) that uses the electrode of an embodiment of the present application.
Figure 7:
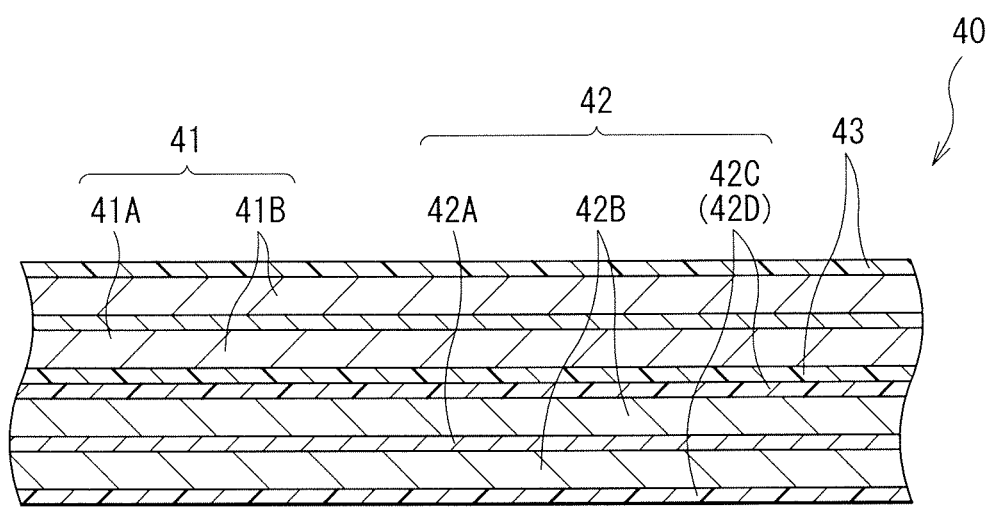
FIG. 7 is a cross-sectional view illustrating enlarged part of a spirally wound electrode body illustrated in FIG. 6.

FIGS. 6 and 7 each illustrate a cross-sectional configuration of another secondary battery. FIG. 7 illustrates enlarged part of a spirally wound electrode body 40 illustrated in FIG. 6. The components of the square-type secondary battery that have been already described are referred to where appropriate below.

[General Configuration of Secondary Battery]

The secondary battery in this example is a so-called cylindrical-type lithium ion secondary battery. In this example, the electrode of an embodiment of the present application described above may be applied to an anode 42, for example.

Specifically, as illustrated in FIG. 6, a pair of insulating plates 32 and 33 and a spirally wound electrode body 40 may be contained inside a battery can 31 having a hollow columnar shape, for example. In the spirally wound electrode body 40, for example, the cathode 41 and the anode 42 may be laminated with a separator 43 in between and are spirally wound.

The battery can 31 may have, for example, a hollow structure in which one end of the battery can 31 is closed and the other end thereof is open. The battery can 31 may be made, for example, of one or more of iron, aluminum, alloy thereof, and the like. A surface of the battery can 31 may be plated with nickel and/or the like. The pair of insulating plates 32 and 33 is arranged to sandwich the spirally wound electrode body 40 in between, and to extend perpendicularly to a spirally wound periphery surface of the spirally wound electrode body 40.

At the open end of the battery can 31, a battery cover 34, a safety valve mechanism 35, and a positive temperature coefficient device (PTC device) 36 are swaged with a gasket 37. The battery can 31 is hermetically sealed thereby. The battery cover 34 may be made, for example, of a material similar to the material of the battery can 31. The safety valve mechanism 35 and the PTC device 36 are both provided on an inner side of the battery cover 34. The safety valve mechanism 35 is electrically connected to the battery cover 34 via the PTC device 36. In the safety valve mechanism 35, when the internal pressure becomes a certain level or higher as a result of internal short circuit, external heating, or the like, a disk plate 35A inverts, which cuts electric connection between the battery cover 34 and the spirally wound electrode body 40. In order to prevent abnormal heat generation resulting from a large current, resistance of the PTC device 36 is increased in accordance with increase in temperature. The gasket 37 may be made, for example, of an insulating material. A surface of the gasket 37 may be coated with asphalt and/or the like.

In the center of the spirally wound electrode body 40, for example, a center pin 44 may be inserted. However, the center pin 44 may not be inserted in the center of the spirally wound electrode body 40. For example, a cathode lead 45 made of a conductive material such as aluminum may be connected to the cathode 41. For example, an anode lead 46 made of a conductive material such as nickel may be connected to the anode 42. For example, the cathode lead 45 may be welded to the safety valve mechanism 35, and may be electrically connected to the battery cover 34. For example, the anode lead 46 may be welded to the battery can 31, and may be electrically connected to the battery can 31.

[Cathode, Anode, Separator, and Electrolytic Solution]

As illustrated in FIGS. 5 and 7, for example, the cathode 41 may include cathode active material layers 41B on both surfaces of a cathode current collector 41A, and the anode 42 may include anode active material layers 42B and coating films 42C on both surfaces of an anode current collector 42A. Configurations of the cathode current collector 41A, the cathode active material layer 41B, the anode current collector 42A, the anode active material layer 42B, and the coating film 42C may be similar to the configurations of the cathode current collector 21A, the cathode active material layer 21B, the anode current collector 22A, the anode active material layer 22B, and the coating film 22C, respectively.

A configuration of the separator 43 may be similar to the configuration of the separator 23. Also, a composition of electrolytic solution with which the separator 43 is impregnated may be similar to the composition of the electrolytic solution in the square-type secondary battery.

[Operation of Secondary Battery]

The secondary battery in this example may operate as follows, for example.

At the time of a charge operation, lithium ions are extracted from the cathode 41, and are inserted in the anode 42 through the electrolytic solution. On the other hand, at the time of a discharge operation, lithium ions are extracted from the anode 42, and are inserted in the cathode 41 through the electrolytic solution.

[Method of Manufacturing Secondary Battery]

The secondary battery in this example may be manufactured by a following procedure, for example.

A procedure of forming each of the cathode 41 and the anode 42 may be similar to the procedure of forming each of the cathode 21 and the anode 22, for example. Specifically, the cathode active material layers 41B are formed on both surfaces of the cathode current collector 41A to fabricate the cathode 41. Also, the anode active material layers 42B are formed on both surfaces of the anode current collector 42A and the coating films 42C are then formed on the surfaces of the anode active material layers 42B to fabricate the anode 42.

When assembling the secondary battery, the cathode lead 45 is attached to the cathode current collector 41A by a welding method and/or the like, and the anode lead 46 is attached to the anode current collector 42A by a welding method and/or the like. Subsequently, the cathode 41 and the anode 42 are laminated with the separator 43 in between and are spirally wound to fabricate the spirally wound electrode body 40. Thereafter, the center pin 44 is inserted in the center of the spirally wound electrode body 40. Subsequently, the spirally wound electrode body 40 is sandwiched between the pair of insulating plates 32 and 33, which is contained inside the battery can 31. In this case, an end tip of the cathode lead 45 is attached to the safety valve mechanism 35 by a welding method and/or the like, and an end tip of the anode lead 46 is attached to the battery can 31 by a welding method and/or the like. Subsequently, the electrolytic solution is injected inside the battery can 31, and the separator 43 is impregnated with the electrolytic solution. Subsequently, at the open end of the battery can 31, the battery cover 34, the safety valve mechanism 35, and the PTC device 36 are swaged with the gasket 37.

[Function and Effect of Secondary Battery]

According to the cylindrical-type secondary battery in this example, the three physical characteristic conditions described above are satisfied concerning the anode 42. As a result, it is possible to improve the battery characteristics for a reason similar to the reason described for the square-type secondary battery. Functions and effects other than the above may be similar to those of the square-type secondary battery.

[2-3. Lithium Ion Secondary Battery (Laminated-film Type)]

Figure 8:
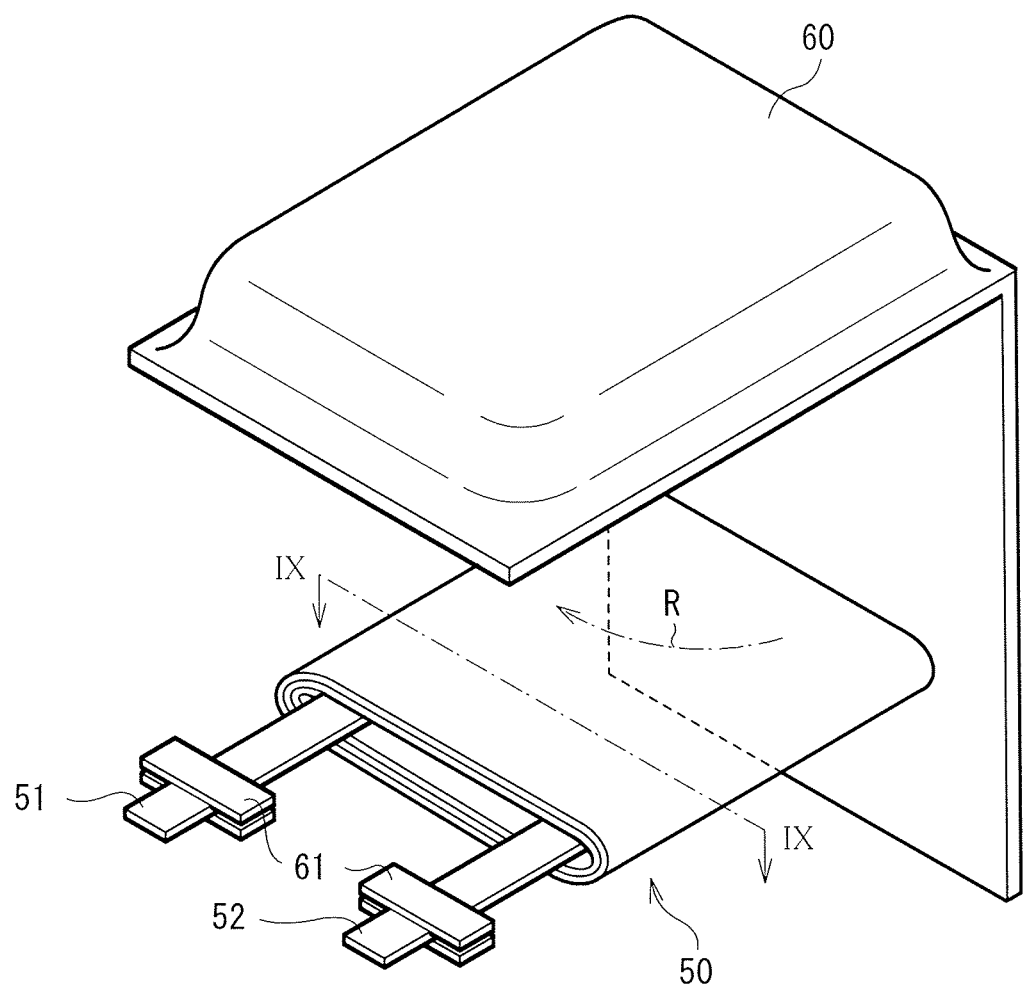
FIG. 8 is a perspective view illustrating a configuration of still another secondary battery (of a laminated film type) that uses the electrode of an embodiment of the present application.
Figure 9:
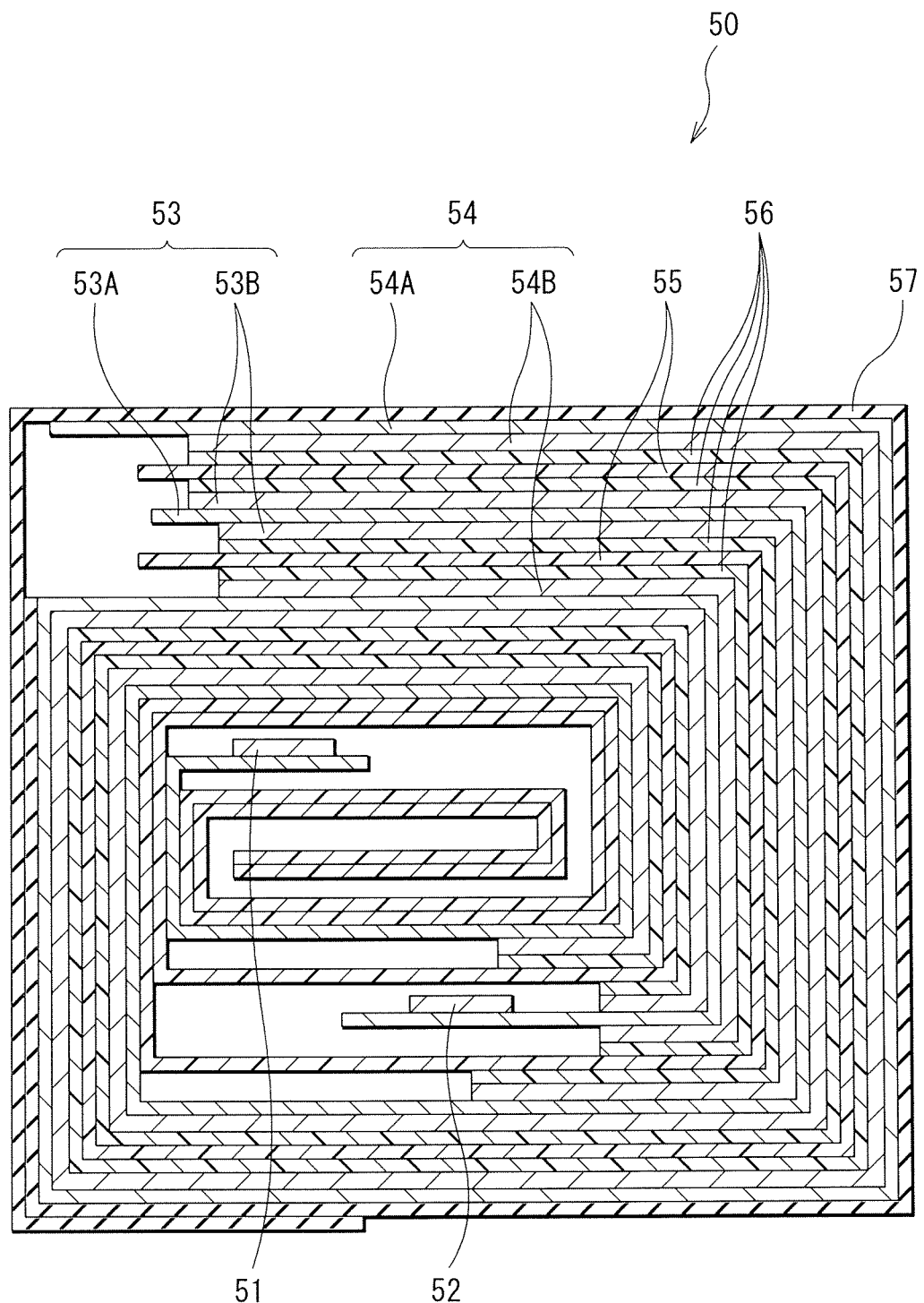
FIG. 9 is a cross-sectional view of a spirally wound electrode body taken along a line IX-IX illustrated in FIG. 8.
Figure 10:
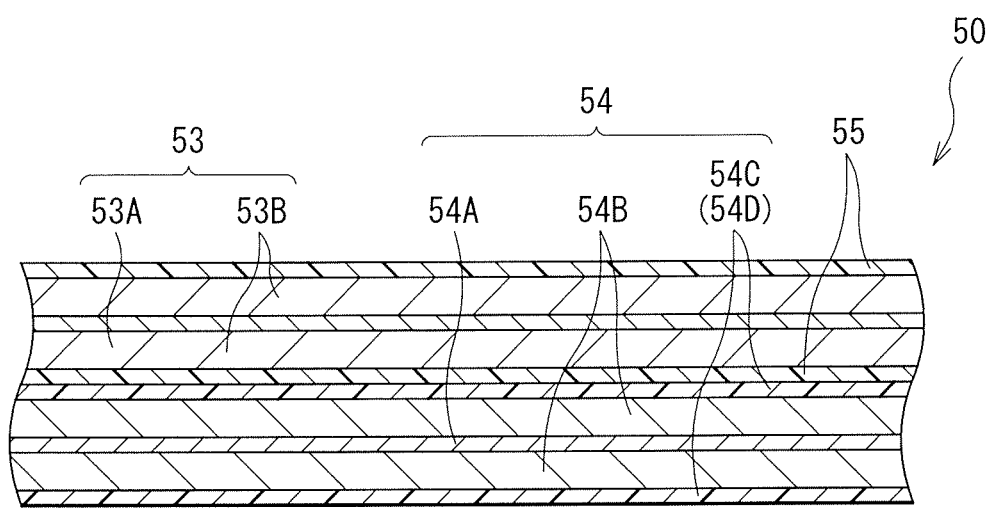
FIG. 10 is a cross-sectional view illustrating enlarged part of the spirally wound electrode body illustrated in FIG. 9.

FIG. 8 illustrates a perspective configuration of still another secondary battery. FIG. 9 illustrates a cross-section of a spirally wound electrode body 50 taken along a line IX-IX illustrated in FIG. 8. FIG. 10 illustrates enlarged part of the spirally wound electrode body 50 illustrated in FIG. 9. It is to be noted that FIG. 8 illustrates a state in which the spirally wound electrode body 50 is away from an outer package member 60. The components of the square-type secondary battery that have been already described are referred to where appropriate below.

[General Configuration of Secondary Battery]

The secondary battery in this example is a so-called laminated-film-type lithium ion secondary battery. In this example, the electrode of an embodiment of the present application described above may be applied to an anode 54, for example.

Specifically, as illustrated in FIGS. 8 and 9, the spirally wound electrode body 50 may be contained inside a film-like outer package member 60, for example. In the spirally wound electrode body 50, for example, a cathode 53 and an anode 54 may be laminated with a separator 55 and an electrolyte layer 56 in between and may be spirally wound. A cathode lead 51 is attached to the cathode 53, and an anode lead 52 is attached to the anode 54. The outermost periphery of the spirally wound electrode body 50 is protected by a protective tape 57.

Each of the cathode lead 51 and the anode lead 52 may be, for example, led out from inside to outside of the outer package member 60 in the same direction. The cathode lead 51 may be made, for example, of one or more of conductive materials such as aluminum. The anode lead 52 may be made, for example, of one or more of conducive materials such as copper, nickel, and stainless steel. These conductive materials may be in the shape, for example, of a thin plate or mesh.

The outer package member 60 may be, for example, one film that is foldable in a direction indicated by an arrow R illustrated in FIG. 8. A depression for containing the spirally wound electrode body 50 may be provided in part of the outer package member 60. The outer package member 60 may be, for example, a laminated film in which a fusion bonding layer, a metal layer, and a surface protection layer are laminated in this order. In a process of manufacturing the secondary battery, the outer package member 60 is folded so that parts of the fusion bonding layer are opposed to each other with the spirally wound electrode body 50 in between, and the outer edges of the opposed fusion bonding layer are then fusion-bonded to each other. However, the outer package member 60 may be configured of two laminated films that are attached to each other with an adhesive or the like in between. Examples of the fusion bonding layer may include a film made of one or more of materials such as polyethylene and polypropylene. Examples of the metal layer may include one or more of an aluminum foil, etc. Examples of the surface protection layer may include one or more of films made of materials such as nylon and polyethylene terephthalate.

In particular, the outer package member 60 may be preferably an aluminum laminated film in which a polyethylene film, an aluminum foil, and a nylon film are laminated in this order. However, the outer package member 60 may be a laminated film that has other laminated structure, may be a polymer film such as a polypropylene film, or may be a metal film.

For example, a close-attachment film 61 may be inserted between the outer package member 60 and the cathode lead 51 and between the outer package member 60 and the anode lead 52 in order to prevent outside air intrusion. The close-attachment film 61 is made of a material that has close-attachment characteristics with respect to the cathode lead 51 and the anode lead 52. Examples of the material that has the close-attachment characteristics may include polyolefin resin. More specifically, such a material may be one or more of polyethylene, polypropylene, modified polyethylene, modified polypropylene, and the like, for example.

[Cathode, Anode, Separator, and Electrolytic Solution]

As illustrated in FIGS. 5 and 10, for example, the cathode 53 may include cathode active material layers 53B on both surfaces of a cathode current collector 53A, and the anode 54 may include anode active material layers 54B and coating films 54C on both surfaces of an anode current collector 54A. Configurations of the cathode current collector 53A, the cathode active material layer 53B, the anode current collector 54A, the anode active material layer 54B, and the coating film 54C may be similar to the configurations of the cathode current collector 21A, the cathode active material layer 21B, the anode current collector 22A, the anode active material layer 22B, and the coating film 22C, respectively. A configuration of the separator 55 may be similar to the configuration of the separator 23. It is to be noted that illustration of the coating film 54C is omitted in FIG. 9, and illustration of the electrolyte layer 56 is omitted in FIG. 10.

[Electrolyte Layer]

The electrolyte layer 56 includes electrolytic solution and a polymer compound. The electrolytic solution is held by the polymer compound. The electrolyte layer 56 is a so-called gel electrolyte, because high ion conductivity (for example, 1 mS/cm or higher at room temperature) is achieved and liquid leakage of the electrolytic solution is prevented thereby. The electrolyte layer 56 may include other material such as an additive.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and the like. Other than the above, the polymer compound may be a copolymer. Examples of the copolymer may include a copolymer of vinylidene fluoride and hexafluoropyrene. In particular, polyvinylidene fluoride may be preferable as a homopolymer, and the copolymer of vinylidene fluoride and hexafluoropyrene may be preferable as a copolymer, because such polymer compounds are electrochemically stable.

For example, a configuration of the electrolytic solution may be similar to the configuration of the electrolytic solution that is used in the square-type secondary battery. It is to be noted that, in the electrolyte layer 56 that is a gel electrolyte, "solvent" of the electrolytic solution refers to a wide concept that encompasses not only a liquid material but also a material having ion conductivity capable of dissociating the electrolyte salt. Accordingly, in a case where a polymer compound having ion conductivity is used, the polymer compound is also encompassed by the solvent.

It is to be noted that the electrolytic solution may be used as it is instead of the gel electrolyte layer 56. In this case, the spirally wound electrode body 50 is impregnated with the electrolytic solution.

[Operation of Secondary Battery]

The secondary battery in this example may operate as follows, for example.

At the time of a charge operation, lithium ions are extracted from the cathode 53, and the extracted lithium ions are inserted in the anode 54 through the electrolyte layer 56. On the other hand, at the time of a discharge operation, lithium ions are extracted from the anode 54, and the extracted lithium ions are inserted in the cathode 53 through the electrolyte layer 56.

[Method of Manufacturing Secondary Battery]

The secondary battery including the gel electrolyte layer 56 may be manufactured, for example, by the following three kinds of procedures.

In the first procedure, the cathode 53 and the anode 54 are fabricated by a fabrication procedure similar to the fabrication procedure of the cathode 21 and the anode 22. Specifically, when fabricating the cathode 53, the cathode active material layers 53B are formed on both surfaces of the cathode current collector 53A, and when fabricating the anode 54, the anode active material layers 54B and the coating films 54C are formed on both surfaces of the anode current collector 54A. Subsequently, the electrolytic solution, the polymer compound, the solvent, and the like are mixed to prepare precursor solution. The solvent may be, for example, an organic solvent or the like. Subsequently, the precursor solution is applied onto each of the cathode 53 and the anode 54 and the applied precursor solution is dried to form the gel electrolyte layer 56. Subsequently, the cathode lead 51 is attached to the cathode current collector 53A by a welding method and/or the like, and the anode lead 52 is attached to the anode current collector 54A by a welding method and/or the like. Subsequently, the cathode 53 and the anode 54 are laminated with the separator 55 in between and are spirally wound to fabricate the spirally wound electrode body 50. Thereafter, the protective tape 57 is adhered to the outermost periphery of the spirally wound electrode body 50. Subsequently, the outer package member 60 is folded so as to sandwich the spirally wound electrode body 50 in between. Thereafter, the outer edges of the outer package member 60 are bonded by a thermal fusion bonding method and/or the like to enclose the spirally wound electrode body 50 inside the outer package member 60. In this case, the close-attachment films 61 are inserted between the cathode lead 51 and the outer package member 60 and between the anode lead 52 and the outer package member 60.

In the second procedure, the cathode lead 51 is attached to the cathode 53, and the anode lead 52 is attached to the anode 54. Subsequently, the cathode 53 and the anode 54 are laminated with the separator 55 in between and are spirally wound to fabricate a spirally wound body as a precursor of the spirally wound electrode body 50. Thereafter, the protective tape 57 is adhered to the outermost periphery of the spirally wound electrode body 50. Subsequently, the outer package member 60 is folded so as to sandwich the spirally wound electrode body 50 in between. Thereafter, the outermost peripheries except for that on one side of the outer package member 60 are bonded by a thermal fusion bonding method and/or the like, and the spirally wound body is thereby contained inside the pouch-like outer package member 60. Subsequently, the electrolytic solution, monomers that are raw materials of the polymer compound, a polymerization initiator, and, on an as-necessary basis, other materials such as a polymerization inhibitor are mixed to prepare a composition for electrolyte. Subsequently, the composition for electrolyte is injected inside the pouch-like outer package member 60. Thereafter, the outer package member 60 is hermetically sealed by a thermal fusion bonding method and/or the like. Subsequently, the monomers are thermally polymerized to form the polymer compound. Thus, the gel electrolyte layer 56 is formed.

In the third procedure, the spirally wound body is fabricated and contained inside the pouch-like outer package member 60 in a manner similar to that of the foregoing second procedure, except that the separator 55 having both surfaces coated with a polymer compound is used. Examples of the polymer compound applied onto the separator 55 may include a polymer (a homopolymer, a copolymer, or a multicomponent copolymer) that includes vinylidene fluoride as a component. Specific examples thereof may include polyvinylidene fluoride, a binary copolymer that includes vinylidene fluoride and hexafluoro propylene as components, and a ternary copolymer that includes vinylidene fluoride, hexafluoropropylene, and chlorotrifluoroethylene as components. It is to be noted that, together with the polymer that includes vinylidene fluoride as a component, one or more other polymer compounds may be used. Subsequently, the electrolytic solution is prepared and injected inside the outer package member 60. Thereafter, an opening of the outer package member 60 is hermetically sealed by a thermal fusion bonding method and/or the like. Subsequently, the resultant is heated while a weight is applied to the outer package member 60, and the separator 55 is closely attached to the cathode 53 and the anode 54 with the polymer compound in between. Thus, the polymer compound is impregnated with the electrolytic solution, and the polymer compound is gelated. Accordingly, the electrolyte layer 56 is formed.

In the third procedure, swollenness of the secondary battery is suppressed more than in the first procedure. Further, in the third procedure, little of the monomers as the raw materials of the polymer compound, the solvent, and the like are left in the electrolyte layer 56, compared to in the second procedure. Accordingly, the formation step of the polymer compound is favorably controlled. For this reason, the cathode 53, the anode 54, and the separator 55 are sufficiently and closely attached to the electrolyte layer 56.

[Function and Effect of Secondary Battery]

According to the laminated-film-type secondary battery in this example, the three physical characteristic conditions described above are satisfied concerning the anode 54. As a result, it is possible to improve the battery characteristics for a reason similar to the reason described for the square-type secondary battery. Functions and effects other than those described above may be similar to those of the square-type secondary battery.

[2-4. Lithium Metal Secondary Battery]

A secondary battery described below is a square-type lithium secondary battery (lithium metal secondary battery) in which capacity of the anode 22 is represented by precipitation and dissolution of lithium metal. The secondary battery has a configuration similar to the configuration of the lithium ion secondary battery (of a square type) described above, and may be manufactured by a similar procedure, except that the anode active material layer 22B is formed of lithium metal.

In the secondary battery in this example, because lithium metal is used as the anode active material, high energy density is achieved. The anode active material layer 22B may be already present at the time of assembling. However, the anode active material layer 22B may not be present at the time of assembling, and may be formed of lithium metal that is precipitated at the time of a charge operation. Further, the anode active material layer 22B may be utilized as a current collector, and the anode current collector 22A may be omitted.

The secondary battery in this example may operate as follows, for example. At the time of a charge operation, lithium ions are extracted from the cathode 21, and the extracted lithium ions are precipitated, through the electrolytic solution, as lithium metal on the surface of the anode current collector 22A. At the time of a discharge operation, lithium metal is dissolved as lithium ions from the anode active material layer 22B into the electrolytic solution, and the dissolved lithium ions are inserted into the cathode 21 through the electrolytic solution.

According to the square-type lithium metal secondary battery in this example, the three physical characteristic conditions described above are satisfied concerning the anode 22. As a result, it is possible to improve the battery characteristics for a reason similar to the reason described for the lithium ion secondary battery. Functions and effects other than those described above may be similar to those of the square-type lithium ion secondary battery. It is to be noted that the lithium metal secondary battery described above is not limitedly applied to the square-type secondary battery, and may be applied to a cylindrical-type or laminated-film-type secondary battery. A similar effect is achieved also in this case.

[3. Other Secondary Battery]

[General Configuration and Operation of Secondary Battery]

A secondary battery described below has a configuration similar to the configuration of the square-type secondary battery described above in [2. Secondary Battery Using Electrode], except that the configuration and the physical characteristics of the anode 22 and the composition of the electrolytic solution are different therefrom. Also, the secondary battery described below operates in a manner similar to the manner in which the above-mentioned square-type secondary battery operates. Description related to the configuration similar to the configuration of the square-type secondary battery is omitted where appropriate below.

[Configuration of Anode]

The anode 22 before charge and discharge operations may have a configuration similar to the configuration of the anode 22 in the square-type secondary battery described above, except for not including the coating film 22C, for example. On the other hand, as illustrated in FIG. 4, the anode 22 after the charge and discharge operations may have a configuration similar to the configuration of the anode 22 in the square-type secondary battery described above, except for including a coating film 22D instead of the coating film 22C, for example. Unlike the coating film 22C that has been formed in advance before assembling the secondary battery (when fabricating the anode 22), the coating film 22D is formed afterward after assembling the secondary battery (when performing the charge and discharge operations).

[Physical Characteristics of Anode]

In order to achieve superior battery characteristics, the anode active material layer 22B may be preferably chemically stable.

In detail, because the anode active material layer 22B includes a highly-reactive anode active material, activation of the anode active material at the time of charge and discharge operations makes it easier for the anode active material to react with the electrolytic solution. When the anode active material reacts with the electrolytic solution, a decomposition reaction of the electrolytic solution is accelerated. This makes it easier for the battery characteristics of the secondary battery to be degraded. However, when the anode active material layer 22B is chemically stable, the anode active material is less likely to react with the electrolytic solution, and the decomposition reaction of the electrolytic solution is therefore suppressed. In this case, even when the anode active material layer 22B is chemically stable, insertion and extraction of lithium are less likely to be prevented at the time of charge and discharge operations when lithium is inserted and extracted smoothly in the anode active material layer 22B. Accordingly, the battery characteristics of the secondary battery are improved.

In order to ensure the chemically-stable state of the anode active material layer 22B described above, the physical characteristics of the anode 22 satisfy the following two physical characteristic conditions at the same time related to a result of an analysis of the anode active material (carbon material) by RS.

As a first condition, when the anode active material (carbon material) is analyzed by RS, two peaks are obtained in Raman spectrum (in which a horizontal axis represents Raman shift ($cm^{-1}$) and a vertical axis represents spectrum intensity) that is the result of the analysis. The obtained two peaks are a first peak (D-band) that is positioned in the vicinity of 1360 $cm^{-1}$ and a second peak (G-band) that is positioned in the vicinity of 1580 $cm^{-1}$. A half band width (full width at half maximum) $\Delta W2$ ($cm^{-1}$) of the second peak is 19 $cm^{-1}$ or more.

As a second condition, a ratio I1/I2 of intensity I1 of the first peak described above to intensity I2 of the second peak described above is from about 0.15 to about 0.3 both inclusive. The ratio I1/I2 is a so-called R-value.

One reason why the first and second conditions are satisfied related to the first and second peaks is because a surface state of the anode active material is made appropriate thereby. In this case, while lithium is easily inserted and extracted at the anode active material, it is made easier for the favorable coating film 22D derived from an unsaturated cyclic compound in the electrolytic solution described later to be formed on the surface of the anode 22. Accordingly, chemical stability of the anode 22 is improved, and the decomposition reaction of the electrolytic solution derived from reactivity of the anode 22 is therefore suppressed. A reason other than that described above and details of the analysis by RS are similar to those described above in [2. Secondary Battery Using Electrode].

In this example, when analyzing the anode 22 after charge and discharge operations by XPS, photoelectron spectrum of oxygen 1s (photoelectron spectrum (O1s)) is obtained from a result of the analysis (in which a horizontal axis represents bonding energy (eV) and a vertical axis represents spectrum intensity). A half band width (full width at half maximum) $\Delta W1$ (eV) of the photoelectron spectrum (O1s) is not particularly limited. In particular, the half band width $\Delta W1$ may be preferably 3 eV or more as a third condition related to the anode 22, because this makes the state of the coating film 22D appropriate, and the chemical stability of the anode 22 is further improved thereby. A reason other than that described above and the details of the analysis by XPS are similar to those described above in [2. Secondary Battery Using Electrode].

[Configuration of Electrolytic Solution]

The electrolytic solution has a composition similar to the composition of the electrolytic solution in the square-type secondary battery described above, except for including one or more of unsaturated cyclic compounds represented by the following respective Formulas (6) to (8).

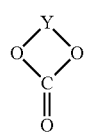

(6)

(Y is a divalent group obtained by bonding p-number of >C=CR8R9 and q-number of >CR10R11 in arbitrary order. Each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof. Arbitrary two or more of R8 to R11 may be bonded to one another. p and q are integers that satisfy p≥1 and q≥0, respectively.)

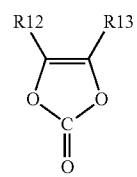

(7)

(Each of R12 and R13 is one of a hydrogen group and a monovalent hydrocarbon group.)

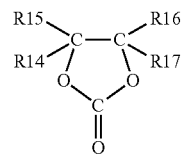

(8)

(Each of R14 to R17 is one of a hydrogen group, a monovalent saturated hydrocarbon group, and a monovalent unsaturated hydrocarbon group. One or more of R14 to R17 are each a monovalent unsaturated hydrocarbon group.)

"Unsaturated cyclic compound" is a cyclic ester carbonate that includes one or more unsaturated bonds (>C=C< that is a carbon-carbon double bond). In order to distinguish the series of unsaturated cyclic compounds represented by respective Formulas (6) to (8) from one another, the unsaturated cyclic compound represented by Formula (6) is referred to as "first unsaturated cyclic compound", the unsaturated cyclic compound represented by Formula (7) is referred to as "second unsaturated cyclic compound", and the unsaturated cyclic compound represented by Formula (8) is referred to as "third unsaturated cyclic compound". Also, the first unsaturated cyclic compound, the second unsaturated cyclic compound, and the third unsaturated cyclic compound may be collectively referred to as "unsaturated cyclic compound" on an as-necessary basis.

One reason why the electrolytic solution includes the unsaturated cyclic compound is because the coating film 22D derived from the unsaturated cyclic compound is formed on the surface of the anode active material layer 22B as a result of charge and discharge operations of the secondary battery. Accordingly, even if the coating film 22C is not formed beforehand on the surface of the anode active material layer 22B, the coating film 22D that has a protection function similar to the protection function of the coating film 22C is achieved. In the case where the unsaturated cyclic compound is included in the electrolytic solution, the photoelectron spectrum (O1s) related to the first condition described above is obtained by analyzing the anode 22.

Y in Formula (6) is a group obtained by bonding p-number of >C=CR8R9 and q-number of >CR10R11 to one another so that the group becomes divalent as a whole (so that the group has a portion that is allowed to be bonded to another group on each of the both terminal ends). Adjacent groups (groups to be bonded to each other) may be the same group as >C=CR8R9 and >C=CR8R9, or may be different groups as >C=CR8R9 and >CR10R11. In other words, each of the number (p) of >C=CR8R9 and the number (q) of >CR10R11 used for forming a divalent group may be arbitrary. Also, the order of bonding >C=CR8R9 and >CR10R11 may be arbitrary.

>CR10R11 is a divalent saturated group that includes no carbon-carbon double bond, whereas >C=CR8R9 is a divalent unsaturated group that includes the carbon-carbon double bond described above. Because q≥0 is established, >CR10R11 that is a saturated group may be included in Y, or may not be included in Y. On the other hand, because p≥1 is established, it is necessary for Y to include one or more >C=CR8R9 that is an unsaturated group. Accordingly, Y may be configured only of >C=CR8R9, or may be configured of both >C=CR8R9 and >CR10R11, because it may be necessary for the unsaturated cyclic compound to include one or more unsaturated groups in a chemical structure thereof.

The values of p and q are not particularly limited as long as the values thereof satisfy the conditions p≥1 and q≥0. In particular, in a case where >C=CR8R9 is >C=CH$_2$ and >CR10R11 is >CH$_2$, it may be preferable that a condition of (p+q)≤5 be satisfied, because the carbon number of Y is prevented from being excessively large thereby, and solubility and compatibility of the first unsaturated cyclic compound is therefore secured.

It is to be noted that arbitrary two or more of R8 to R11 in >C=CR8R9 and >CR10R11 may be bonded to one another, and the bonded groups may form a ring. To give an example, R8 and R9 may be bonded to each other, R10 and R11 may be bonded to each other, or R9 and R10 or R11 may be bonded to each other.

Details of R8 to R11 are as follows. It is to be noted that R8 to R11 may be the same group or may be different groups. Also, arbitrary two or three of R8 to R11 may be the same group.

The kind of each of R8 to R11 is not particularly limited as long as the kind thereof is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof. One reason for this is because the advantage described above is achievable irrespective of the kinds of R8 to R11 since Y includes one or more carbon-carbon double bonds (>C=CR8R9).

The halogen group may be, for example, one of a fluorine group, a chlorine group, a bromine group, and an iodine group. In particular, the halogen group may be preferably a fluorine group, because a higher effect is achieved thereby.

"Monovalent hydrocarbon group" is a collective term of a monovalent group that is configured of carbon and hydrogen. The monovalent hydrocarbon group may be linear, or may be branched to have one or more side chains. Examples of the monovalent hydrocarbon group may include an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, and a cycloalkyl group having carbon number from 3 to 18 both inclusive. One reason for this is because the advantage described above is achievable while ensuring solubility and compatibility of the unsaturated cyclic compound are secured.

More specifically, examples of the alkyl group may include a methyl group (—CH$_3$), an ethyl group (—C$_2$H$_5$), and a propyl group (—C$_3$H$_7$). Examples of the alkenyl group may include a vinyl group (—CH=CH$_2$) and an allyl group (—CH$_2$—CH=CH$_2$). Examples of the alkynyl group may include an ethynyl group (—C≡CH). Examples of the aryl group may include a phenyl group and a naphthyl group. Examples of the cycloalkyl group may include a cyclopropyl group, a cyclobutyl group, a cyclopentyl group, a cyclohexyl group, a cycloheptyl group, and a cyclooctyl group.

"Monovalent oxygen-containing hydrocarbon group" is a collective term of a monovalent group that is configured of carbon, hydrogen, and oxygen. Examples of the monovalent oxygen-containing hydrocarbon group may include an alkoxy group having carbon number from 1 to 12 both inclusive, because the advantage described above is achievable thereby while solubility and compatibility of the unsaturated cyclic compound are secured. More specifically, examples of the alkoxy group may include a methoxy group (—OCH$_3$) and an ethoxy group (—OC$_2$H$_5$).

"Monovalent halogenated hydrocarbon group" is a group obtained by substituting one or more halogen groups for one or more hydrogen groups in the monovalent hydrocarbon group described above. In other words, the monovalent halogenated hydrocarbon group is a group obtained by halogenating the monovalent hydrocarbon group described above. Similarly, "monovalent halogenated oxygen-containing hydrocarbon group" is a group obtained by substituting one or more the halogen groups for one or more hydrogen groups in the monovalent oxygen-containing hydrocarbon group described above. In either of the cases, details of the halogen group substituted for a hydrogen group are similar to the details of the halogen group described above.

The monovalent halogenated hydrocarbon group may be, for example, a group obtained by halogenating the alkyl group or the like described above, that is, a group obtained by substituting one or more halogen groups for one or more hydrogen groups in the alkyl group or the like described above. More specifically, examples of the group obtained by halogenating the alkyl group or the like described above may include a trifluoromethyl group (—CF$_3$) and a pentafluoroethyl group (—C$_2$F$_5$). The monovalent halogenated oxygen-containing hydrocarbon group may be, for example, a group obtained by substituting one or more halogen groups for one or more hydrogen groups in the alkoxy group or the like described above. More specifically, examples of the group obtained by halogenating the alkoxy group or the like described above may include a trifluoromethoxy group (—OCF$_3$) and a pentafluoroethoxy group (—OC$_2$F$_5$).

"Group obtained by bonding two or more thereof" may be, for example, a group that is obtained by bonding two or more of the alkyl group and the like described above so that the group becomes monovalent as a whole. Examples of the group obtained by bonding two or more thereof may include a group obtained by bonding the alkyl group and the aryl group to each other, and a group obtained by bonding the alkyl group and the cycloalkyl group to each other. More specifically, examples of the group obtained by bonding the alkyl group and the aryl group to each other may include a benzyl group.

It is to be noted that each of R8 to R11 may be a group other than the groups described above. Specifically, each of R8 to R11 may be, for example, a derivative of one of the series of groups described above. "Derivative" is a group that is obtained by introducing one or more substituents to one of the series of groups described above. The kind of the substituent may be arbitrary.

In particular, the first unsaturated cyclic compound may preferably include one or more of compounds represented by the following respective Formulas (9) and (10), because the advantage described above is achievable thereby and synthesis thereof is allowed to be performed easily.

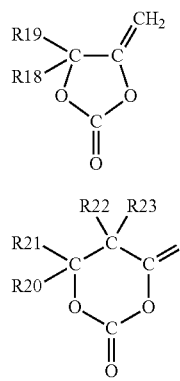

(9)

(10)

(Each of R18 to R23 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof. R18 and R19 may be bonded to each other. Arbitrary two or more of R20 to R23 may be bonded to one another.)

Paying attention to a relationship between Formula (6) and Formula (9), the compound represented by Formula (9) includes, as Y in Formula (6), one unsaturated group (>C=CH$_2$) corresponding to >C=CR8R9 and one saturated group (>CR18CR19) corresponding to >CR10R11. On the other hand, paying attention to a relationship between Formula (6) and Formula (10), the compound represented by Formula (10) includes, as Y, one unsaturated group (>C=CH$_2$) corresponding to >C=CR8R9 and two saturated groups (>CR20R21 and >CR22R23) corresponding to >CR10R11. It is to be noted that the one unsaturated group and the two saturated groups are bonded in order of >CR20R21, >CR22R23, and >C=CH$_2$.

Details of R18 and R19 in Formula (9) and details of R20 to R23 in Formula (10) are similar to the details of R8 to R11 in Formula (6), and description thereof is therefore omitted.

Specific examples of the first unsaturated cyclic compound may include one or more of compounds represented by the following respective Formulas (6-1) to (6-56), which include geometric isomers thereof. It is to be noted that specific examples of the first unsaturated cyclic compound are not limited to the compounds referred to in Formulas (6-1) to (6-56).

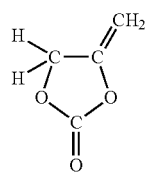

(6-1)

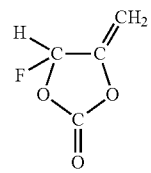

(6-2)

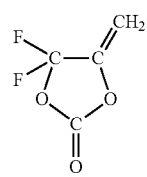

(6-3)

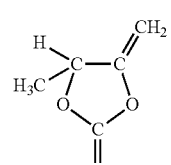

(6-4)

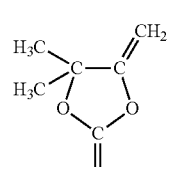

(6-5)

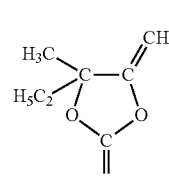

(6-6)

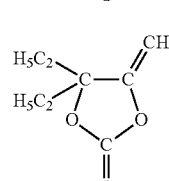

(6-7)

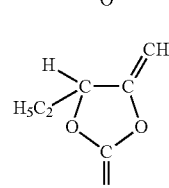

(6-8)

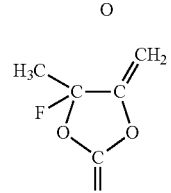

(6-9)

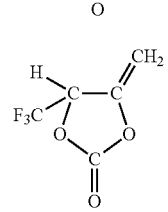

(6-10)

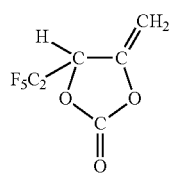 (6-11)
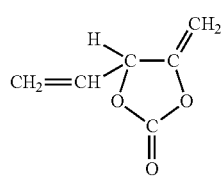 (6-12)
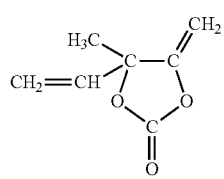 (6-13)
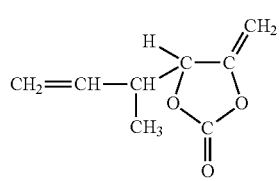 (6-14)
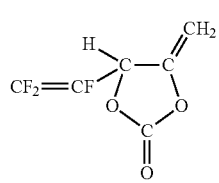 (6-15)
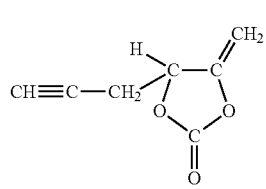 (6-16)
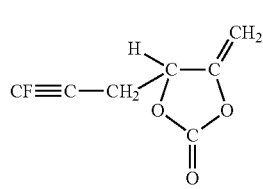 (6-17)
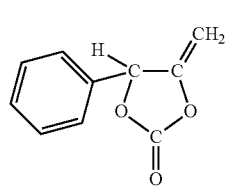 (6-18)
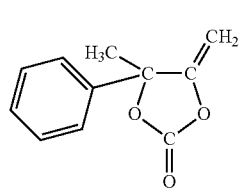 (6-19)
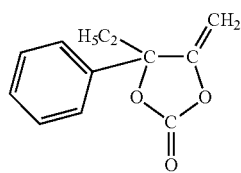 (6-20)
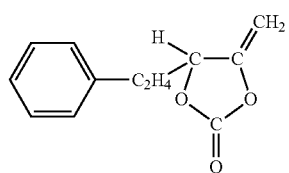 (6-21)
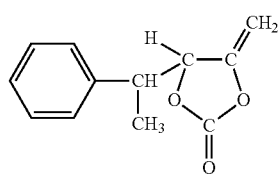 (6-22)
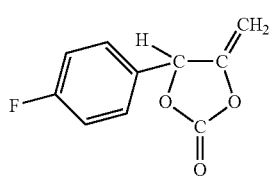 (6-23)
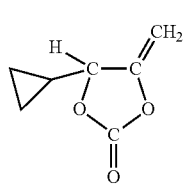 (6-24)
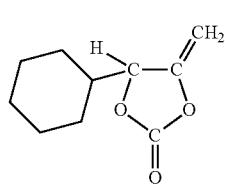 (6-25)
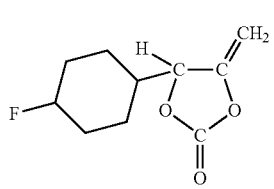 (6-26)
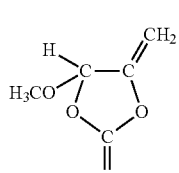 (6-27)
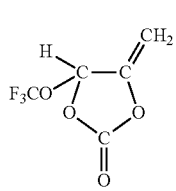 (6-28)

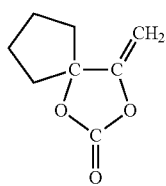 (6-29)
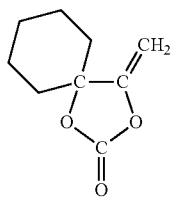 (6-30)
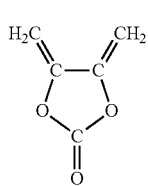 (6-31)
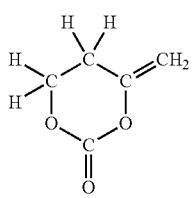 (6-32)
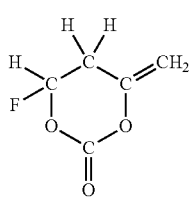 (6-33)
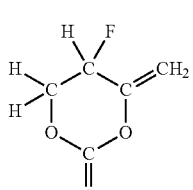 (6-34)
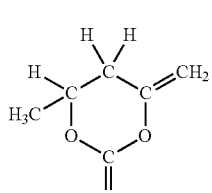 (6-35)
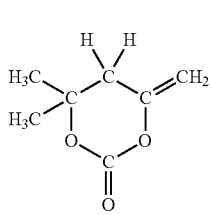 (6-36)
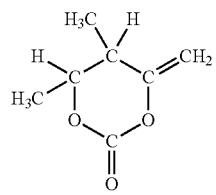 (6-37)
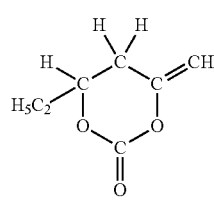 (6-38)
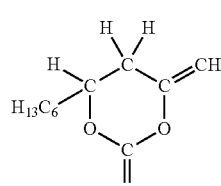 (6-39)
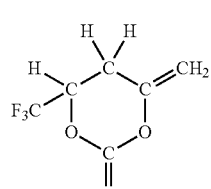 (6-40)
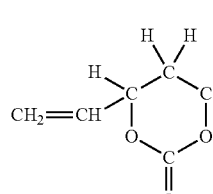 (6-41)
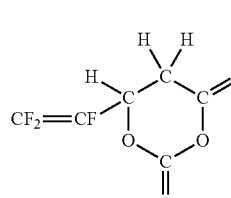 (6-42)
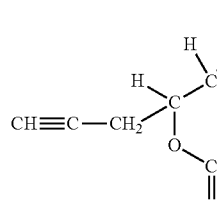 (6-43)
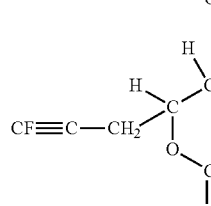 (6-44)

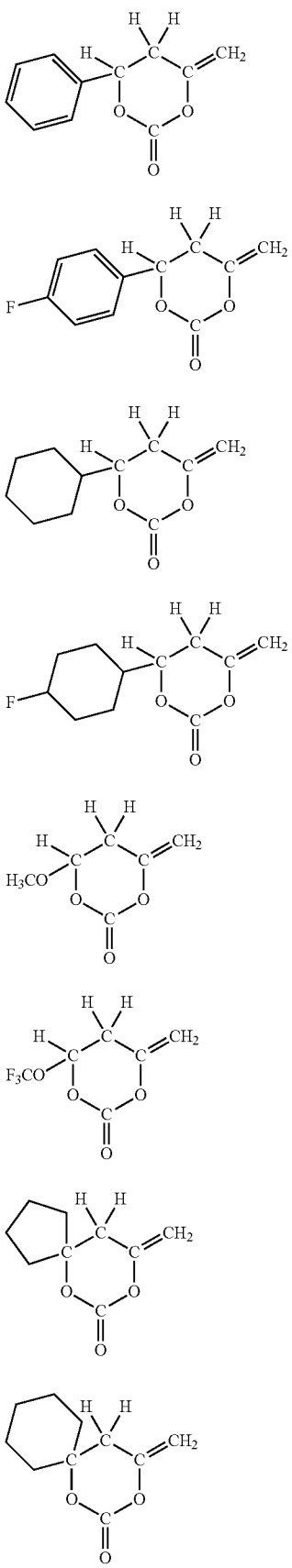
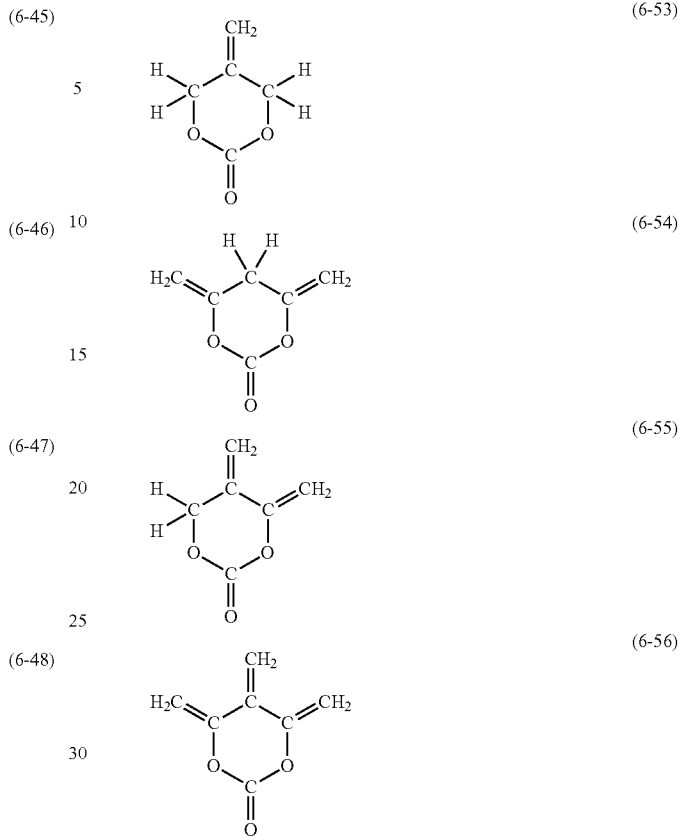

In particular, Formula (6-1) corresponding to Formula (9), etc. may be preferable, and Formula (6-32) corresponding to Formula (10), etc. may be preferable, because a higher effect is achieved thereby.

The second unsaturated cyclic compound is a vinylene-carbonate-based compound. R12 and R13 shown in Formula (7) may be the same group, or may be different groups. The kind of each of R12 and R13 is not particularly limited as long as the kind thereof is one or more of a hydrogen group and a monovalent hydrocarbon group. One reason for this is because the second unsaturated cyclic compound includes a carbon-carbon double bond (>C=C<), and the advantage described above is therefore achievable irrespective of the kinds of R12 and R13. Details of the monovalent hydrocarbon group may be similar to the details of the first unsaturated cyclic compound described above, for example.

Specific examples of the second unsaturated cyclic compound may include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. In particular, vinylene carbonate may be preferable, because vinylene carbonate is easily available and achieves a high effect.

The third unsaturated cyclic compound is a vinylethylene-carbonate-based compound. R14 to R17 shown in Formula (8) may be the same group, or may be different groups. It goes without saying that part of R14 to R17 may be the same group. The kind of each of R14 to R17 is not particularly limited as long as the kind thereof is one of a hydrogen group, a monovalent saturated hydrocarbon group, and a monovalent unsaturated hydrocarbon group. However, one or more of R14 to R17 are monovalent unsaturated hydrocarbon groups. One reason for this is because the third unsaturated cyclic compound includes one or more carbon-carbon double bonds (>C=C<), and the advantage described above is therefore achievable irrespective of the kinds of R14 to R17.

"Monovalent saturated hydrocarbon group" is a hydrocarbon group that includes no carbon-carbon double bond. The monovalent saturated hydrocarbon group may be, for example, one of an alkyl group having carbon number from 1 to 12 both inclusive, a cycloalkyl group having carbon number from 3 to 18 both inclusive, a group obtained by bonding two or more thereof so that the group becomes monovalent as a whole, and the like. In particular, the alkyl group having carbon number from 1 to 12 may be preferable, because the advantage described above is achievable while solubility and compatibility of the third unsaturated cyclic compound are secured. Details of the alkyl group, the cycloalkyl group, and the like may be similar to the details of the first unsaturated cyclic compound described above, for example.

"Monovalent unsaturated hydrocarbon group" is a hydrocarbon group that includes one or more carbon-carbon double bonds. The monovalent unsaturated hydrocarbon group may be, for example, one of an alkenyl group having carbon number from 2 to 12 both inclusive, an alkynyl group having carbon number from 2 to 12 both inclusive, an aryl group having carbon number from 6 to 18 both inclusive, a group obtained by bonding two or more thereof so that the group becomes monovalent as a whole, and the like. In particular, the alkenyl group having carbon number from 2 to 12 both inclusive may be preferable, because the advantage described above is achievable while solubility and compatibility of the third unsaturated cyclic compound are secured. Details of the alkenyl group, the alkynyl group, aryl group, and the like may be similar to the details of the first unsaturated cyclic compound described above, for example.

Specific examples of the third unsaturated cyclic compound may include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinylethylene carbonate may be preferable, because vinylethylene carbonate is easily available and achieves a high effect. It goes without saying that all of R23 to R26 may be vinyl groups, all of R23 to R26 may be allyl groups, or vinyl group and allyl group may be present in a mixed manner in R23 to R26.

A content of the unsaturated cyclic compound in the electrolytic solution is not particularly limited. However, in particular, the content thereof may be preferably from about 0.01 wt % to about 10 wt % both inclusive, and may be more preferably from about 1 wt % to about 5 wt % both inclusive, because a higher effect is achieved thereby.

[Method of Manufacturing Secondary Battery]

The secondary battery in this example may be manufactured by the following procedure, for example.

First, the secondary battery is assembled by a procedure similar to the procedure in the method of manufacturing the square-type secondary battery described above, except that the anode 22 that does not include the coating film 22C is fabricated and electrolytic solution including the unsaturated cyclic compound is prepared. In a state at the time of assembling the secondary battery, the coating film 22D is not yet formed on the surface of the anode active material layer 22B.

Subsequently, the secondary battery is charged and discharged. Charge and discharge conditions are not particularly limited. Specifically, conditions such as a current and an upper limit voltage at the time of the charge operation, a current and a lower limit voltage (final voltage) at the time of the discharge operation, the number of cycles of charge and discharge operations, and an environment temperature at the time of charge and discharge operations may be set arbitrarily.

As a result of the charge and discharge operations, the coating film 22D derived from the unsaturated cyclic compound in the electrolytic solution is formed on the surface of the anode active material layer 22B. As the first and second conditions described above are satisfied (the surface state of the anode active material is made appropriate), the unsaturated cyclic compounds in the electrolytic solution are polymerized with one another, and the polymerized unsaturated cyclic compounds becomes a coating film on the surface of the anode active material layer 22B. The coating film 22D is mainly configured of this resulting coating film.

Thus, the secondary battery is completed. It is to be noted that the unsaturated cyclic compound may be left in the electrolytic solution, or may not be left therein, in the completed secondary battery (after the formation of the coating film 22D). However, the unsaturated cyclic compound may be preferably left in the electrolytic solution, because in a process of performing charge and discharge operations (for example, at the time of using the secondary battery) after the completion of the secondary battery, even when the coating film 22D is decomposed under an influence of the charge and discharge operations, it is easier for the coating film 22D to be formed additionally on the surface of the anode active material layer 22B.

[Coating Film]

A configuration (such as a formation material) of the coating film 22D that is formed as a result of the charge and discharge operations described above may be similar to the configuration of the coating film 22C, for example. In particular, in order to improve the protection function of the coating film 22D, a result of an analysis of the anode 22 by XPS may preferably satisfy the third condition described above.

[Function and Effect of Secondary Battery]

According to the secondary battery in this example, the two physical characteristic conditions (the first and second conditions) described above are satisfied related to the anode 22, and the electrolytic solution includes the unsaturated cyclic compound. In this case, the decomposition reaction of the electrolytic solution is suppressed without insertion and extraction of lithium by the anode active material being largely prevented, for a reason similar to the reason described above for the square-type secondary battery. As a result, it is possible to improve the battery characteristics. In particular, when the third condition is also satisfied related to the anode 22, a higher effect is achievable. Functions and effects other than those described above may be similar to those described above for the square-type secondary battery.

It is to be noted that the secondary battery described above is not limitedly applied to the square-type secondary battery, and may be applied to a cylindrical-type or laminated-film-type secondary battery. In the cylindrical-type secondary battery, for example, a coating film 42D that has a function similar to the function of the coating film 22D may be formed on the surface of the anode active material layer 42B as a result of charge and discharge operations as illustrated in FIG. 7, for example. In the laminated-film-type secondary battery, a coating film 54D that has a function similar to the function of the coating film 22D may be formed on the surface of the anode active material layer 54B as illustrated in FIG. 10, for example.

[4. Applications of Secondary Battery]

Next, application examples of the secondary batteries described above are described.

Applications of the secondary battery are not particularly limited as long as the secondary battery is applied to a machine, a device, an instrument, an apparatus, a system (collective entity of a plurality of devices and the like), or the like that is capable of utilizing the secondary battery as a driving electric power source, an electric power storage source for electric power accumulation, or the like. The secondary battery used as an electric power source may be a main electric power source (an electric power source used preferentially), or may be an auxiliary electric power source (an electric power source used instead of a main electric power source or used being switched from the main electric power source). In a case where the secondary battery is used as the auxiliary electric power source, the kind of the main electric power source is not limited to the secondary battery.

Examples of applications of the secondary battery may include: electronic apparatuses (including portable electronic apparatuses) such as a video camcorder, a digital still camera, a mobile phone, a notebook personal computer, a cordless phone, a headphone stereo, a portable radio, a portable television, and a portable information terminal; a portable lifestyle appliance such as an electric shaver; a storage device such as a backup electric power source and a memory card; an electric power tool such as an electric drill and an electric saw; a battery pack used as an attachable and detachable electric power source of a notebook personal computer or the like; a medical electronic apparatus such as a pacemaker and a hearing aid; an electric vehicle such as an electric automobile (including a hybrid automobile); and an electric power storage system such as a home battery system for accumulating electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, in these applications, since superior battery characteristics are demanded, performance is effectively improved with the use of the secondary battery according to an embodiment of the present application. It is to be noted that the battery pack is an electric power source using secondary batteries, and may be a so-called assembled battery or the like. The electric vehicle is a vehicle that works (runs) with the use of a secondary battery as a driving electric power source. As described above, the electric vehicle may be an automobile (such as a hybrid automobile) also including a drive source other than a secondary battery. The electric power storage system is a system using a secondary battery as an electric power storage source. For example, in a home electric power storage system, electric power is accumulated in the secondary battery that is an electric power storage source, and home electric products and the like therefore become usable by utilizing with the use of the accumulated electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Specific description is provided of some application examples of the secondary battery. It is to be noted that the configurations of the respective application examples described below are mere examples, and may be changed as appropriate.

[4-1. Battery Pack (Single Battery)]

Figure 11:
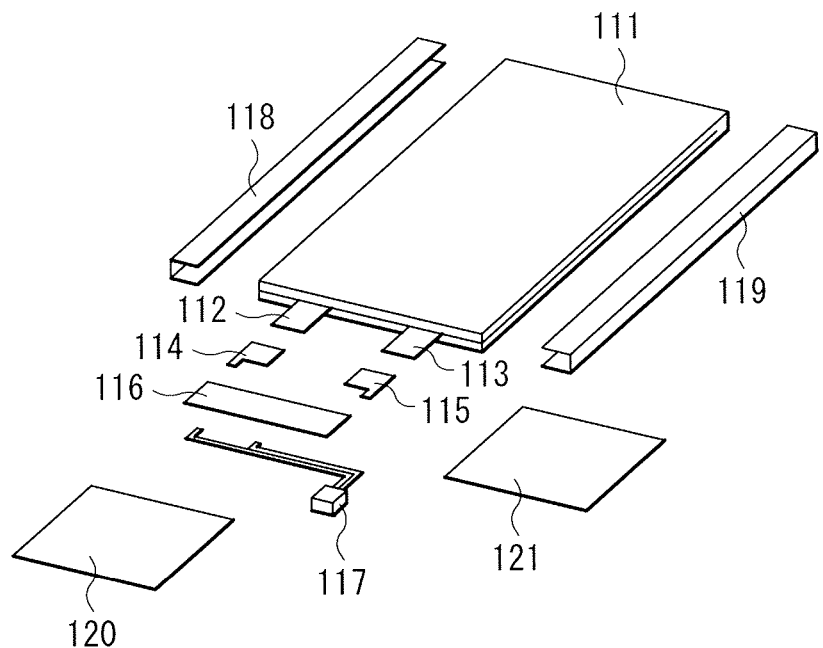
FIG. 11 is a perspective view illustrating a configuration of an application example (battery pack: single battery) of the secondary battery.
Figure 12:
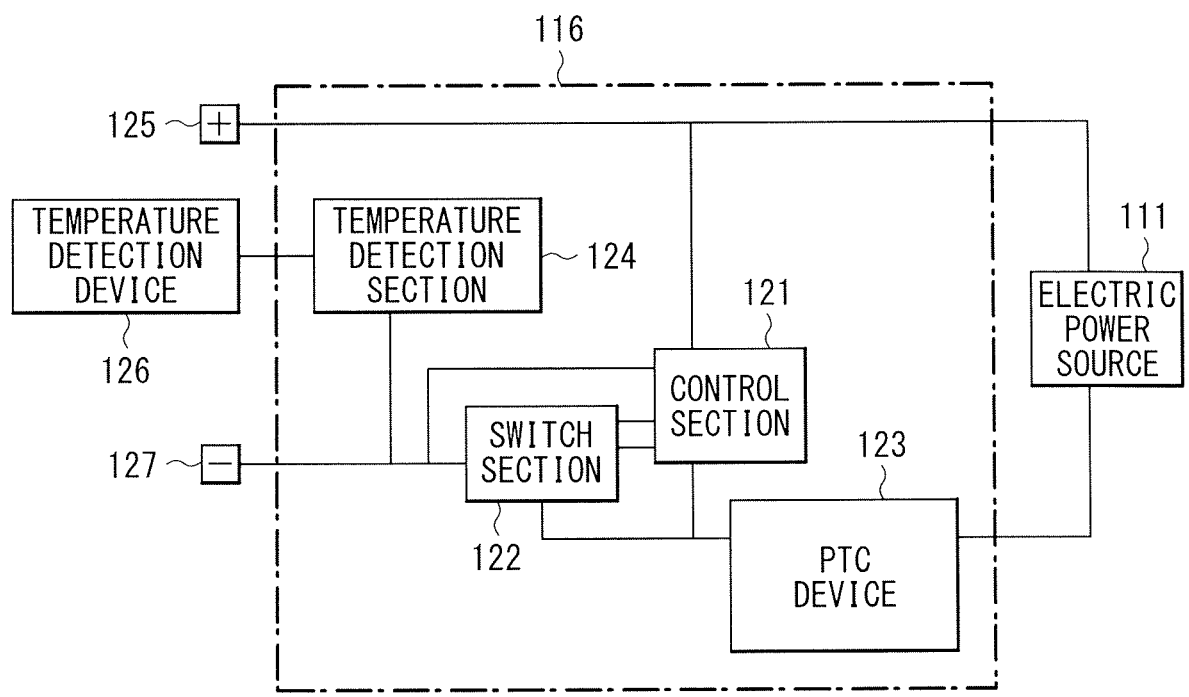
FIG. 12 is a block diagram illustrating a configuration of the battery pack illustrated in FIG. 11.

FIG. 11 illustrates a perspective configuration of a battery pack that uses a single battery. FIG. 12 illustrates a block configuration of the battery pack illustrated in FIG. 11. It is to be noted that FIG. 11 illustrates a decomposed state of the battery pack.

The battery pack described below is a simplified battery pack (a so-called soft pack) that uses one secondary battery, and may be built in an electronic apparatus such as a smartphone, for example. As illustrated in FIG. 11, the battery pack may include, for example, an electric power source 111 configured of a laminated-film-type secondary battery, and a circuit substrate 116 connected to the electric power source 111. A cathode lead 112 and an anode lead 113 are attached to the electric power source 111.

A pair of adhesive tapes 118 and 119 is attached to both side surfaces of the electric power source 111. A protection circuit (PCM: Protection Circuit Module) is formed on the circuit substrate 116. The circuit substrate 116 is connected to a cathode lead 112 via a tab 114, and is connected to an anode lead 113 via a tab 115. The circuit substrate 116 is also connected to a lead line 117 provided with a connector for external connection. It is to be noted that the circuit substrate 116 is protected from the upper and lower sides thereof by a label 120 and an insulating sheet 121, in a state of being connected to the electric power source 111. The circuit substrate 116, the insulating sheet 121, etc. are fixed due to the attachment of the label 120.

Also, the battery pack may include the electric power source 111 and the circuit substrate 116, for example, as illustrated in FIG. 12. The circuit substrate 116 may include, for example, a control section 121, a switch section 122, a PTC 123, and a temperature detection section 124. The electric power source 111 is connectable to the outside via a cathode terminal 125 and an anode terminal 127. The electric power source 111 is therefore charged and discharged via the cathode terminal 125 and the anode terminal 127. The temperature detection section 124 is capable of detecting temperature with the use of a temperature detection terminal (a so-called T terminal) 126.

The control section 121 controls operation of the whole battery pack (including a used state of the electric power source 111), and may include, for example, a central processing unit (CPU), a memory, and/or the like.

For example, when a battery voltage reaches an overcharge detection voltage, the control section 121 may cause the switch section 122 to be disconnected so that a charge current does not flow into a current path of the electric power source 111. Also, for example, when a large current flows at the time of charge operation, the control section 121 may cause the switch section 122 to be disconnected to block the charge current.

Other than the above, for example, when the battery voltage reaches an overdischarge detection voltage, the control section 121 may cause the switch section 122 to be disconnected so that a discharge current does not flow into a current path of the electric power source 111. Also, for example, when a large current flows at the time of a discharge operation, the control section 121 may cause the switch section 122 to be disconnected to block the discharge current.

It is to be noted that the overcharge detection voltage of the secondary battery may be, for example, about 4.20 V±0.05 V, and the overdischarge detection voltage may be, for example, about 2.4 V±0.1 V.

The switch section 122 switches the used state of the electric power source 111 (whether or not the electric power source 111 is connectable to an external device) according to an instruction of the control section 121. The switch section 122 may include, for example, a charge control switch, a discharge control switch, and the like. The charge control switch and the discharge control switch may each be, for example, a semiconductor switch such as a field-effect transistor (MOSFET) using a metal oxide semiconductor. It is to be noted that the charge and discharge currents may be detected, for example, based on an ON resistance of the switch section 122.

The temperature detection section 124 measures the temperature of the electric power source 111, and outputs the measurement result to the control section 121. The temperature detection section 124 may include, for example, a temperature detection device such as a thermistor. It is to be noted that the measurement result supplied by the temperature detection section 124 may be used in a case where the control section 121 performs charge and discharge control at the time of abnormal heat generation, in a case where the control section 121 performs a correction process at the time of calculating remaining capacity, etc.

It is to be noted that the circuit substrate 116 may not include the PTC 123. In this case, a PTC element may be provided separately on the circuit substrate 116.

[4-2. Battery Pack (Assembled Battery)]

Figure 13:
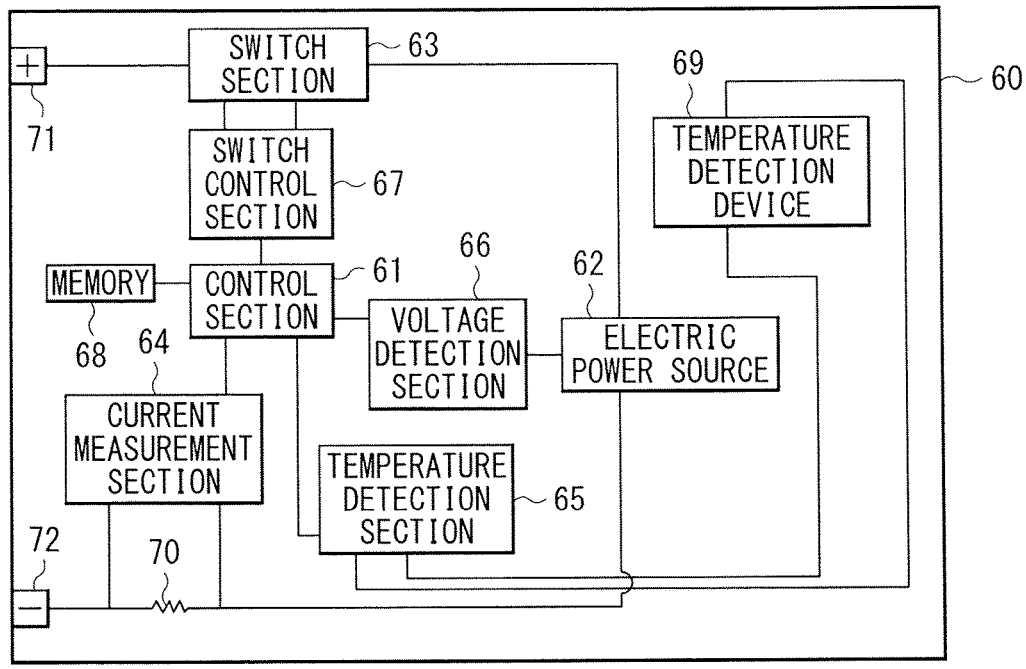
FIG. 13 is a block diagram illustrating a configuration of an application example (battery pack: assembled battery) of the secondary battery.

FIG. 13 illustrates a block configuration of a battery pack that uses an assembled battery. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 inside a housing 60. The housing 60 may be made, for example, of a plastic material or the like.

The control section 61 controls operation of the whole battery pack (including a used state of the electric power source 62), and may include, for example, a CPU or the like. The electric power source 62 includes one or more secondary batteries (not illustrated). The electric power source 62 may be, for example, an assembled battery including two or more secondary batteries. The connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (any of which is not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, in a case in which the control section 61 controls charge and discharge operations at the time of abnormal heat generation or a case in which the control section 61 performs a correction process at the time of calculating remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charge current is prevented from flowing in a current path of the electric power source 62 by disconnecting the switch section 63 (charge control switch), for example, in a case where the battery voltage reaches an overcharge detection voltage. Accordingly, in the electric power source 62, only discharge operation is allowed to be performed through the discharging diode. It is to be noted that, for example, in a case where a large current flows at the time of a charge operation, the switch control section 67 blocks the charge current.

Further, the switch control section 67 causes a discharge current to be prevented from flowing in the current path of the electric power source 62 by disconnecting the switch section 63 (discharge control switch), for example, in a case where the battery voltage reaches an overdischarge detection voltage. Accordingly, in the electric power source 62, only charge operation is allowed to be performed through the charging diode. It is to be noted that, for example, in a case where a large current flows at the time of a discharge operation, the switch control section 67 blocks the discharge current.

It is to be noted that, in the secondary battery, for example, the overcharge detection voltage may be about 4.20 V±0.05 V, and the overdischarge detection voltage may be about 2.4 V±0.1 V.

The memory 68 may be, for example, an EEPROM that is a non-volatile memory or the like. The memory 68 may store, for example, numerical values calculated by the control section 61, information of the secondary battery measured in a manufacturing step (such as an internal resistance in the initial state), etc. It is to be noted that, in a case where the memory 68 stores full charge capacity of the secondary battery, the control section 61 is allowed to comprehend information such as remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack, an external device (such as a battery charger) used for charging the battery pack, or the like. The electric power source 62 is charged and discharged through the cathode terminal 71 and the anode terminal 72.

[4-3. Electric Vehicle]

Figure 14:
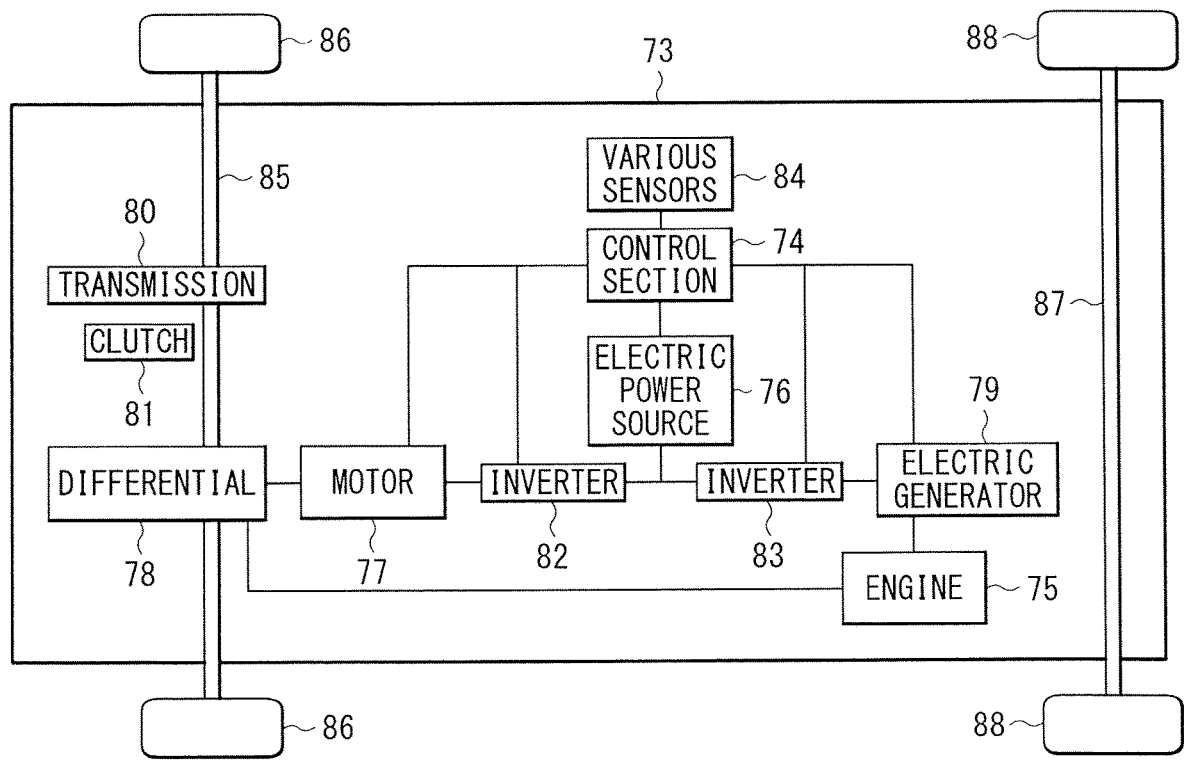
FIG. 14 is a block diagram illustrating a configuration of an application example (electric vehicle) of the secondary battery.

FIG. 14 illustrates a block configuration of a hybrid automobile as an example of the electric vehicle. For example, the electric vehicle may include a control section 74, an engine 75, an electric power source 76, a driving motor 77, a differential 78, an electric generator 79, a transmission 80, a clutch 81, inverters 82 and 83, and various sensors 84 inside a housing 73 made of metal. In addition thereto, the electric vehicle may include a front drive shaft 85 and a front tire 86 that are connected to the differential 78 and the transmission 80, and may include a rear drive shaft 87 and a rear tire 88, for example.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 that are drive sections, for example. The torque of the engine 75 may also be transferred to the electric generator 79. With the use of the torque, the electric generator 79 generates alternating-current electric power. The generated alternating-current electric power is converted into direct-current electric power through the inverter 83, and the converted power is accumulated in the electric power source 76. On the other hand, in the case where the motor 77 that is a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 that are the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by utilizing the torque. It may be preferable that the alternating-current electric power be converted into direct-current electric power through the inverter 82, and the direct-current regenerative electric power is accumulated in the electric power source 76.

The control section 74 controls operation of the whole electric vehicle, and, for example, may include a CPU and/or the like. The electric power source 76 includes one or more secondary batteries (not illustrated). The electric power source 76 may be connected to an external electric power source, and electric power may be accumulated by receiving the electric power from the external electric power source connected thereto. The various sensors 84 may be used, for example, for controlling the number of revolutions of the engine 75 or for controlling an opening level (a throttle opening level) of an unillustrated throttle valve. The various sensors 84 may include, for example, a speed sensor, an acceleration sensor, an engine frequency sensor, and/or the like.

The description has been provided above of the case where the electric vehicle is the hybrid automobile. However, the electric vehicle may be a vehicle (electric automobile) that operates with the use of only the electric power source 76 and the motor 77 without using the engine 75.

[4-4. Electric Power Storage System]

Figure 15:
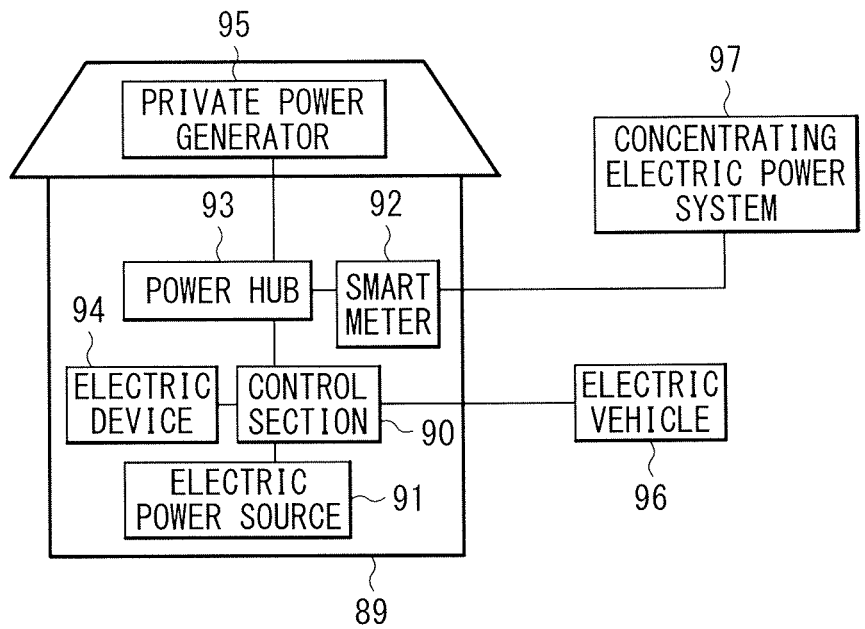
FIG. 15 is a block diagram illustrating a configuration of an application example (electric power storage system) of the secondary battery.

FIG. 15 illustrates a block configuration of an electric power storage system. For example, the electric power storage system may include a control section 90, an electric power source 91, a smart meter 92, and a power hub 93 inside a house 89 such as a general residence and a commercial building.

In this case, for example, the electric power source 91 may be connected to an electric device 94 provided inside the house 89, and may be connectable to an electric vehicle 96 parked outside the house 89. Further, for example, the electric power source 91 may be connected to a private power generator 95 provided in the house 89 via the power hub 93, and may be connectable to an external concentrating electric power system 97 via the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind power plant, and the like.

The control section 90 controls operation of the whole electric power storage system (including a used state of the electric power source 91), and may include a CPU and/or the like, for example. The electric power source 91 includes one or more secondary batteries (not illustrated). The smart meter 92 may be, for example, an electric power meter compatible with a network provided in the house 89 demanding electric power, and may be communicable with an electric power supplier. Accordingly, for example, while the smart meter 92 communicates with outside, the smart meter 92 controls the balance between supply and demand in the house 89, and thereby allows effective and stable energy supply.

In the electric power storage system, for example, electric power may be accumulated in the electric power source 91 from the concentrating electric power system 97 that is an external electric power source via the smart meter 92 and the power hub 93, and electric power is accumulated in the electric power source 91 from the private power generator 95 that is an independent electric power source via the power hub 93. The electric power accumulated in the electric power source 91 is supplied to the electric device 94 and the electric vehicle 96 according to an instruction of the control section 90. Therefore, the electric device 94 becomes operable, and the electric vehicle 96 becomes chargeable. In other words, the electric power storage system is a system that allows accumulation and supply of electric power in the house 89 with the use of the electric power source 91.

The electric power accumulated in the electric power source 91 is allowed to be utilized arbitrarily. Therefore, for example, electric power is allowed to be accumulated in the electric power source 91 from the concentrating electric power system 97 in the middle of the night when an electric rate is inexpensive, and the electric power accumulated in the electric power source 91 is allowed to be used during daytime hours when an electric rate is expensive.

It is to be noted that the foregoing electric power storage system may be provided for each household (family unit), or may be provided for a plurality of households (family units).

[4-5. Electric Power Tool]

Figure 16:
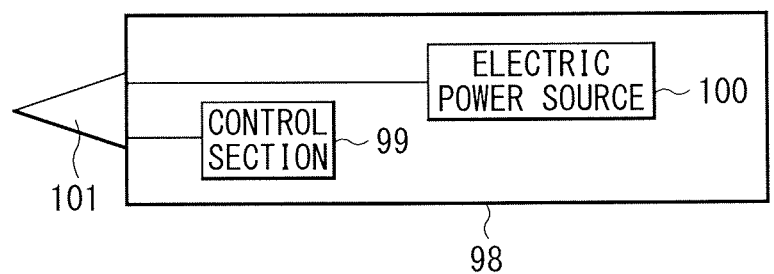
FIG. 16 is a block diagram illustrating a configuration of an application example (electric power tool) of the secondary battery.

FIG. 16 illustrates a block configuration of an electric power tool. For example, the electric power tool may be an electric drill, and may include a control section 99 and an electric power source 100 inside a tool body 98 made of a plastic material and/or the like. For example, a drill section 101 that is a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch.

EXAMPLES

Specific Examples of an embodiment of the present application are described in detail.

Examples 1-1 to 1-22

The laminated-film-type lithium ion secondary battery illustrated in FIGS. 8 to 10 was fabricated by the following procedure.

When fabricating the cathode 53, first, 91 parts by mass of a cathode active material ($LiCo_{0.98}Al_{0.01}Mg_{0.01}O_2$), 3 parts by mass of a cathode binder (polyvinylidene fluoride), and 6 parts by mass of a cathode conductor (graphite) were mixed to obtain a cathode mixture. Subsequently, the cathode mixture was dispersed in an organic solvent (N-methyl-2-pyrrolidone) to obtain paste cathode mixture slurry. Subsequently, the cathode mixture slurry was applied onto both surfaces of the cathode current collector 53A (strip-like aluminum foil being 20 µm thick) with the use of a coating apparatus, and the applied cathode mixture slurry was dried to form the cathode active material layers 53B. Lastly, the cathode active material layers 53B were compression-molded with the use of a roll pressing machine.

When fabricating the anode 54, first, 90 parts by mass of an anode active material (graphite that is the carbon material) and 10 parts by mass of an anode binder (polyvinylidene fluoride) were mixed to obtain an anode mixture. Subsequently, the anode mixture was dispersed in an organic solvent (N-methyl-2-pyrrolidone) to obtain paste anode mixture slurry. Subsequently, the anode mixture slurry was applied onto both surfaces of the anode current collector 54A (strip-like electrolyte copper foil being 15 µm thick) with the use of a coating apparatus, and the applied anode mixture slurry was dried to form the anode active material layers 54B. Lastly, the anode active material layers 54B were compression-molded with the use of a roll pressing machine.

The anode active material (carbon material) was analyzed by RS, and the half band width $\Delta W2$ ($cm^{-1}$) and the ratio I1/I2 were determined thereafter from Raman spectrum (the first and second peaks) as a result of the analysis. Accordingly, results shown in Table 1 were obtained. It is to be noted that, on an as-necessary basis, the surface of the graphite used as the anode active material was covered with an amorphous carbon precursor and the amorphous carbon precursor was burned thereafter. In this case, an amount of the covered amorphous carbon precursor, a burning temperature, etc. were adjusted to vary the half band width $\Delta W2$ and the ratio I1/I2. Details of the procedure of the analysis by RS, etc. are as described above.

When preparing the electrolytic solution, an electrolyte salt ($LiPF_6$) was dissolved in a solvent (ethylene carbonate and propylene carbonate), and the unsaturated cyclic compound was added to the solvent thereafter. The compound represented by Formula (6-1) that is the first unsaturated cyclic compound was used as the unsaturated cyclic compound. In this case, a composition of the solvent was set as ethylene carbonate:propylene carbonate=50:50 in weight ratio, a content of the electrolyte salt was set as 1 mol/kg with respect to the solvent, and the content of the unsaturated cyclic compound in the electrolytic solution was set as 2 wt %.

When assembling the secondary battery, first, the cathode lead 51 made of aluminum was welded to the cathode 53 (the cathode current collector 53A), and the anode lead 52 made of copper was welded to the anode 54 (the anode current collector 54A). Subsequently, the cathode 53 and the anode 54 were laminated with the separator 55 (microporous polypropylene film being 25 µm thick) in between, which was spirally wound in a longitudinal direction to fabricate the spirally wound electrode body 50. Thereafter, the protective tape 57 was adhered to the outermost periphery of the spirally wound electrode body 50. Subsequently, the outer package member 60 was folded so as to sandwich the spirally wound electrode body 50 in between. Thereafter, the outer edges on three sides of the outer package member 60 were thermally fusion bonded. Thus, the spirally wound electrode body 50 was contained inside the pouch-like outer package member 60. The outer package member 60 was a moisture-resistant aluminum laminated film (being 100 µm thick in total) in which a nylon film (being 30 µm thick), an aluminum foil (being 40 µm thick), and a non-stretching polypropylene film (being 30 µm thick) were laminated in order from the outer side. Lastly, the electrolytic solution was injected inside the outer package member 60 to impregnate the spirally wound electrode body 50 with the electrolytic solution, and the remaining one side of the outer package member 60 was thermally fusion bonded under a reduced pressure environment. In this case, the close-attachment films 61 (acid denatured polypropylene films each being 50 µm thick) were inserted between the cathode lead 51 and the outer package member 60 and between the anode lead 52 and the outer package member 60.

Subsequently, the secondary battery was charged and discharged for 1 cycle under an ambient temperature environment (23° C.). At the time of the charge operation, the secondary battery was charged at a current of 0.2 C until a voltage reached 4.2 V, and was then charged at a voltage of 4.2 V until the current reached 0.05 C. At the time of the discharge operation, the secondary battery was discharged at a current of 0.2 C until the voltage reached 2.5 V. It is to be noted that 0.2 C is a value of a current by which battery capacity (theoretical capacity) is completely discharged in 5 hours. 0.05 C is a value of a current by which the battery capacity is completely discharged in 20 hours.

As a result of the charge and discharge process, the coating film 54D was formed on the surface of the anode active material layer 54B, and the laminated-film-type secondary battery was completed thereby. It is to be noted that, for the sake of comparison, a secondary battery was fabricated by a similar procedure except that the unsaturated cyclic compound was not contained in the electrolytic solution and the charge and discharge process was not performed. In this case, the coating film 54D was not formed.

The anode 54 (coating film 54D) was analyzed by XPS, and the half band width ΔW1 (eV) was determined thereafter from a result of the analysis (photoelectron spectrum (O1s)). Accordingly, results shown in Table 1 were obtained. In this case, the half band width ΔW1 was varied by a procedure similar to the procedure in the case where the half band width ΔW2 was varied. Details of a procedure of the analysis by XPS, etc. were as described above.

In the analysis by XPS, the secondary battery was discharged until the voltage reached 3 V, and the secondary battery was decomposed thereafter in an inactive atmosphere in a glove box to take out the anode 54. In this case, argon (Ar) was used as the inactive gas. Subsequently, the anode 54 was washed with the use of an organic solvent (dimethyl carbonate), and the washed anode 54 was then introduced in an X-ray photoelectron spectroscopy analysis apparatus without being exposed to air.

It is to be noted that, when fabricating the secondary battery, the thickness of the cathode active material layer 53B was adjusted so that the charge-discharge capacity of the anode 54 was made larger than the charge-discharge capacity of the cathode 53, by which lithium metal was prevented from being precipitated on the anode 54 when the secondary battery was fully charged.

Initial capacity characteristics, cycle characteristics, and conservation characteristics were examined as battery characteristics of the secondary battery, and the results shown in Table 1 were obtained.

When examining the initial capacity characteristics, the secondary battery was charged and discharged for 1 cycle under an ambient temperature environment (23° C.) in order to stabilize the battery state thereof, and the secondary battery was then charged for another cycle under the same environment to measure charge capacity at the 2nd cycle. Subsequently, the secondary battery was discharged under the same environment and discharge capacity at the 2nd cycle was measured. From this result, initial efficiency (%)=(discharge capacity at the 2nd cycle/charge capacity at the 2nd cycle)×100 was calculated. Charge and discharge conditions were set to be similar to the charge and discharge conditions in the charge and discharge process for forming the coating film 54D described above.

When examining the cycle characteristics, the secondary battery having a battery state that had been stabilized by a procedure similar to the procedure in the case of examining the initial capacity characteristics was used. The secondary battery was charged and discharged for 1 cycle under the ambient temperature environment (23° C.), and the discharge capacity at the 2nd cycle was measured. Subsequently, the secondary battery was charged and discharged repeatedly under the same environment until the total number of cycles reached 100 cycles, and the discharge capacity at the 100th cycle was measured. From this result, cycle retention rate (%)=(discharge capacity at the 100th cycle/discharge capacity at the 2nd cycle)×100 was calculated. At the time of the charge operation, the secondary battery was charged at current density of 1 mA/cm² until the voltage reached 4.2 V, and was then charged at the voltage of 4.2 V until the current density reached 0.02 mA/cm². At the time of the discharge operation, the secondary battery was discharged at the current density of 1 mA/cm² until the voltage reached 3 V.

When examining the conservation characteristics, the secondary battery having a battery state that had been stabilized by a procedure similar to the procedure in the case of examining the cycle characteristics was used. The secondary battery was charged and discharged for 1 cycle under the ambient temperature environment (23° C.), and the discharge capacity before conservation was measured. Subsequently, the secondary battery was conserved for ten days in a constant temperature bath (80° C.) in a recharged state. Thereafter, the secondary battery was discharged under the ambient temperature environment, and the discharge capacity after the conservation was measured. From this result, conservation retention rate (%)=(discharge capacity after conservation/discharge capacity before conservation)×100 was calculated. Charge and discharge conditions were set to be similar to the charge and discharge conditions in the case of examining the cycle characteristics.

TABLE 1

| Example | Electrolytic Solution Kind | Electrolytic Solution Content (wt %) | Anode active material Kind | Anode active material ΔW2 (cm⁻¹) | Anode active material I1/I2 | Coating film ΔW1 (eV) | Initial efficiency (%) | Cycle retention rate (%) | Conservation retention rate (%) |
|---|---|---|---|---|---|---|---|---|---|
| 1-1 | Formula (6-1) | 2 | Graphite | 23.55 | 0.21 | 3.7 | 93 | 93 | 94 |
| 1-2 | | | | 22.05 | 0.2 | 3.1 | 91.5 | 86 | 92 |
| 1-3 | | | | 20.12 | 0.23 | 3.8 | 92.5 | 82 | 91 |
| 1-4 | | | | 21.7 | 0.28 | 3.82 | 92.6 | 85 | 90 |
| 1-5 | | | | 23.39 | 0.27 | 3.6 | 92.2 | 81 | 88 |
| 1-6 | | | | 18.52 | 0.17 | 2.9 | 88.2 | 76 | 81 |
| 1-7 | | | | 20.09 | 0.13 | 3.4 | 89 | 78 | 82 |
| 1-8 | | | | 18.15 | 0.17 | 3.1 | 87.6 | 75 | 80 |
| 1-9 | | | | 24 | 0.39 | 3.7 | 86.4 | 72 | 79 |
| 1-10 | | | | 18.04 | 0.09 | 3.1 | 88.3 | 77 | 82 |
| 1-11 | | | | 19.5 | 0.16 | 2.8 | 88.2 | 76 | 81 |
| 1-12 | — | — | Graphite | 23.55 | 0.21 | 2.86 | 89 | 88 | 90 |
| 1-13 | | | | 22.05 | 0.2 | 2.56 | 79.5 | 80 | 86 |
| 1-14 | | | | 20.12 | 0.23 | 2.49 | 77.9 | 78 | 90 |
| 1-15 | | | | 21.7 | 0.28 | 2.58 | 73.5 | 80 | 85 |
| 1-16 | | | | 23.39 | 0.27 | 2.87 | 72.5 | 78 | 85 |
| 1-17 | | | | 18.52 | 0.17 | 2.48 | 52 | 55 | 58 |
| 1-18 | | | | 20.09 | 0.13 | 2.69 | 76.5 | 70 | 76 |
| 1-19 | | | | 18.15 | 0.17 | 2.88 | 49.4 | 42 | 50 |
| 1-20 | | | | 24 | 0.39 | 2.55 | 71 | 60 | 66 |
| 1-21 | | | | 18.04 | 0.09 | 2.58 | 39.1 | 40 | 45 |
| 1-22 | | | | 19.5 | 0.16 | 2.8 | 86 | 74 | 79 |

The initial efficiency, the cycle retention rate, and the conservation retention rate varied depending on the half band widths ΔW1 and ΔW2 and the ratio I1/I2.

In the case (Examples 1-12 to 1-22) where the coating film 54D was not formed, the initial efficiency, the cycle retention rate, and the conservation retention rate were not sufficiently high.

In contrast, in the case (Examples 1-1 to 1-11) where the coating film 54D was formed, the initial efficiency, the cycle retention rate, and the conservation retention rate were all sufficiently high when the half band width $\Delta W2$ and the ratio $I1/I2$ satisfied appropriate conditions (Examples 1-1 to 1-5 and 1-11), unlike in the case where the appropriate conditions were not satisfied (Examples 1-6 to 1-10). The appropriate conditions were two physical characteristic conditions that satisfied $\Delta W2 \geq 19$ cm$^{-1}$ and $0.15 \leq I1/I2 \leq 0.3$ at the same time.

In this case (Examples 1-1 to 1-5 and 1-11), in particular, when the half band width $\Delta W1$ satisfied an appropriate condition (Examples 1-1 and 1-3 to 1-5), the initial efficiency was higher. The appropriate condition was a physical characteristic condition that satisfied $\Delta W1 \geq 3$ eV.

Examples 2-1 to 2-11 and 3-1 to 3-11

As shown in Tables 2 and 3, the secondary battery was fabricated by a procedure similar to the procedure in Examples 1-1 to 1-11 except for changing the kind of the unsaturated cyclic compound, and the battery characteristics thereof were examined. Vinylene carbonate (VC) that was the second unsaturated cyclic compound and vinylethylene carbonate (VEC) that was the third unsaturated cyclic compound were used as the unsaturated cyclic compound.

Results similar to the results shown in Table 1 were obtained even when the kind of the unsaturated cyclic compound was changed. Specifically, in the case where the coating film 54D was formed, the initial efficiency, the cycle retention rate, and the conservation retention rate were all sufficiently high when the half band width $\Delta W2$ and the ratio $I1/I2$ satisfied the appropriate conditions (Examples 2-1 to 2-5, 2-11, 3-1 to 3-5, and 3-11), unlike in other cases (Examples 2-6 to 2-10 and 3-6 to 3-10). Further, the initial efficiency was higher when the half band width $\Delta W1$ satisfied the appropriate condition (Examples 2-1, 2-3 to 2-5, 3-1, and 3-3 to 3-5).

However, the initial efficiency, the cycle retention rate, and the conservation retention rate were higher in the case (Table 1) where the first unsaturated cyclic compound was used than in the case (Tables 2 and 3) where the second unsaturated cyclic compound or the third unsaturated cyclic compound was used.

As can be seen from the results shown in Tables 1 to 3, superior battery characteristics were achieved when the two appropriate conditions were satisfied at the same time related to the result of the analysis of the anode active material (carbon material) by RS and the electrolytic solution included the unsaturated cyclic compound. Alternatively, superior battery characteristics were achieved when the three appropriate conditions were satisfied at the same time related to the result of the analysis of the anode by XPS and the result of the analysis of the anode active material (carbon material) by RS.

TABLE 2

| | Electrolytic Solution | | Anode active material | | | Coating film | Initial | Cycle retention | Conservation |
| --- | --- | --- | --- | --- | --- | --- | --- | --- | --- |
| Example | Kind | Content (wt %) | Kind | $\Delta W2$ (cm$^{-1}$) | I1/I2 | $\Delta W1$ (eV) | efficiency (%) | rate (%) | retention rate (%) |
| 2-1 | VC | 2 | Graphite | 23.55 | 0.21 | 3.4 | 92.2 | 90 | 91 |
| 2-2 | | | | 22.05 | 0.2 | 2.95 | 82 | 82 | 88 |
| 2-3 | | | | 20.12 | 0.23 | 3.75 | 88.5 | 81 | 90 |
| 2-4 | | | | 21.7 | 0.28 | 3.48 | 86.5 | 82 | 86 |
| 2-5 | | | | 23.39 | 0.27 | 3.5 | 87 | 79 | 86 |
| 2-6 | | | | 18.52 | 0.17 | 2.85 | 64 | 68 | 68 |
| 2-7 | | | | 20.09 | 0.13 | 3.2 | 78.5 | 72 | 78 |
| 2-8 | | | | 18.15 | 0.17 | 2.9 | 58 | 54 | 75 |
| 2-9 | | | | 24 | 0.39 | 3.65 | 77 | 65 | 70 |
| 2-10 | | | | 18.04 | 0.09 | 3.1 | 56.6 | 55 | 62 |
| 2-11 | | | | 19.5 | 0.16 | 2.7 | 88 | 75 | 80 |

TABLE 3

| | Electrolytic Solution | | Anode active material | | | Coating film | Initial | Cycle retention | Conservation |
| --- | --- | --- | --- | --- | --- | --- | --- | --- | --- |
| Example | Kind | Content (wt %) | Kind | $\Delta W2$ (cm$^{-1}$) | I1/I2 | $\Delta W1$ (eV) | efficiency (%) | rate (%) | retention rate (%) |
| 3-1 | VEC | 2 | Graphite | 23.55 | 0.21 | 3.45 | 91 | 88 | 91 |
| 3-2 | | | | 22.05 | 0.2 | 2.9 | 80 | 80 | 86 |
| 3-3 | | | | 20.12 | 0.23 | 3.8 | 88 | 80 | 90 |
| 3-4 | | | | 21.7 | 0.28 | 3.45 | 86.2 | 81 | 85 |
| 3-5 | | | | 23.39 | 0.27 | 3.4 | 86.8 | 78 | 86 |
| 3-6 | | | | 18.52 | 0.17 | 2.9 | 54.5 | 58 | 58 |
| 3-7 | | | | 20.09 | 0.13 | 3.4 | 77.2 | 70 | 76 |
| 3-8 | | | | 18.15 | 0.17 | 2.9 | 49.6 | 45 | 55 |
| 3-9 | | | | 24 | 0.39 | 3.7 | 72.2 | 62 | 66 |
| 3-10 | | | | 18.04 | 0.09 | 3.1 | 50.2 | 50 | 52 |
| 3-11 | | | | 19.5 | 0.16 | 2.75 | 86.5 | 76 | 81 |

The present application has been described above referring to the embodiments and Examples. However, the present application is not limited to the examples described in the embodiments and Examples, and may be variously modified. For example, description has been given referring to the specific examples of the case in which the battery structure is of a square type, a cylindrical type, or a laminated film type, and the battery device has a spirally wound structure. However, applicable structures are not limited thereto. The secondary battery of the present application is similarly applicable to a case where the secondary battery has other battery structure such as that of a coin type or a button type. Also, the secondary battery of the present application is similarly applicable to a case where the battery device has other structure such as a laminated structure.

Moreover, the electrode of the present application is not limitedly applied to the secondary battery, but may be applied to other electrochemical devices. Examples of such other electrochemical devices may include a capacitor.

It is possible to achieve at least the following configurations from the above-described example embodiments and the modifications of the technology.

(1)

A secondary battery, including:

a cathode;

an anode including a carbon material; and non-aqueous electrolytic solution, wherein a photoelectron spectrum of oxygen 1s is obtained from an analysis of the anode by X-ray photoelectron spectroscopy, a first peak positioned in vicinity of 1360 reciprocal centimeters and a second peak positioned in vicinity of 1580 reciprocal centimeters are obtained from an analysis of the carbon material by Raman spectroscopy, a half band width ΔW1 of the photoelectron spectrum is about 3 electron volts or more, a half band width ΔW2 of the second peak is about 19 reciprocal centimeters or more, and a ratio I1/I2 of intensity I1 of the first peak to intensity I2 of the second peak is from about 0.15 to about 0.3 both inclusive.

(2)

The secondary battery according to (1), wherein the carbon material includes graphite.

(3)

The secondary battery according to (1) or (2), wherein the anode includes an anode active material layer and a coating film provided on the anode active material layer, and the photoelectron spectrum is obtained from an analysis of the coating film.

(4)

The secondary battery according to (3), wherein the coating film includes a polymer compound including oxygen (O) as a constituent element in a repeating unit thereof.

(5)

The secondary battery according to (4), wherein the polymer compound includes a carbonate bond (—O—C(=O)—O—) in the repeating unit thereof.

(6)

The secondary battery according to (5), wherein the polymer compound includes one or more of compounds represented by the following respective Formulas (1) to (4),

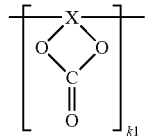

(1)

where X is a divalent group obtained by bonding one ≡C—CH$_2$—, m-number of >C=CR1R2, and n-number of >CR3R4 in arbitrary order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof, and k1, m, and n are integers that satisfy k1≥1, m≥0, and n≥0, respectively,

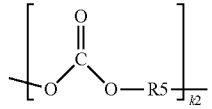

(2)

where R5 is one of a divalent hydrocarbon group, a divalent oxygen-containing hydrocarbon group, a divalent halogenated hydrocarbon group, a divalent halogenated oxygen-containing hydrocarbon group, and a group obtained by bonding two or more thereof, and k2 is an integer that satisfies k2≥1,

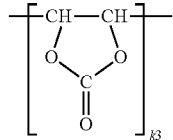

(3)

where k3 is an integer that satisfies k3≥1,

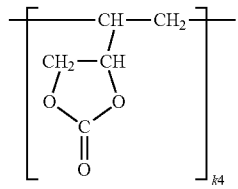

(4)

where k4 is an integer that satisfies k4≥1.

(7)

The secondary battery according to (6), wherein the halogen group is one of a fluorine group, a chlorine group, a bromine group, and an iodine group, the monovalent hydrocarbon group is one of an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, and a cycloalkyl group having carbon number from 3 to 18 both inclusive, the monovalent oxygen-containing hydrocarbon group is an alkoxy group having carbon number from 1 to 12 both inclusive, the monovalent halogenated hydrocarbon group is a group obtained by substituting one or more the halogen groups for one or more hydrogen groups in the monovalent hydrocarbon group, the monovalent halogenated oxygen-containing hydrocarbon group is a group obtained by substituting one or more the halogen groups for one or more hydrogen groups in the monovalent oxygen-containing hydrocarbon group, the divalent hydrocarbon group is one of an alkylene group having carbon number from 1 to 12 both inclusive, an alkenylene group having carbon number from 2 to 12 both inclusive, an alkynylene group having carbon number from 2 to 12 both inclusive, an arylene group having carbon number from 6 to 18 both inclusive, and a cycloalkylene group having carbon number from 3 to 18 both inclusive, the divalent oxygen-containing hydrocarbon group is a group obtained by bonding one or more of the divalent hydrocarbon groups and one or more oxygen bonds (—O—) in arbitrary order, the divalent halogenated hydrocarbon group is a group obtained by substituting one or more the halogen groups for one or more hydrogen groups in the divalent hydrocarbon group, and the divalent halogenated oxygen-containing hydrocarbon group is a group obtained by substituting one or more the halogen groups for one or more hydrogen groups in the divalent oxygen-containing hydrocarbon group.

(8)

The secondary battery according to (6), wherein the compound represented by Formula (1) includes a compound represented by Formula (5),

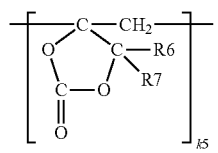

(5)

where each of R6 and R7 is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by bonding two or more thereof, and k5 is an integer that satisfies k5≥1.

(9)

The secondary battery according to any one of (1) to (8), wherein the non-aqueous electrolytic solution includes one or more of unsaturated cyclic compounds represented by the following respective Formulas (6) to (8),

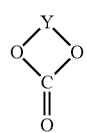

(6)

where Y is a divalent group obtained by bonding p-number of >C=CR8R9 and q-number of >CR10R11 in arbitrary order, each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof, and p and q are integers that satisfy p≥1 and q≥0, respectively,

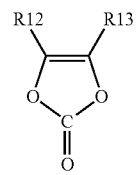

(7)

where each of R12 and R13 is one of a hydrogen group and a monovalent hydrocarbon group,

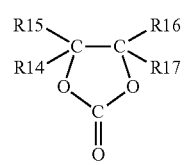

(8)

where each of R14 to R17 is one of a hydrogen group, a monovalent saturated hydrocarbon group, and a monovalent unsaturated hydrocarbon group, and one or more of R14 to R17 are each the monovalent unsaturated hydrocarbon group.

(10)

The secondary battery according to (9), wherein the monovalent saturated hydrocarbon group is an alkyl group having carbon number from 1 to 12 both inclusive, and the monovalent unsaturated hydrocarbon group is an alkenyl group having carbon number from 2 to 12 both inclusive.

(11)

The secondary battery according to any one of (1) to (10), wherein the secondary battery is a lithium secondary battery.

(12)

A secondary battery, including:

a cathode;

an anode including a carbon material; and non-aqueous electrolytic solution including one or more of unsaturated cyclic compounds represented by the following respective Formulas (6) to (8), wherein a first peak positioned in vicinity of 1360 reciprocal centimeters and a second peak positioned in vicinity of 1580 reciprocal centimeters are obtained from an analysis of the carbon material by Raman spectroscopy, a half band width ΔW2 of the second peak is about 19 reciprocal centimeters or more, and a ratio I1/I2 of intensity I1 of the first peak to intensity I2 of the second peak is from about 0.15 to about 0.3 both inclusive,

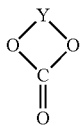

(6)

where Y is a divalent group obtained by bonding p-number of >C=CR8R9 and q-number of >CR10R11 in arbitrary order, each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof, and p and q are integers that satisfy p≥1 and q≥0, respectively,

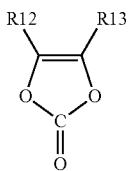

(7)

where each of R12 and R13 is one of a hydrogen group and a monovalent hydrocarbon group,

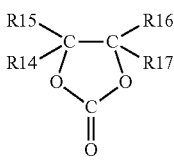

(8)

where each of R14 to R17 is one of a hydrogen group, a monovalent saturated hydrocarbon group, and a monovalent unsaturated hydrocarbon group, and one or more of R14 to R17 are each the monovalent unsaturated hydrocarbon group.

(13)

The secondary battery according to (12), wherein a photoelectron spectrum of oxygen 1s is obtained from an analysis of the anode by X-ray photoelectron spectroscopy, and a half band width ΔW1 of the photoelectron spectrum is about 3 electron volts or more.

(14)

The secondary battery according to (13), wherein the anode includes an anode active material layer and a coating film provided on the anode active material layer, and the photoelectron spectrum is obtained from an analysis of the coating film.

(15)

The secondary battery according to any one of (12) to (14), wherein the carbon material includes graphite.

(16)

The secondary battery according to any one of (12) to (15), wherein the halogen group is one of a fluorine group, a chlorine group, a bromine group, and an iodine group, the monovalent hydrocarbon group is one of an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, and a cycloalkyl group having carbon number from 3 to 18 both inclusive, the monovalent oxygen-containing hydrocarbon group is an alkoxy group having carbon number from 1 to 12 both inclusive, the monovalent halogenated hydrocarbon group is a group obtained by substituting one or more the halogen groups for one or more hydrogen groups in the monovalent hydrocarbon group, the monovalent halogenated oxygen-containing hydrocarbon group is a group obtained by substituting one or more the halogen groups for one or more hydrogen groups in the monovalent oxygen-containing hydrocarbon group, the monovalent saturated hydrocarbon group is an alkyl group having carbon number from 1 to 12 both inclusive, and the monovalent unsaturated hydrocarbon group is an alkenyl group having carbon number from 2 to 12 both inclusive.

(17)

The secondary battery according to any one of (12) to (16), wherein the secondary battery is a lithium secondary battery.

(18)

An electrode, including a carbon material, wherein a photoelectron spectrum of oxygen 1s is obtained from an analysis by X-ray photoelectron spectroscopy, a first peak positioned in vicinity of 1360 reciprocal centimeters and a second peak positioned in vicinity of 1580 reciprocal centimeters are obtained from an analysis of the carbon material by Raman spectroscopy, a half band width ΔW1 of the photoelectron spectrum is about 3 electron volts or more, a half band width ΔW2 of the second peak is about 19 reciprocal centimeters or more, and a ratio I1/I2 of intensity I1 of the first peak to intensity I2 of the second peak is from about 0.15 to about 0.3 both inclusive.

(19)

A battery pack including:

the secondary battery according to any one of (1) to (17);

a control section configured to control operation of the secondary battery; and a switch section configured to switch the operation of the secondary battery according to an instruction of the control section.

(20)

An electric vehicle including:

the secondary battery according to any one of (1) to (17);

a conversion section configured to convert electric power supplied from the secondary battery into drive power;

a drive section configured to operate according to the drive power; and a control section configured to control operation of the secondary battery.

(21)

An electric power storage system including:

the secondary battery according to any one of (1) to (17);

one or more electric devices configured to be supplied with electric power from the secondary battery; and a control section configured to control the supplying of the electric power from the secondary battery to the one or more electric devices.

(22)

An electric power tool including:

the secondary battery according to any one of (1) to (17); and a movable section configured to be supplied with electric power from the secondary battery.

(23)

An electronic apparatus including the secondary battery according to any one of (1) to (17) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery, comprising:
a cathode;
an anode including a layer of an anode active material and a coating film, wherein the anode active material includes a carbon material; and
a non-aqueous electrolytic solution,
wherein a photoelectron spectrum of oxygen 1 s is obtained from an analysis of the anode by X-ray photoelectron spectroscopy,
wherein a first peak positioned in vicinity of 1360 reciprocal centimeters and a second peak positioned in vicinity of 1580 reciprocal centimeters are obtained from an analysis of the carbon material by Raman spectroscopy,
wherein a half band width ΔW1 of the photoelectron spectrum is about 3 electron volts or more to 3.9 electron volts or less,
wherein a half band width ΔW2 of the second peak is about 19 reciprocal centimeters or more to 22.2 reciprocal centimeters or less,
wherein a ratio I1/I2 of intensity I1 of the first peak to intensity I2 of the second peak is from about 0.15 to about 0.3 both inclusive, and
wherein the non-aqueous electrolytic solution includes an unsaturated cyclic compound represented by formula (9):

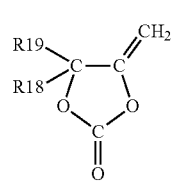

where R18 and R19 are one of a hydrogen atom, a halogen atom, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof, wherein the coating film comprises a polymer compound comprising one or more of the repeating units represented by formula (4)

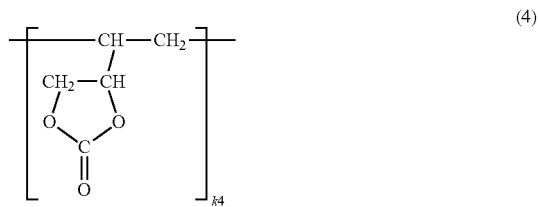

where k4 is an integer that satisfies k4≥1.

2. The secondary battery of claim 1, wherein R18 and R19 are the hydrogen atom.

3. The secondary battery of claim 1, wherein the carbon material includes graphite.

4. The secondary battery of claim 1, wherein the carbon material includes graphite covered with an amorphous carbon.

5. The secondary battery according to claim 1, wherein the photoelectron spectrum is obtained from an analysis of the coating film.

6. The secondary battery of claim 1, wherein the coating film further comprises a polymer compound comprising one or more of the repeating units represented by following respective Formulas (1) and (2):

where X is a divalent group obtained by bonding one ≡C—CH$_2$—, m-number of >C=CR1R2, and n-number of >CR3R4 in arbitrary order, each of R1 to R4 is one of a hydrogen atom, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by bonding two or more thereof, and k1, m, and n are integers that satisfy k1≥1, m≥0, and n≥0, respectively,

where R5 is one of a divalent hydrocarbon group with 1 or more than 7 carbon atoms, a divalent oxygen-containing hydrocarbon group, a divalent halogenated hydrocarbon group, a divalent halogenated oxygen-containing hydrocarbon group, and a group obtained by bonding two or more thereof, and k2 is an integer that satisfies k2≥1.

7. The secondary battery according to claim 6, wherein
if R1 to R4 comprise the halogen atom, the halogen atom is one of a fluorine atom, a chlorine atom, a bromine atom, and an iodine atom,
if R1 to R4 comprise the monovalent hydrocarbon group, the monovalent hydrocarbon group is one of an alkyl group having carbon number from 1 to 12 both inclusive, an alkenyl group having carbon number from 2 to 12 both inclusive, an alkynyl group having carbon number from 2 to 12 both inclusive, an aryl group having carbon number from 6 to 18 both inclusive, and a cycloalkyl group having carbon number from 3 to 18 both inclusive,
if R1 to R4 comprise the monovalent oxygen-containing hydrocarbon group, the monovalent oxygen-containing hydrocarbon group is an alkoxy group having carbon number from 1 to 12 both inclusive,
if R1 to R4 comprise the monovalent halogenated hydrocarbon group, the monovalent halogenated hydrocarbon group is a group obtained by substituting one or more the halogen atoms for one or more hydrogen atoms in the monovalent hydrocarbon group,
if R1 to R4 comprise the monovalent halogenated oxygen-containing hydrocarbon group, the monovalent halogenated oxygen-containing hydrocarbon group is a group obtained by substituting one or more the halogen atoms for one or more hydrogen atoms in the monovalent oxygen-containing hydrocarbon group,
if R5 is the divalent hydrocarbon group, the divalent hydrocarbon group is one of an alkylene group having carbon number of 1 and from 8 to 12 both inclusive, an alkenylene group having carbon number from 8 to 12 both inclusive, an alkynylene group having carbon number from 8 to 12 both inclusive, an arylene group having carbon number from 8 to 18 both inclusive, and a cycloalkylene group having carbon number from 8 to 18 both inclusive,
if R5 is the divalent oxygen-containing hydrocarbon group, the divalent oxygen-containing hydrocarbon group is a group obtained by bonding one or more of the divalent hydrocarbon groups and one or more oxygen bonds (—O—) in arbitrary order,
if R5 is the divalent halogenated hydrocarbon group, the divalent halogenated hydrocarbon group is a group obtained by substituting one or more the halogen atoms for one or more hydrogen atoms in the divalent hydrocarbon group, and
if R5 is the divalent halogenated oxygen-containing hydrocarbon group, the divalent halogenated oxygen-containing hydrocarbon group is a group obtained by substituting one or more the halogen atoms for one or more hydrogen atoms in the divalent oxygen-containing hydrocarbon group.

8. The secondary battery according to claim 6, wherein the repeating unit represented by Formula (1) includes a repeating represented by Formula (5),

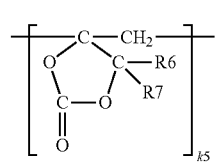

(5)

where each of R6 and R7 is one of a hydrogen atom, a halogen atom, a monovalent hydrocarbon group, a monovalent halogenated hydrocarbon group, a monovalent oxygen-containing hydrocarbon group, a monovalent halogenated oxygen-containing hydrocarbon group, and a group obtained by bonding two or more thereof, and k5 is an integer that satisfies k5≥1.

9. The secondary battery of claim 1, wherein the half band width $\Delta W2$ and the ratio I1/I2 vary even if a content of the anode active material and a content of the unsaturated cyclic compound are the same.

10. The secondary battery according to claim 1, wherein the secondary battery is a lithium secondary battery.

* * * * *